(12) United States Patent
Yamada et al.

(10) Patent No.: US 7,327,642 B2
(45) Date of Patent: Feb. 5, 2008

(54) METHOD OF MOVING A BEAM SPOT BETWEEN INFORMATION STORAGE LAYERS OF AN OPTICAL DISK

(75) Inventors: Shinichi Yamada, Katano (JP); Katsuya Watanabe, Nara (JP); Yuichi Kuze, Settsu (JP); Kenji Fujiune, Takatsuki (JP); Kenji Kondo, Kadoma (JP); Takashi Kishimoto, Nara (JP); Takeharu Yamamoto, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 750 days.

(21) Appl. No.: 10/423,796

(22) Filed: Apr. 25, 2003

(65) Prior Publication Data

US 2003/0202437 A1    Oct. 30, 2003

(30) Foreign Application Priority Data

Apr. 26, 2002  (JP) ............................. 2002-126809
Dec. 13, 2002  (JP) ............................. 2002-362047

(51) Int. Cl.
G11B 7/095    (2006.01)

(52) U.S. Cl. ............................. 369/44.29; 369/53.28
(58) Field of Classification Search ............. None
See application file for complete search history.

(56) References Cited

U.S. PATENT DOCUMENTS 6,285,635 B1 *  9/2001  Watanabe et al. ........ 369/44.27
6,370,093 B1 *  4/2002  Tada et al. ............... 369/44.25
6,738,332 B2 *  5/2004  Sato et al. ................ 369/53.28
6,756,574 B2 *  6/2004  Higuchi ..................... 250/201.2
6,927,923 B2 *  8/2005  Kimura ...................... 359/719
6,954,417 B2 * 10/2005  Komma et al. .......... 369/112.02
2001/0028614 A1  10/2001  Furukawa
2001/0053163 A1  12/2001  Furukawa
2002/0027842 A1   3/2002  Komma et al.
2003/0007431 A1   1/2003  Tateishi
2003/0072224 A1 *  4/2003  Ando ....................... 369/44.26

FOREIGN PATENT DOCUMENTS

| JP | 2002-100061 A | 4/2002 |
| JP | 2002-140825 | 5/2002 |
| JP | 2002-157750 | 5/2002 |
| WO | 01/24174 A1 | 4/2001 |

* cited by examiner

*Primary Examiner*—Andrea Wellington
*Assistant Examiner*—Michael V. Battaglia
(74) *Attorney, Agent, or Firm*—Akin Gump Strauss Hauer & Feld LLP

(57) ABSTRACT

An optical disc drive includes a light source, a lens, a focusing section, a spherical aberration corrector, a focus signal generator, a gain calculator and a processor. The focusing section forms a beam spot in a focusing state on the information storage layer of an optical disc by controlling the position of the lens. The spherical aberration corrector changes a spherical aberration with the beam spot in a focusing state according to a drive value of a driving signal supplied to the spherical aberration corrector. The focus signal generator generates a focus signal representing the focusing state of the beam spot. The gain calculator calculates a loop gain of a focus control system in response to the focus signal. The processor determines the drive value for the spherical aberration corrector by the loop gain.

5 Claims, 49 Drawing Sheets

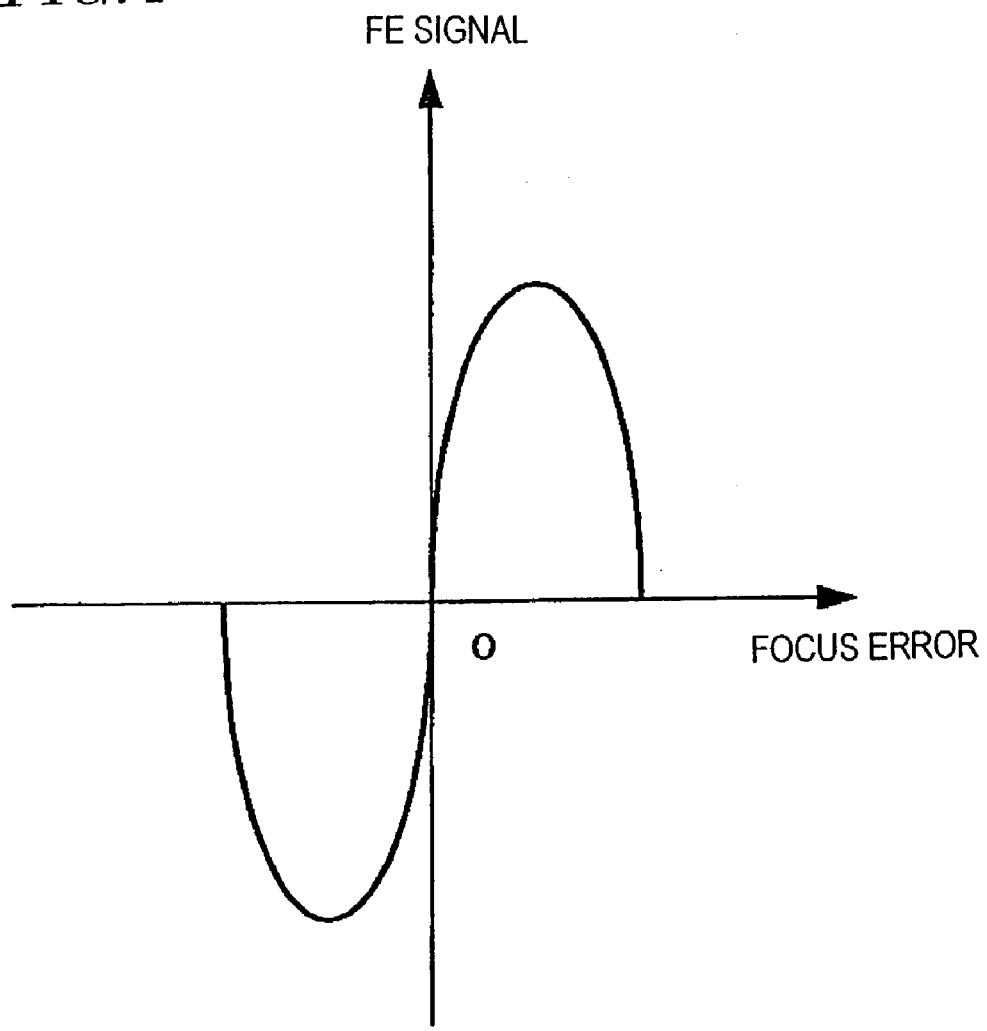

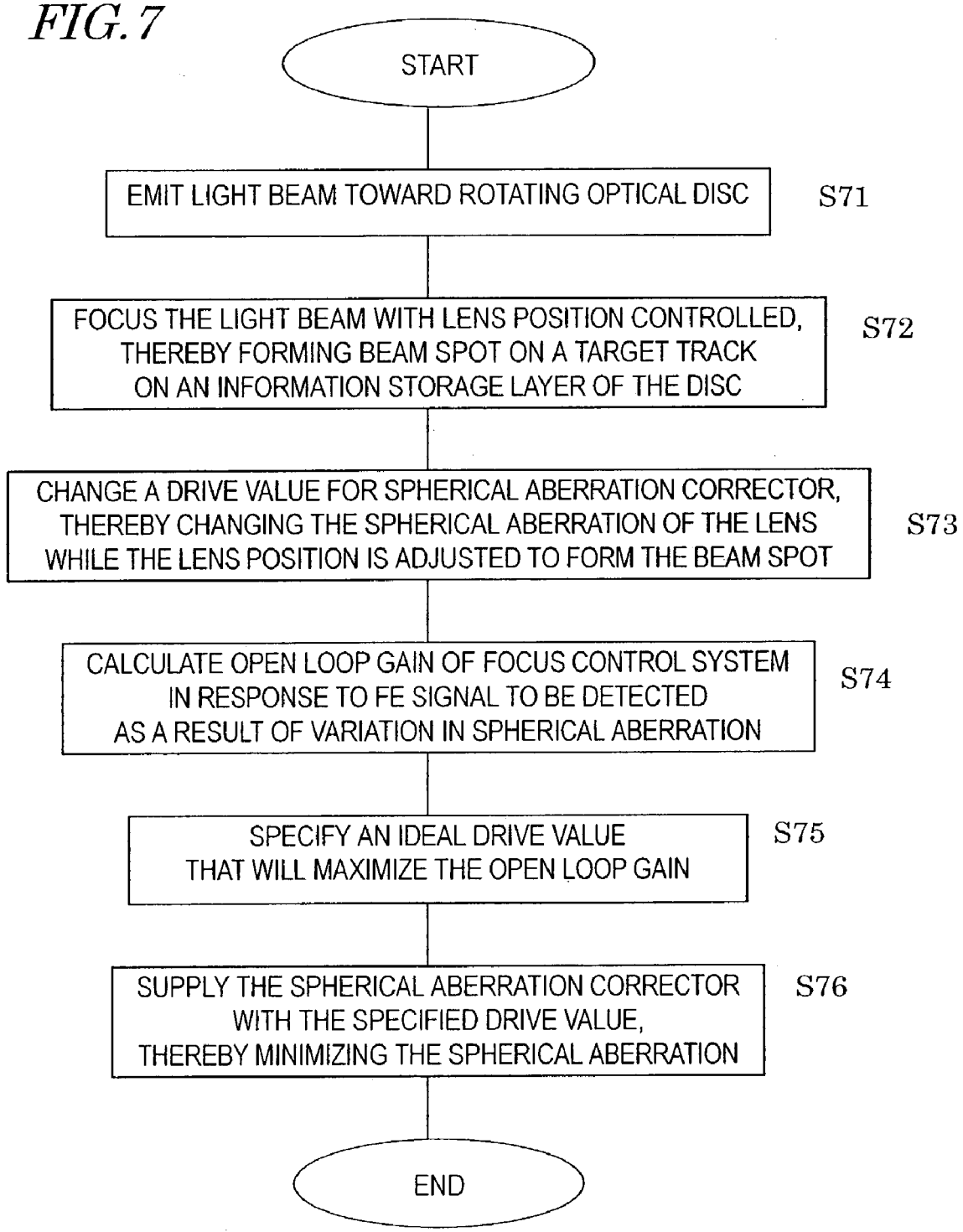

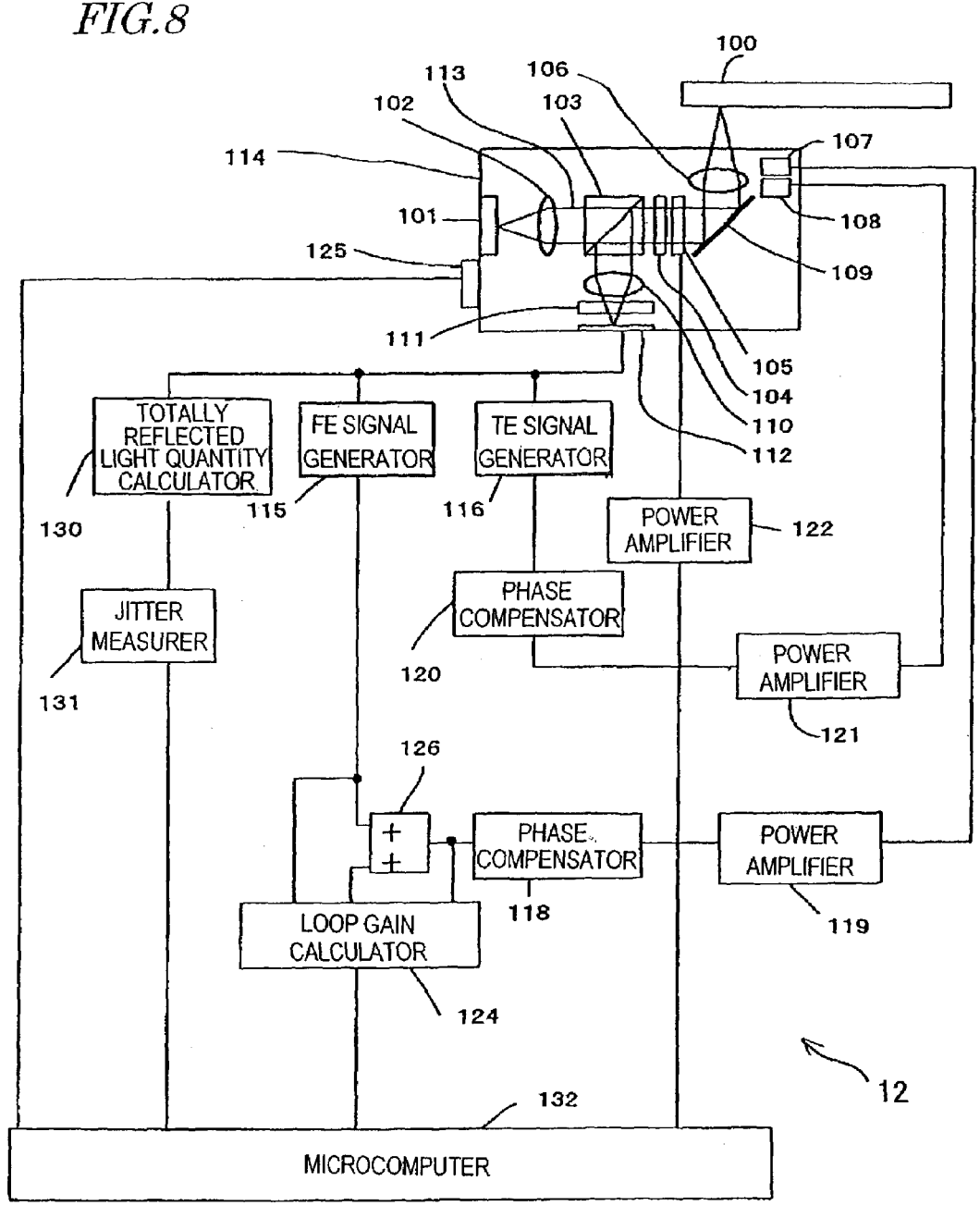

FIG.11
(a)
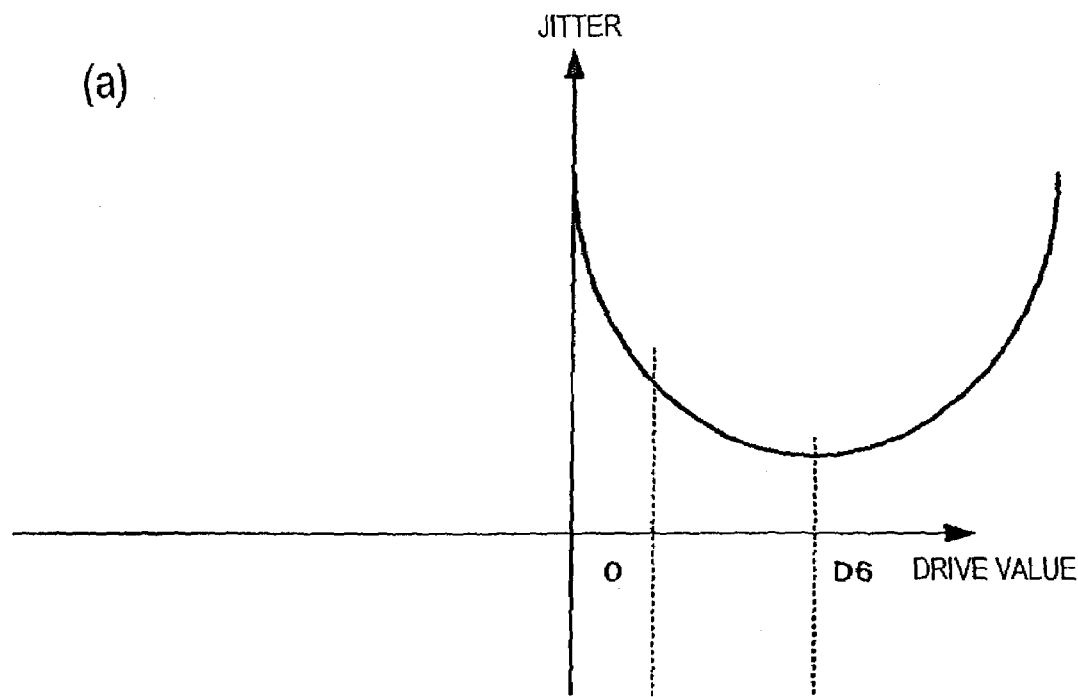
(b)
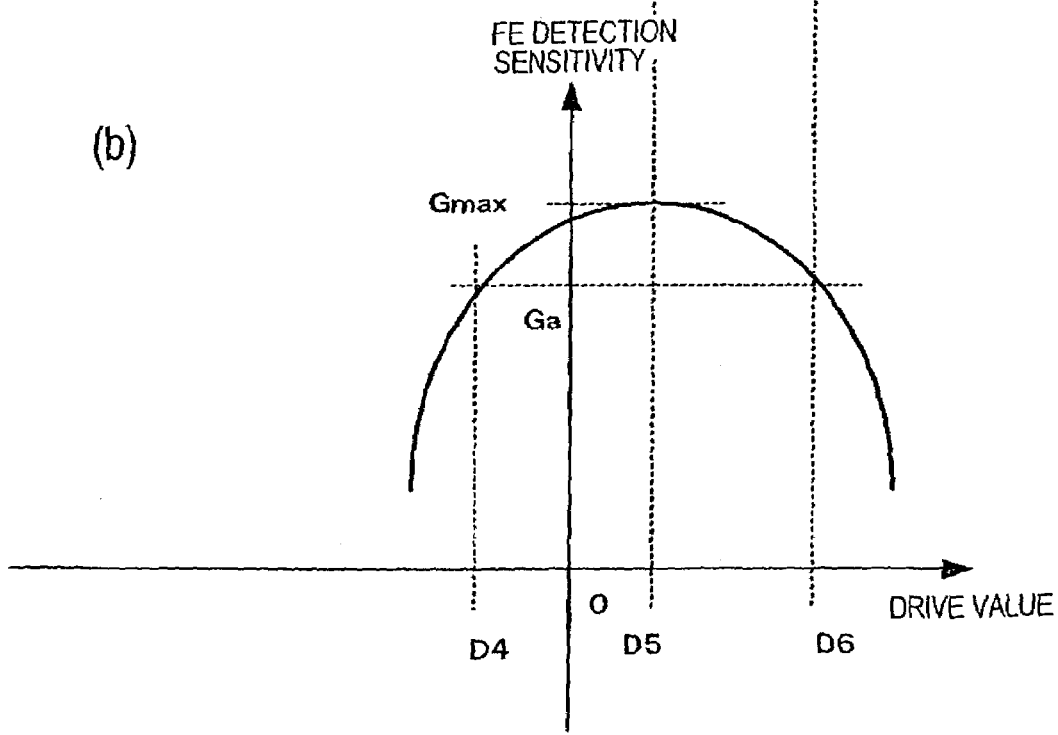

FIG.50
(a)
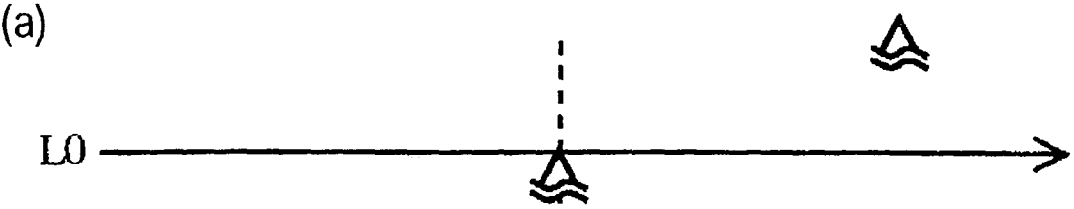
L0
(b)
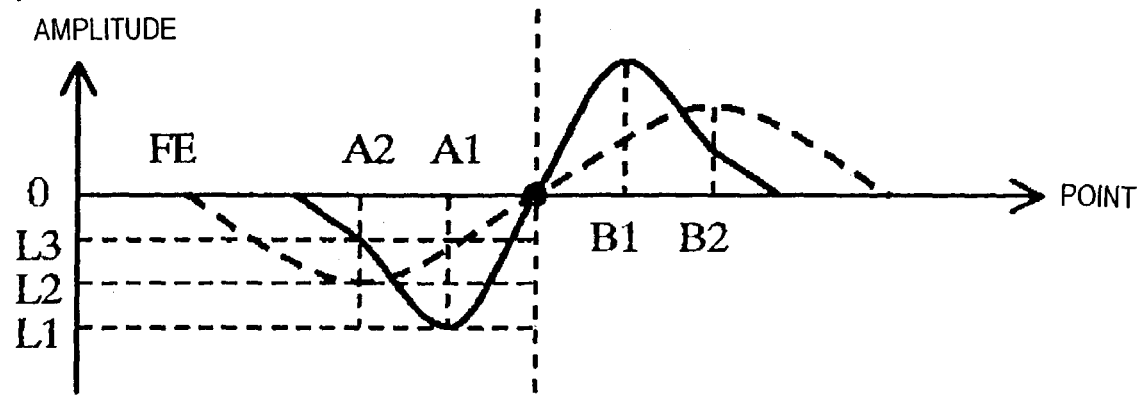
(c)
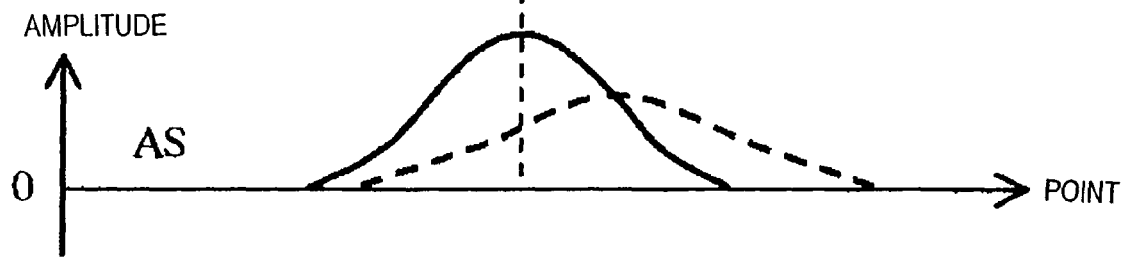

FIG.56
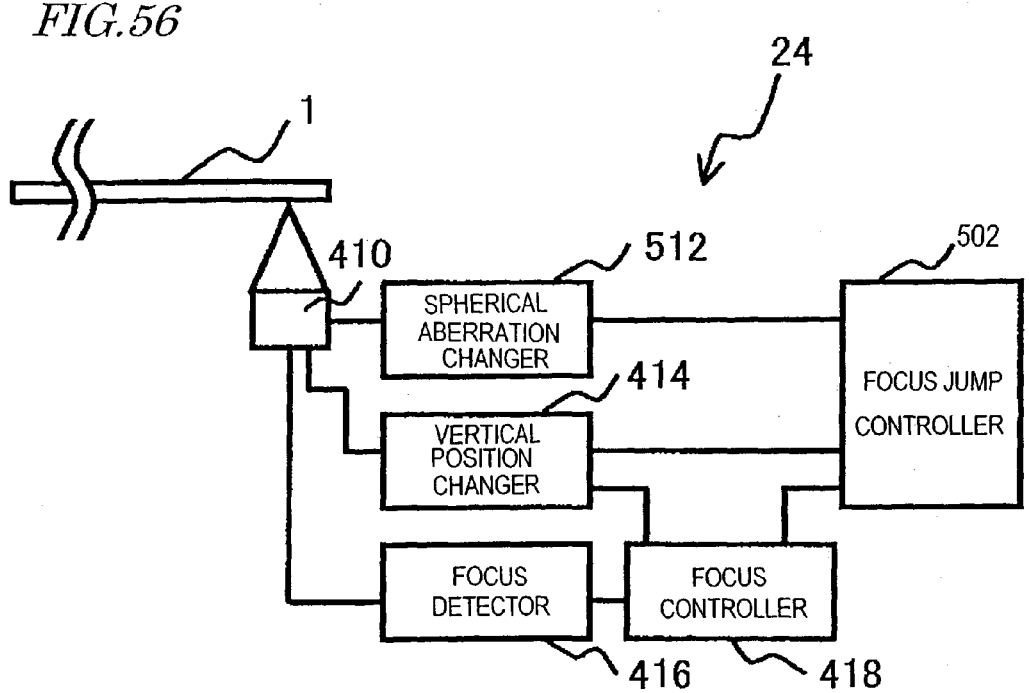
FIG.57
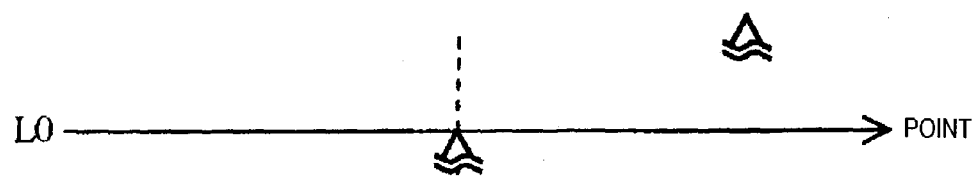
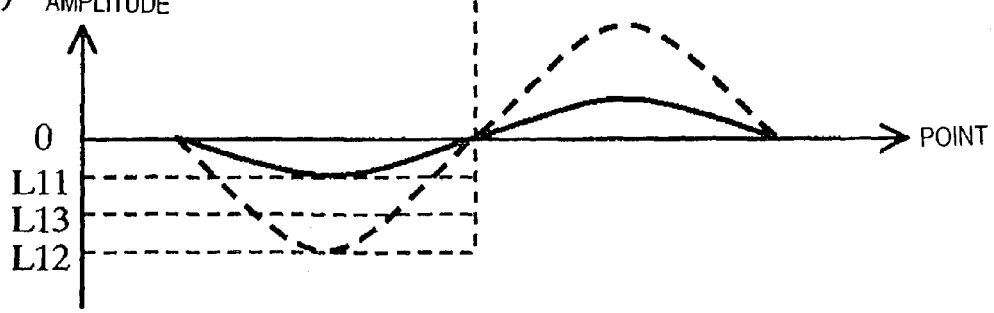

METHOD OF MOVING A BEAM SPOT BETWEEN INFORMATION STORAGE LAYERS OF AN OPTICAL DISK

BACKGROUND OF THE INVENTION

1. Field of the Invention

The present invention relates to an optical disc drive for use to read and/or write information from/onto an optical disc by focusing a light beam (e.g., a laser beam emitted from a semiconductor laser diode) on a target track of the disc.

2. Description of the Related Art

Recently, various types of optical discs such as DVDs (digital versatile discs) have been developed as storage media on which a huge amount of information can be stored at a high density. Examples of recordable or writable optical discs include DVD-RAM, DVD-RW, DVD-R, +RW and +R. A read-only optical disc such as a DVD-ROM is also known.

An optical disc includes a number of tracks that are arranged spirally thereon. Each of those tracks is defined as a "land" or a "groove" of a recording film, which has an uneven surface and which is often made of a phase-change-type material, for example. Information is recorded on the recording film, and the information-carrying recording film will be referred to herein as an "information storage layer". The information storage layer is covered with a protective transparent layer.

An optical disc drive may operate in the following manner in writing information on a recordable (or writable) optical disc or in reading information from a read-only optical disc. First, in writing information on a recordable optical disc, the optical disc drive focuses a light beam (e.g., a laser beam that has been emitted from a semiconductor laser diode, for example) onto the information storage layer of a rotating optical disc through the protective coating. In this case, the optical disc drive changes the intensity of the light beam according to the contents of the information to be written while performing a focus control (i.e., such that the light beam is focused right on the information storage layer) and a tracking control (i.e., such that the beam spot can follow the target tracks on the disc) at the same time. As a result, the light beam is reflected from the recording film at various reflectances, thus recording the variation in reflectance as information. On the other hand, in reading information from a read-only optical disc, the optical disc drive receives a light beam, which has been reflected from the optical disc, at a photodetector while performing a focus control (i.e., such that the light beam is focused right on the information storage layer) and a tracking control (i.e., such that the beam spot can follow the target tracks on the disc) at the same time. In accordance with the output of the photodetector, the optical disc drive reads the information.

However, the light beam may be out of focus with the information storage layer of the optical disc, or off the target track on the optical disc, for some reasons. That is to say, the ability of the optical disc drive to gain access to a target location on the optical disc (which will be referred to herein as the "access performance" of the optical disc drive) may deteriorate in numerous situations. Thus, conventional optical disc drives try to minimize such deterioration in access performance by various techniques. Note that "to gain access to a target location on an optical disc" means to read out desired information from, or to write arbitrary information on, the target location on the information storage layer as used herein.

For example, Japanese Laid-Open Publication No. 2002-140825 discloses a technique of allowing focus jumps only in focus-jumpable areas of an optical disc by collecting management data about the past focus jumps. That is to say, if the optical disc has an area in which an attempted focus jump failed due to a vertical deviation of the optical disc, then that area is classified as a non-focus-jumpable area. On the other hand, Japanese Laid-Open Publications No. 2002-157750 and No. 2003-22545 disclose a technique of starting to correct a spherical aberration when or before a focus jump from a first recording layer to a second recording layer is carried out.

In recent years, demands on optical discs with an even higher density or with a further increased capacity have been on the rise. Optical discs with a transparent layer thickness of 0.6 mm have been popularized. To read such optical discs, optical disc drives including a light source that emits a light beam with a wavelength (which will be referred to herein as a "light source wavelength") of 650 nm and an objective lens with a numerical aperture (NA) of 0.6 are now on the market. However, to further increase the density and capacity of optical discs, the transparent layer thickness of the optical disc needs to be further decreased from 0.6 mm to 0.1 mm, for example. On the other hand, when the transparent layer thickness of optical discs is decreased, the objective lens of the optical disc drive needs to have an NA that is greater than 0.6 and the light source thereof needs to emit a light beam with a wavelength that is shorter than 650 nm. Thus, research and development is now carried on to achieve an NA of 0.85 and a light source wavelength of 405 nm.

However, if the objective lens of the optical disc drive has its NA increased and the light source thereof has its wavelength decreased to catch up with the increase in the density and capacity of optical discs, then the optical disc drive may have significantly deteriorated access performance. For example, if the access performance of the optical disc drive is significantly affected by a spherical aberration to be caused by the variation in the transparent layer thickness of optical discs or a vertical deviation (e.g., a flutter) occurring while the optical disc drive is accessing a target location on an optical disc, then the optical disc drive cannot perform the focus and tracking controls accurately enough solely by the conventional techniques. In particular, a spherical aberration caused on a beam spot is proportional to the fourth power of the numerical aperture NA. Accordingly, even if the variation in the transparent layer thickness remains the same, an increase in NA from about 0.6 to about 0.85 changes the spherical aberration greatly. Thus, it is impossible to avoid the deterioration in access performance by the conventional techniques.

SUMMARY OF THE INVENTION

In order to overcome the problems described above, preferred embodiments of the present invention provide an optical disc drive that can constantly gain access to a target location on an optical disc with an increased density or capacity.

An optical disc drive according to a preferred embodiment of the present invention preferably includes a light source, a lens, a focusing section, a spherical aberration corrector, a focus signal generator, a gain calculator and a processor. The light source preferably emits a light beam. The lens preferably converges the light beam that has been emitted from the light source. The focusing section preferably forms a beam spot in a focusing state on the information storage layer by controlling the position of the lens. The spherical aberration corrector preferably changes a spherical aberration with the beam spot in a focusing state according to a drive value of a driving signal supplied to the spherical aberration corrector. The focus signal generator preferably generates a signal representing the focusing state of the beam spot. The gain calculator preferably calculates a loop gain of a focus control system in response to the signal that has been generated by the focus signal generator. The focus control system is preferably defined by the lens, the focusing section, the spherical aberration corrector and the focus signal generator. The processor preferably determines the drive value by the loop gain that has been calculated by the gain calculator.

In one preferred embodiment of the present invention, the processor preferably specifies a drive value that minimizes the spherical aberration by the loop gain.

In another preferred embodiment, the information storage layer preferably includes a track on which information is stored. The optical disc drive preferably further includes a quality evaluator for reading out the information by way of the light beam that has been reflected from the information storage layer and evaluating the quality of a read signal representing the information that has been read out. The processor preferably stores thereon data representing a table of correspondence between the drive value of the driving signal to be supplied to the spherical aberration corrector, which optimizes the quality of the read signal as evaluated by the quality evaluator, and the loop gain that has been calculated by the gain calculator at the drive value, and preferably determines the drive value of the driving signal to be supplied to the spherical aberration corrector by reference to the table of correspondence.

In this particular preferred embodiment, the quality evaluator may evaluate the quality of the read signal by a jitter of the read signal.

In an alternative preferred embodiment, the quality evaluator may also evaluate the quality of the read signal by a bit error rate of the read signal.

In still another preferred embodiment, the focus signal generator preferably generates a focus error signal representing a positional deviation of the beam spot from the information storage layer as measured perpendicularly to the information storage layer. In that case, the focusing section preferably controls the position of the lens perpendicularly to the information storage layer in response to the focus error signal.

An optical disc drive according to a preferred embodiment of the present invention preferably includes a light source, a lens, a focusing section, a spherical aberration corrector, a focus signal generator, a gain calculator and a processor. The light source preferably emits a light beam. The lens preferably converges the light beam that has been emitted from the light source. The focusing section preferably forms a beam spot in a focusing state on the information storage layer by controlling the position of the lens. The spherical aberration corrector preferably changes a spherical aberration of the lens with the beam spot in a focusing state according to a drive value of a driving signal supplied to the spherical aberration corrector. The focus signal generator preferably generates a signal representing the focusing state of the beam spot. The gain calculator preferably calculates a loop gain of a focus control system in response to the signal that has been generated by the focus signal generator. The focus control system is defined by the lens, the focusing section, the spherical aberration corrector and the focus signal generator. The processor preferably stores the drive value of the driving signal, which allows the spherical aberration corrector to create a predetermined spherical aberration when supplied thereto, and adjusts the loop gain of the focus control system as calculated by the gain calculator by supplying the driving signal with the drive value to the spherical aberration corrector.

An optical disc drive according to a preferred embodiment of the present invention includes a light source, a lens, a focusing section, an information writing section, and a processor. The light source preferably emits a light beam. The lens preferably converges the light beam that has been emitted from the light source. The focusing section preferably forms a beam spot in a focusing state on the information storage layer by controlling the position of the lens. The spherical aberration detector preferably detects the spherical aberration and outputting a signal representing the magnitude of the spherical aberration. The information writing section preferably writes information on the optical disc by controlling an optical output power of the light beam from the light source. The processor preferably controls an operation of the information writing section according to a level of the signal of the spherical aberration detector.

An optical disc drive according to a preferred embodiment of the present invention preferably includes a light source, a lens, a focusing section, a spherical aberration detector, an information writing section, a spherical aberration corrector, and a processor. The light source preferably emits a light beam. The lens preferably converges the light beam that has been emitted from the light source. The focusing section preferably forms a beam spot in a focusing state on the information storage layer by controlling the position of the lens. The spherical aberration detector preferably detects the spherical aberration and outputting a signal representing the magnitude of the spherical aberration. The information writing section preferably writes information on the optical disc by controlling an optical output power of the light beam from the light source. The spherical aberration corrector preferably changes a spherical aberration of the lens with the beam spot in a focusing state according to a drive value of a driving signal supplied to the spherical aberration corrector. The processor preferably stores a drive value of the driving signal, which allows the spherical aberration corrector to create a predetermined spherical aberration when supplied thereto, and controls an operation of the information writing section, which includes deactivation, according to the drive value of the driving signal to the spherical aberration corrector.

An optical disc drive according to another preferred embodiment of the present invention preferably includes a light source, a lens, a focusing section, a tracking section, a spherical aberration corrector, a tracking signal generator, a gain calculator and a processor. The light source preferably emits a light beam. The lens preferably converges the light beam that has been emitted from the light source. The focusing section preferably forms a beam spot in a focusing state on the information storage layer by controlling the position of the lens. The tracking section preferably adjusts a positional relationship between the beam spot and the track on the information storage layer. The spherical aberration corrector preferably changes a spherical aberration with the beam spot in the focusing state according to a drive value of a driving signal supplied to the spherical aberration corrector. The tracking signal generator preferably generates a signal representing the positional relationship. The gain calculator preferably calculates a loop gain of a tracking control system in response to the signal that has been generated by the tracking signal generator. The tracking control system is preferably defined by the lens, the tracking section, the spherical aberration corrector and the tracking signal generator. The processor preferably determines the drive value by the loop gain that has been calculated by the gain calculator.

In one preferred embodiment of the present invention, the tracking signal generator preferably generates a tracking error signal representing a positional deviation of the beam spot from the track as measured across the track. The tracking section preferably controls the position of the lens across the track in response to the tracking error signal.

An optical disc drive according to another preferred embodiment of the present invention preferably includes a light source, a lens, a focusing section, a tracking section, a spherical aberration corrector, a tracking signal generator, a gain calculator, and a processor. The light source preferably emits a light beam. The lens preferably converges the light beam that has been emitted from the light source. The focusing section preferably forms a beam spot in a focusing state on the information storage layer by controlling the position of the lens. The tracking section preferably adjusts a positional relationship between the beam spot and the track on the information storage layer. The spherical aberration corrector preferably changes a spherical aberration with the beam spot in the focusing state according to a drive value of a driving signal supplied to the spherical aberration corrector. The tracking signal generator preferably generates a signal representing the positional relationship. The gain calculator preferably calculates a loop gain of a tracking control system in response to the signal that has been generated by the tracking signal generator. The tracking control system is defined by the lens, the tracking section, the spherical aberration corrector and the tracking signal generator. The processor preferably stores a drive value of the driving signal, which allows the spherical aberration corrector to create a predetermined spherical aberration when supplied thereto, and adjusts the loop gain of the tracking control system as calculated by the gain calculator by supplying that the drive value of the driving signal to the spherical aberration corrector.

An optical disc drive according to another preferred embodiment of the present invention preferably includes a light source, a lens, a focusing section, a spherical aberration detector and a processor. The light source preferably emits a light beam. The lens preferably converges the light beam that has been emitted from the light source. The focusing section preferably forms a beam spot in a focusing state on the information storage layer by controlling the position of the lens. The tracking section preferably adjusts a positional relationship between the beam spot and the track on the information storage layer. The spherical aberration detector preferably detects the spherical aberration with the beam spot in the focusing state, and outputs a signal representing a magnitude of the spherical aberration. The processor preferably controls an operation of the tracking section according to a level of the output signal of the spherical aberration detector.

Another preferred embodiment of the present invention provides a method of moving a beam spot from a first one of multiple information storage layers of an optical disc to a second one thereof by using an optical disc drive. The multiple information storage layers of the optical disc, including the first and second information storage layers, are preferably stacked one upon the other and each preferably include a track thereon. The optical disc drive preferably includes: a light source for emitting a light beam toward the optical disc; a lens for converging the light beam that has been emitted from the light source and forming a beam spot of the light beam on a selected one of the multiple information storage layers; a lens position changer for adjusting the position of the lens perpendicularly to the information storage layers; a focusing section for forming a focused beam spot on the selected information storage layer; a spherical aberration corrector for changing a spherical aberration of the beam spot according to a drive value of a driving signal supplied to the spherical aberration corrector; and a spherical aberration detector for detecting the spherical aberration and outputting a signal representing the magnitude of the spherical aberration. The method preferably includes the steps of: finding an ideal drive value of the driving signal that will minimize the spherical aberration at a focal point on the second information storage layer; changing the spherical aberration on the first information storage layer by driving the spherical aberration corrector with the ideal drive value of the driving signal supplied thereto; jumping the beam spot from the first information storage layer to the second information storage layer by driving the lens position changer; and forming a focused beam spot on the second information storage layer by driving the focusing section.

Another preferred embodiment of the present invention also provides a method of moving a beam spot from a first one of multiple information storage layers of an optical disc to a second one thereof by using an optical disc drive. The multiple information storage layers of the optical disc, including the first and second information storage layers, are preferably stacked one upon the other and each preferably include a track thereon. The optical disc drive preferably includes: a light source for emitting a light beam toward the optical disc; a lens for converging the light beam that has been emitted from the light source and forming a beam spot of the light beam on a selected one of the multiple information storage layers; a focusing section for forming a focused beam spot on the selected information storage layer by controlling the position of the lens; a spherical aberration corrector for changing a spherical aberration of the beam spot according to a drive value of a driving signal supplied to the spherical aberration corrector; and a spherical aberration detector for detecting the spherical aberration and outputting a signal representing the magnitude of the spherical aberration. The method preferably includes the steps of: finding a first drive value of the driving signal that will minimize the spherical aberration at a focal point on the first information storage layer and a second drive value of the driving value that will minimize the spherical aberration at a focal point on the second information storage layer; changing the spherical aberration on the first information storage layer by driving the spherical aberration corrector with the average of the first and second drive values of the driving signal supplied thereto; jumping the beam spot from the first information storage layer to the second information storage layer by driving the lens; and forming a focused beam spot on the second information storage layer by driving the focusing section.

Another preferred embodiment of the present invention provides a method of moving a beam spot from a first one of multiple information storage layers of an optical disc to a second one thereof by using an optical disc drive. The multiple information storage layers of the optical disc, including the first and second information storage layers, are preferably stacked one upon the other and each preferably include a track thereon. The optical disc drive preferably includes: a light source for emitting a light beam toward the optical disc; a lens for converging the light beam that has been emitted from the light source and forming a beam spot of the light beam on a selected one of the multiple information storage layers; a lens position changer for adjusting the position of the lens perpendicularly to the information storage layers; a focusing section for forming a focused beam spot on the selected information storage layer; a spherical aberration corrector for changing a spherical aberration of the beam spot according to a drive value of a driving signal supplied to the spherical aberration corrector; and a spherical aberration detector for detecting the spherical aberration and outputting a signal representing the magnitude of the spherical aberration. The method preferably includes the steps of: jumping the beam spot from the first information storage layer to the second information storage layer by driving the lens position changer; forming a focused beam spot on the second information storage layer by driving the focusing section; finding an ideal drive value of the driving signal that will minimize the spherical aberration on the second information storage layer based on the output of the spherical aberration detector; and changing the spherical aberration on the second information storage layer by driving the spherical aberration corrector with the ideal drive value of the driving signal supplied thereto.

In one preferred embodiment of the present invention, the optical disc drive preferably includes a focus error detector for detecting a positional deviation of the beam spot from the selected information storage layer as measured perpendicularly to the information storage layers and outputting a focus error signal representing the deviation. The method preferably includes the step of changing at least one of a gain and an offset of the focus error signal generated by the focus error detector.

Another preferred embodiment of the present invention also provides a method of moving a beam spot from a first one of multiple information storage layers of an optical disc to a second one thereof by using an optical disc drive. The multiple information storage layers of the optical disc, including the first and second information storage layers, are preferably stacked one upon the other and each preferably include a track thereon. The optical disc drive preferably includes: a light source for emitting a light beam toward the optical disc; a lens for converging the light beam that has been emitted from the light source and forming a beam spot of the light beam on a selected one of the multiple information storage layers; a lens position changer for adjusting the position of the lens perpendicularly to the information storage layers; a focusing section for forming a focused beam spot on the selected information storage layer; a focus error detector for detecting a positional deviation of the beam spot from the selected information storage layer as measured perpendicularly to the information storage layers and outputting a focus error signal representing the deviation; a spherical aberration corrector for adjusting the focusing state of the beam spot by changing a spherical aberration of the lens according to a drive value of a driving signal supplied to the spherical aberration corrector; and a spherical aberration detector for detecting the spherical aberration and outputting a signal representing the magnitude of the spherical aberration. The method preferably includes the steps of: finding an ideal drive value of the driving signal that will minimize the spherical aberration at a focal point on the second information storage layer; changing the spherical aberration on the first information storage layer by driving the spherical aberration corrector with the ideal drive value of the driving signal supplied thereto; changing the gain and/or offset of the focus error signal that has been generated by the focus error detector; jumping the beam spot from the first information storage layer to the second information storage layer by driving the lens position changer in response to the focus error signal that has been output after the gain and/or offset has been changed; and forming a focused beam spot on the second information storage layer by driving the focusing section.

Another preferred embodiment of the present invention also provides a method of moving a beam spot from a first one of multiple information storage layers of an optical disc to a second one thereof by using an optical disc drive. The multiple information storage layers of the optical disc, including the first and second information storage layers, are preferably stacked one upon the other and each preferably include a track thereon. The optical disc drive preferably includes: a light source for emitting a light beam toward the optical disc; a lens for converging the light beam that has been emitted from the light source and forming a beam spot of the light beam on a selected one of the multiple information storage layers; a lens position changer for adjusting the position of the lens perpendicularly to the information storage layers; a focusing section for forming a focused beam spot on the selected information storage layer; a focus error detector for detecting a positional deviation of the beam spot from the selected information storage layer as measured perpendicularly to the information storage layers and outputting a focus error signal representing the deviation; a spherical aberration corrector for adjusting the focusing state of the beam spot by changing a spherical aberration of the lens according to a drive value of a driving signal supplied to the spherical aberration corrector; and a spherical aberration detector for detecting the spherical aberration and outputting a signal representing the magnitude of the spherical aberration. The method preferably includes the steps of: finding a first drive value of the driving signal that will minimize the spherical aberration at a focal point on the first information storage layer and a second drive value of the driving signal that will minimize the spherical aberration at a focal point on the second information storage layer; changing the spherical aberration on the first information storage layer by driving the spherical aberration corrector with the average of the first and second drive values of the driving signal supplied thereto; changing the gain and/or offset of the focus error signal that has been generated by the focus error detector; jumping the beam spot from the first information storage layer to the second information storage layer by driving the lens position changer in response to the focus error signal that has been output after the gain and/or offset has been changed; forming a focused beam spot on the second information storage layer by driving the focusing section; finding a third drive value of the driving signal that will minimize the spherical aberration on the second information storage layer by reference to the output of the spherical aberration detector; and changing the spherical aberration on the second information storage layer by driving the spherical aberration corrector with the third drive value of the driving signal supplied thereto.

In still another preferred embodiment, the method may further include the step of changing settings of a focus control system, which is defined by the lens, the focusing section and the spherical aberration corrector, and a correction value of the spherical aberration corrector synchronously with each other.

In yet another preferred embodiment, the optical disc drive may further include a tracking error detector for detecting a positional deviation of the beam spot of the light beam, which has been emitted toward the optical disc, from the track and outputting a tracking error signal representing the deviation. If the tracking error signal has amplitude that is equal to or smaller than a predetermined value, the method preferably further includes the step of jumping the beam spot again.

In yet another preferred embodiment, the optical disc drive may further include a tracking section for controlling a positional relationship between the beam spot and the track on the selected information storage layer. If the tracking section is performing an abnormal control operation, the method preferably further includes the step of jumping the beam spot again.

Another preferred embodiment of the present invention also provides a method of moving a beam spot from a first one of multiple information storage layers of an optical disc to a second one thereof by using an optical disc drive. The multiple information storage layers of the optical disc, including the first and second information storage layers, are preferably stacked one upon the other and each preferably include a track thereon. The optical disc drive preferably includes: a light source for emitting a light beam toward the optical disc; a lens for converging the light beam that has been emitted from the light source and forming a beam spot of the light beam on a selected one of the multiple information storage layers; a focus error detector for detecting a positional deviation of the beam spot from the selected information storage layer as measured perpendicularly to the information storage layers and outputting a focus error signal representing the deviation; a lens position changer for adjusting the position of the lens perpendicularly to the information storage layers; a focusing section for forming a focused beam spot on the selected information storage layer by driving the lens position changer based on the focus error signal of the focus error detector; a spherical aberration corrector for adjusting the focusing state of the beam spot by changing a spherical aberration of the lens according to a drive value of a driving signal supplied to the spherical aberration corrector; a spherical aberration detector for detecting the spherical aberration and outputting a signal representing the magnitude of the spherical aberration; and a processor for determining the drive value of the driving signal supplied to the spherical aberration corrector. The method preferably includes the steps of: controlling an operation of the lens position changer on the first information storage layer from the focusing section; storing displacement of the position of the lens according to a rotational angle of the optical disc; stopping control of the lens position changer from the focusing section; holding the stored displacement by driving the lens position changer; changing the spherical aberration on the second information storage layer by driving the spherical aberration corrector from the processor; finding the optimum value of the spherical aberration on the second information storage layer based on the signal of the spherical aberration corrector; moving a focus of the beam spot closer to the second information storage layer by driving the lens position changer; and starting a control of an operation of the lens position changer from the focusing section based on the focus error signal of the focus error detector.

An optical disc drive according to another preferred embodiment of the present invention is used to gain access to a target location on an optical disc. The optical disc preferably includes multiple information storage layers, which are stacked one upon the other and each of which includes a track thereon. The optical disc drive preferably includes a light source, a lens, and a beam spot controller. The light source preferably emits a light beam toward the optical disc. The lens preferably converges the light beam that has been emitted from the light source and preferably forms a beam spot of the light beam on a selected one of the multiple information storage layers. The beam spot controller preferably moves the beam spot from a first track on a first one of the information storage layers to a second track on a second one of the information storage layers by controlling the position of the lens. If the second track is located closer to an outer edge of the optical disc than the first track is, then the beam spot controller preferably forms the beam spot on the second information storage layer by focusing the light beam thereon and then shifts the beam spot outward on the second information storage layer until the beam spot reaches the second track. On the other hand, if the second track is located closer to an inner edge of the optical disc than the first track is, then the beam spot controller preferably shifts the beam spot inward on the first information storage layer and then forms the beam spot on the second track on the second information storage layer by focusing the light beam thereon.

In one preferred embodiment of the present invention, the optical disc drive preferably further includes a rotator for rotating the optical disc at a predetermined rotational speed. If the second track is located closer to the outer edge of the optical disc than the first track is, the beam spot controller preferably forms the beam spot on the second information storage layer while instructing the rotator to rotate the optical disc at a first rotational speed that is lower than the predetermined rotational speed. On the other hand, if the second track is located closer to the inner edge of the optical disc than the first track is, the beam spot controller preferably forms the beam spot on the second track on the second information storage layer and then instructs the rotator to rotate the optical disc at a second rotational speed that is higher than the predetermined rotational speed.

In this particular preferred embodiment, the first and second rotational speeds preferably each change with the specific location of the second track on the optical disc.

In another preferred embodiment, the beam spot controller preferably instructs the rotator to stop rotating the optical disc once and then rotate the optical disc at the first rotational speed that is lower than the predetermined rotational speed.

In still another preferred embodiment, if the beam spot controller has failed to jump the beam spot over to the second information storage layer, then the beam spot controller may control the position of the lens, thereby focusing the light beam, emitted from the light source, onto the second information storage layer.

In an alternative preferred embodiment, if the beam spot controller has failed to jump the beam spot over to the second information storage layer, then the beam spot controller may control the position of the lens such that the light beam, emitted from the light source, is focused onto the first information storage layer, and then control the position of the lens again, thereby moving the beam spot to the second track on the second information storage layer.

In another alternative preferred embodiment, if the beam spot controller has failed to jump the beam spot over to the second information storage layer, then the beam spot controller may shift the beam spot from the first track to a location that is closer to the inner edge of the optical disc than the first track is, and then jump the beam spot over to the second information storage layer.

In yet another preferred embodiment, the optical disc drive preferably further includes a rotator for rotating the optical disc at a predetermined rotational speed. If the beam spot controller has failed to jump the beam spot over to the second information storage layer, then the beam spot controller may instruct the rotator to rotate the optical disc at a rotational speed that is lower than the predetermined rotational speed and then jump the beam spot over to the second information storage layer.

An optical disc drive according to another preferred embodiment of the present invention is used to gain access to a target location on an optical disc. The optical disc preferably includes multiple information storage layers, which are stacked one upon the other and each of which includes a track thereon. The optical disc drive preferably includes a light source, a lens, and a beam spot controller. The light source preferably emits a light beam toward the optical disc. The lens preferably converges the light beam that has been emitted from the light source and preferably forms a beam spot of the light beam on a selected one of the multiple information storage layers. The beam spot controller preferably moves the beam spot from a first track on a first one of the information storage layers to a second track on a second one of the information storage layers by controlling the position of the lens. If the first track is located outside of a range that is defined by a predetermined distance as measured from the center of rotation of the optical disc, then the beam spot controller preferably shifts the beam spot inward on the first information storage layer such that the beam spot enters that range, forms the beam spot on the second information storage layer by focusing the light beam thereon, and then shifts the beam spot outward on the second information storage layer until the beam spot reaches the second track.

An optical disc drive according to another preferred embodiment of the present invention is used to gain access to a target location on an optical disc. The optical disc preferably includes multiple information storage layers, which are stacked one upon the other and each of which includes a track thereon. The optical disc drive preferably includes a light source, a lens, and a beam spot controller. The light source preferably emits a light beam toward the optical disc. The lens preferably converges the light beam that has been emitted from the light source and preferably forms a beam spot of the light beam on a selected one of the multiple information storage layers. The beam spot controller preferably moves the beam spot from a first track on a first one of the information storage layers to a second track on a second one of the information storage layers by controlling the position of the lens. If the first track and the second track are located inside of a range that is defined by a predetermined distance as measured from the center of rotation of the optical disc, then the beam spot controller preferably shifts the beam spot on the first information storage layer to a location corresponding to the second track, and then forms the beam spot on the second track on the second information storage layer by focusing the light beam thereon.

An optical disc drive according to another preferred embodiment of the present invention is used to gain access to a target location on an optical disc. The optical disc preferably includes multiple information storage layers, which are stacked one upon the other and each of which includes a track thereon. The optical disc drive preferably includes a rotator, a light source, a lens, and a beam spot controller. The rotator preferably rotates the optical disc at a predetermined rotational speed. The light source preferably emits a light beam toward the optical disc. The lens preferably converges the light beam that has been emitted from the light source and preferably forms a beam spot of the light beam on a selected one of the multiple information storage layers. The beam spot controller preferably jumps the beam spot from a first one of the information storage layers to a second one of the information storage layers by controlling the position of the lens. The beam spot controller preferably forms the beam spot on the second information storage layer while instructing the rotator to rotate the optical disc a rotational speed that is lower than the predetermined rotational speed.

An optical disc drive according to another preferred embodiment of the present invention is used to gain access to a target location on an optical disc. The optical disc preferably includes multiple information storage layers, which are stacked one upon the other and each of which includes a track thereon. The optical disc drive preferably includes a light source, a lens, a beam spot controller and a spherical aberration corrector. The light source preferably emits a light beam toward the optical disc. The lens preferably converges the light beam that has been emitted from the light source and preferably forms a beam spot of the light beam on a selected one of the multiple information storage layers. The beam spot controller preferably jumps the beam spot from a first one of the information storage layers to a second one of the information storage layers by controlling the position of the lens. The spherical aberration corrector preferably adjusts the focusing state of the beam spot by changing the spherical aberration of the lens. The spherical aberration corrector preferably holds a first spherical aberration associated with the first information storage layer, and then corrects the first spherical aberration into a second spherical aberration, associated with the second information storage layer, after the beam spot controller has jumped the beam spot over to the second information storage layer.

In one preferred embodiment of the present invention, while the beam spot controller is jumping the beam spot over to the second information storage layer, the spherical aberration corrector preferably provides a third spherical aberration, which is different from the first and second spherical aberrations.

In this particular preferred embodiment, the third spherical aberration is preferably associated with a focal point to be obtained by moving the beam spot in the opposite direction to that defined from the first information storage layer to the second information storage layer.

In another preferred embodiment, the third spherical aberration is preferably associated with a focal point that is located between the first and second information storage layers.

In still another preferred embodiment, the optical disc drive preferably further includes a focus detector for generating a signal representing the focusing state of the beam spot on the optical disc. The beam spot controller preferably adjusts the gain of the signal that has been generated by the focus detector and then jumps the beam spot from the first information storage layer to the second information storage layer.

In yet another preferred embodiment, the beam spot controller preferably controls the position of the lens both parallelly and perpendicularly to the multiple information storage layers.

An optical disc drive according to another preferred embodiment of the present invention is used to gain access to a target location on an optical disc. The optical disc preferably includes multiple information storage layers, which are stacked one upon the other and each of which includes a track thereon. The optical disc drive preferably includes a light source, a lens, a beam spot controller and a spherical aberration corrector. The light source preferably emits a light beam toward the optical disc. The lens preferably converges the light beam that has been emitted from the light source and preferably forms a beam spot of the light beam on a selected one of the multiple information storage layers. The beam spot controller preferably jumps the beam spot from a first one of the information storage layers to a second one of the information storage layers by controlling the position of the lens. The spherical aberration corrector preferably adjusts the focusing state of the beam spot by changing the spherical aberration of the lens. The spherical aberration corrector preferably holds a first spherical aberration associated with the first information storage layer, and then corrects the first spherical aberration into a second spherical aberration, associated with the second information storage layer, while the beam spot controller is jumping the beam spot over to the second information storage layer.

Another preferred embodiment of the present invention provides a computer program executable by an optical disc drive for gaining access to a target location on an optical disc. The optical disc preferably includes multiple information storage layers, which are stacked one upon the other and each of which includes a track thereon. The program preferably includes the steps of: getting a light beam emitted from a light source toward the optical disc; getting the light beam, which has been emitted from the light source, converged by a lens and forming a beam spot of the light beam on a selected one of the multiple information storage layers; and moving the beam spot from a first track on a first one of the information storage layers to a second track on a second one of the information storage layers by controlling the position of the lens. If the second track is located closer to an outer edge of the optical disc than the first track is, then the step of moving the beam spot preferably includes the step of forming the beam spot on the second information storage layer by focusing the light beam thereon and then shifting the beam spot outward on the second information storage layer until the beam spot reaches the second track. On the other hand, if the second track is located closer to an inner edge of the optical disc than the first track is, then the step of moving the beam spot preferably includes the step of shifting the beam spot inward on the first information storage layer and then forming the beam spot on the second track on the second information storage layer by focusing the light beam thereon.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 4 is a graph showing how the FE signal changes its level with the focus error of the light beam 113 from the information storage layer of the optical disc 100.

FIG. 7 is a flowchart showing how the optical disc drive 11 carries out a spherical aberration correcting process.

FIG. 8 is a block diagram showing a configuration for an optical disc drive 12 according to a second specific preferred embodiment of the present invention.

FIG. 11 shows graphs of jitter and FE detection sensitivity with respect to drive values. (a) and (b) are graphs respectively showing how jitter and FE detection sensitivity change with drive values of the driving signal supplied to the corrector 105 at a target track.

FIG. 50 shows detection signal ranges in which a focusing control can be carried out in the twelfth preferred embodiment.

FIG. 56 is a block diagram showing the functional configuration of an optical disc drive 24 according to a thirteenth specific preferred embodiment of the present invention.

FIG. 57 show how the gain of an FE signal changes with the position of the beam spot in the thirteenth preferred embodiment.

DETAILED DESCRIPTION OF PREFERRED EMBODIMENTS

Figure 1A:
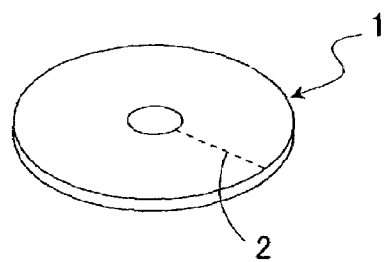
FIG. 1A is a perspective view illustrating the appearance of an optical disc 1.

Hereinafter, preferred embodiments of the present invention will be described with reference to the accompanying drawings. It should be noted that components appearing in multiple different drawings but having substantially the same function or structure and performing almost the same operation will be identified by the same reference numeral. Before specific preferred embodiments of an optical disc drive according to the present invention are described in detail, an optical disc, from/on which information is read or written by the optical disc drive, will be described.

FIG. 1A is a perspective view illustrating the appearance of an optical disc 1. The optical disc 1 is a disklike storage medium, on which information is recorded by being exposed to an optical radiation (e.g., a laser beam) or from which the stored information is read out. In the preferred embodiments, a light beam with predetermined wavelength that may be either about 680 nm or less or about 410 nm or less (e.g., about 405 nm) is used as an example of the optical radiation. The light beam comes from under one side of the disc 1. The information is recorded on a recording film, which is typically made of a phase-change-type material, for example. Thus, the recording film will be referred to herein as an "information storage layer". The information storage layer has a predetermined reflectance and reflects the light received thereon.

Figure 1B:
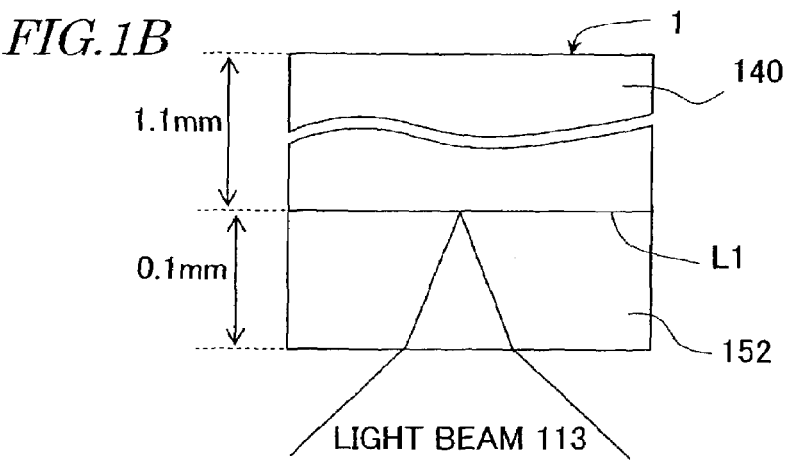
FIG. 1B is a cross-sectional views illustrating an optical disc 1 with an information storage layer.
Figure 1C:
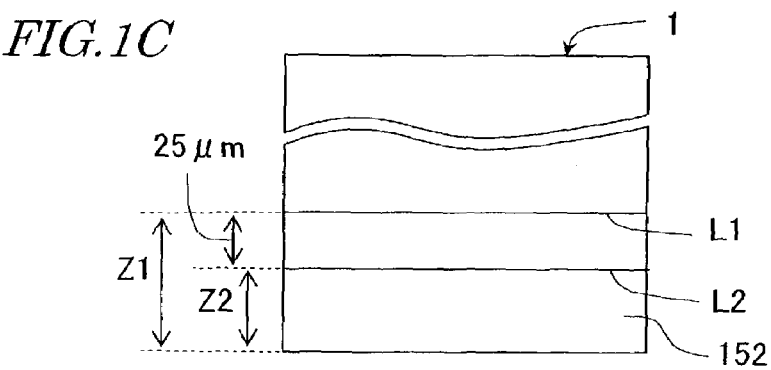
FIG. 1C is a cross-sectional views illustrating an optical disc 1 with two information storage layers.
Figure 1D:
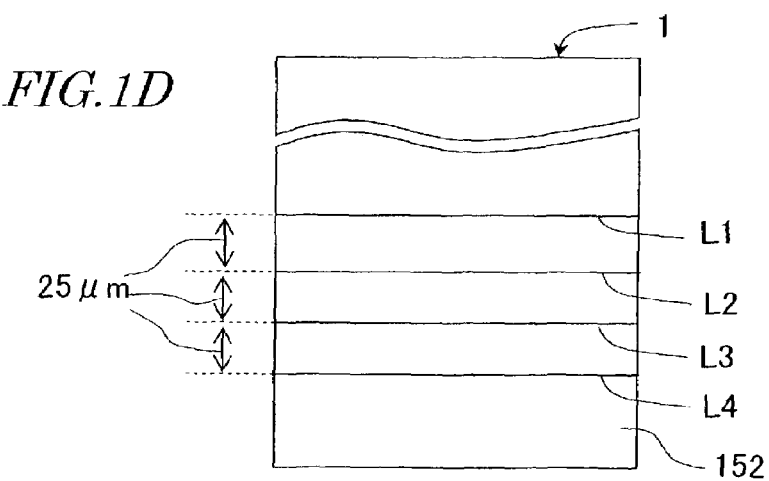
FIG. 1D is a cross-sectional views illustrating an optical disc 1 with four information storage layers.

FIGS. 1B, 1C and 1D are cross-sectional views (taken in the disc radial direction 2 shown in FIG. 1A) illustrating optical discs 1 with mutually different numbers of information storage layers. Specifically, the optical disc 1 shown in FIG. 1B has just one information storage layer L1. The optical disc 1 shown in FIG. 1C has two information storage layers L1 and L2. And the optical disc 1 shown in FIG. 1D has four information storage layers L1, L2, L3 and L4. It should be noted that the number of information storage layers that an optical disc can have is not limited to those illustrated in FIGS. 1B, 1C and 1D. Thus, the optical disc 1 may naturally have three information storage layers or even five or more information storage layers if the gap between them is narrowed.

The optical disc 1 shown in FIG. 1B is formed by stacking a substrate 140 with the information storage layer L1 on a transparent layer 152. The optical disc 1 may have an overall thickness of about 1.2 mm. Specifically, the substrate 140 may have a thickness of about 1.1 mm and the transparent layer 152 may have a thickness of about 0.1 mm (i.e., about 100 μm). The storage capacity of the information storage layer L1 may be about 25 gigabytes, for example. In the optical discs 1 with multiple information storage layers, the gap between each adjacent pair of information storage layers may be about 25 μm as shown in FIGS. 1C and 1D.

Figure 2:
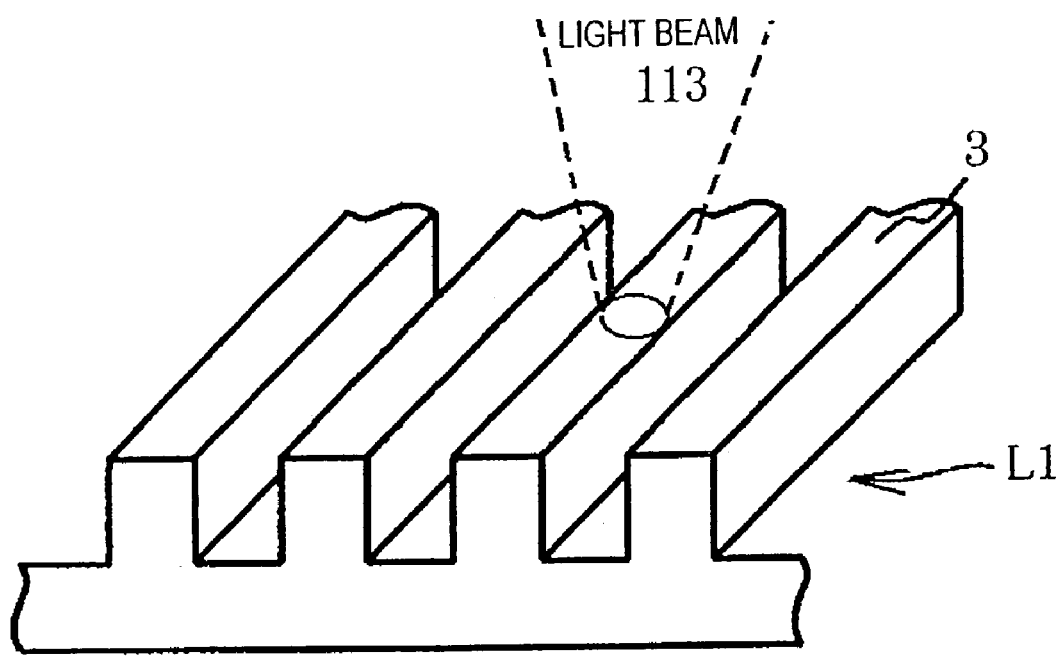
FIG. 2 is a perspective view illustrating how a beam spot of a light beam 113 is formed on an information storage layer L1.

The operation of gaining access to a target location on the optical disc 1, i.e., reading or writing information from/onto the optical disc 1, may be carried out by emitting and focusing a light beam 113 toward the information storage layer L1 from under the surface of the transparent layer 152. That is to say, the light beam 113 is transmitted through transparent layer 152. FIG. 2 is a perspective view illustrating how a beam spot of the light beam 113 is formed on the information storage layer L1. As shown in FIG. 2, the information storage layer L1 includes multiple tracks 3 thereon. Each of those tracks 3 is defined as a land or a groove of a recording film with an uneven surface. The gap between two adjacent lands or grooves may be about 0.32 μm, for example. Although not clear from FIG. 2, the tracks 3 are arranged spirally.

Hereinafter, preferred embodiments of an optical disc drive according to the present invention, which is designed to accept any of these optical discs 1, will be described in detail. Specifically, the following first through eighth preferred embodiments of the present invention relate to the technique of forming a beam spot on an optical disc just as intended while correcting a spherical aberration to be caused by a variation in the thickness of the transparent layer of the optical disc. It is particularly important to get an optical disc with multiple information storage layers ready to read or write information therefrom or thereon constantly by correcting the spherical aberration. This is because in such an optical disc, all of those information storage layers are affected by the spherical aberration. On the other hand, ninth through thirteenth preferred embodiments of the present invention to be described later will relate to the technique of jumping a beam spot from one of multiple information storage layers to another in an optical disc. Since an optical disc does flutter, it is also important to perform the read and write operations constantly with the effects of the flutter fully taken into account.

Embodiment 1

Figure 3:
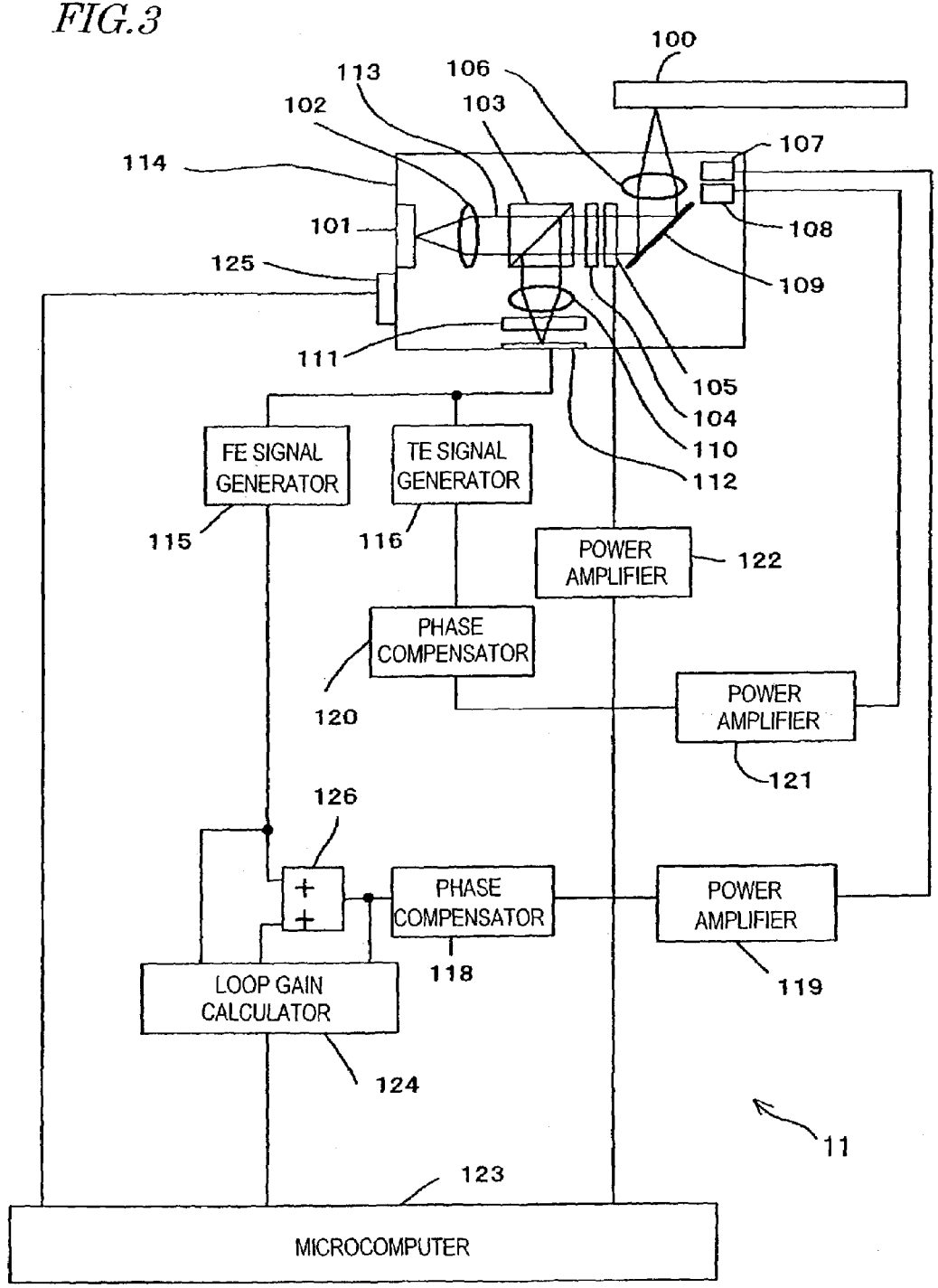
FIG. 3 is a block diagram showing a configuration for an optical disc drive 11 according to a first specific preferred embodiment of the present invention.

FIG. 3 is a block diagram showing a configuration for an optical disc drive 11 according to a first specific preferred embodiment of the present invention. The optical disc drive 11 is designed to correct the spherical aberration of a beam spot on the information storage layer of an optical disc 100 based on the loop gain of a focus control system. The optical disc 100 may be the same as the optical disc 1 shown in FIG. 1B. That is to say, in this preferred embodiment, the optical disc 100 has just one information storage layer as shown in FIG. 1B. Strictly speaking, the optical disc 100 does not belong to the optical disc drive 11. However, the optical disc 100 is also shown in FIG. 3 along with the members of the optical disc drive 11 for convenience sake.

Hereinafter, the respective members of the optical disc drive 11 will be described. As shown in FIG. 3, the optical disc drive 11 includes an optical head 114, a focus error (FE) signal generator 115, a tracking error (TE) signal generator 116, phase compensators 118 and 120, power amplifiers 119, 121 and 122, a microcomputer 123, a loop gain calculator 124, an adder 126 and a motor (not shown) for rotating the optical disc 100 at a predetermined rotating speed. Actually, the optical disc drive 11 further includes a signal processor and other circuits for use to process either information to be written on the optical disc 100 or information that has been read out from the optical disc 100. However, those circuits are not key components to the present invention and the description and illustration thereof will be omitted herein.

The optical disc drive 11 roughly includes the three control sections of: a focus control section, a tracking control section and a spherical aberration control section. The focus control section performs a control operation in such a manner that the light beam is focused right on the information storage layer of the optical disc 100. The focus control section includes a photodetector 112, the FE signal generator 115, the phase compensator 118, the power amplifier 119, and a focus actuator 107. The tracking control section performs a control operation in such a manner that the beam spot of the light beam 113 on the optical disc 100 satisfies a predetermined positional relationship with a track on the optical disc 100. The tracking control section includes the photodetector 112, the TE signal generator 116, the phase compensator 120, the power amplifier 121 and a tracking actuator 108. The spherical aberration control section carries out a control operation in such a manner as to minimize the spherical aberration of the light beam 113 on the optical disc 100 or to retain a predetermined condition of the spherical aberration. The "spherical aberration" will be described in further detail later. The spherical aberration control section includes the loop gain calculator 124, the power amplifier 122 and a spherical aberration corrector 105. As will be described later, the microcomputer 123 regulates the operations of these control sections. That is to say, the respective components of each control section operate under the control of the microcomputer 123. Thus, the microcomputer 123 may also be regarded as forming an integral part of each control section.

Hereinafter, the respective components of each of these three control sections will be described. The optical head 114 emits a light beam such as a laser beam toward the optical disc 100 and then detects the light beam that has been reflected from the optical disc 100. The optical head 114 is attached to, and driven by, a transport motor 125 to move in the radial direction of the disc 100. The transport motor 125 is controlled by the microcomputer 123. The optical head 114 includes a light source 101, a coupling lens 102, a polarization beam splitter 103, a quarter wave plate 104, the spherical aberration corrector 105, a totally reflecting mirror 109, the photodetector 112, a detector lens 110, a cylindrical lens 111, the focus actuator 107, the tracking actuator 108 and an objective lens 106. The functions of some members of this optical head 114 will be clearly understandable from the following description.

The light source 101 emits a light beam 113 such as a violet laser beam. The coupling lens 102 collimates the light beam 113 into a parallel beam. This parallel beam is transmitted through the polarization beam splitter 103, quarter wave plate 104 and spherical aberration corrector 105, reflected by the totally reflecting mirror 109, and then focused by the objective lens 106 onto the information storage layer of the optical disc 100. The focused light beam appears as a beam spot on the information storage layer.

Thereafter, the light beam 113 is reflected from the information storage layer of the optical disc 100, transmitted through the objective lens 106, reflected again by the totally reflecting mirror 109, passed through the spherical aberration corrector 105, quarter wave plate 104, polarization beam splitter 103, detector lens 110 and cylindrical lens 111 and then incident onto the photodetector 112. The objective lens 106 is attached to movable portions of the focus actuator 107 and tracking actuator 108.

The focus actuator 107 includes a focusing coil and a focusing permanent magnet. When the power amplifier 119 applies a voltage to the focusing coil of the focus actuator 107, current flows through the coil. As a result, a magnetic field is applied from the focusing permanent magnet to the coil. Consequently, the objective lens 106 moves perpendicularly to the information storage layer of the optical disc 100 (i.e., vertically upward or downward in FIG. 3).

The tracking actuator 108 includes a tracking coil and a tracking permanent magnet. When the power amplifier 121 applies a voltage to the tracking coil of the tracking actuator 108, current flows through the coil. As a result, a magnetic field is applied from the tracking permanent magnet to the coil. Consequently, the objective lens 106 moves in the radial direction of the optical disc 100, or across the tracks on the optical disc 100 (i.e., horizontally in FIG. 3).

When the light beam reflected from the optical disc 100 is incident on the photodetector 112, the light beam is converted into an electric signal representing the location and intensity of the beam spot on the photodetector 112. The output of the photodetector 112 is supplied to the FE signal generator 115 and TE signal generator 116.

The FE signal generator 115 generates a focus error (FE) signal based on the output of the photodetector 112 by a so-called "astigmatism" detecting technique. The astigmatism detecting technique is well known in the art and the description thereof will be omitted herein. The FE signal has a level that is changeable with the deviation of the focal point (i.e., the "focus error") of the light beam 113 from the information storage layer of the optical disc 100 as measured perpendicularly to the information storage layer. FIG. 4 is a graph showing how the FE signal changes its level with the focus error of the light beam 113 from the information storage layer of the optical disc 100. As shown in FIG. 4, when the focus error is equal to zero, the FE signal has zero level. More exactly, FIG. 4 shows an FE signal to be detected from an optical disc with multiple information storage layers. This is because the FE signal shown in FIG. 4 equals zero periodically according to the magnitude of the focus error. This means that as the distance of a focal point from one information storage layer increases, the distance of the same focal point to an adjacent information storage layer decreases. Accordingly, in the optical disc 100 shown in FIG. 3 with just one information storage layer, the FE signal may be regarded as a signal that equals zero only at a point.

The FE signal is supplied to the power amplifier 119 by way of the adder 126 and phase compensator 118. The phase compensator 118 is a filter that causes a phase lead to get the focus control carried out constantly. The output of the phase compensator 118 is amplified by the power amplifier 119, thereby making current flow through the focusing coil of the focus actuator 107. As a result, the optical head 114 drives the objective lens 106 in accordance with the FE signal and controls the focal point of the light beam 113 such that the beam spot of the light beam 113 is always located on the information storage layer.

On the other hand, the TE signal generator 116 generates the tracking error (TE) signal based on the output of the photodetector 112 by a tracking error signal detecting technique that is normally called a "push-pull method". The push-pull method is also well known in the art and the description thereof will be omitted herein. The TE signal represents the deviation of the beam spot from a target track to be accessed on the optical disc 100. The TE signal may have a waveform such as that shown in FIG. 19A or 19B.

The TE signal is supplied to the power amplifier 121 by way of the phase compensator 120. The phase compensator 120 is a filter that causes a phase lead to get the tracking control carried out constantly. The output of the phase compensator 120, is amplified by the power amplifier 121, thereby making current flow through the tracking coil of the tracking actuator 108. As a result, the optical head 114 drives the objective lens 106 in accordance with the TE signal and controls the focal point of the light beam 113 such that the beam spot of the light beam 113 is always located on the target track. The variation in the level of the TE signal with the deviation of the focal point (or beam spot) of the light beam 113 from the target track will be referred to herein as a "TE detection sensitivity".

Figure 5B:
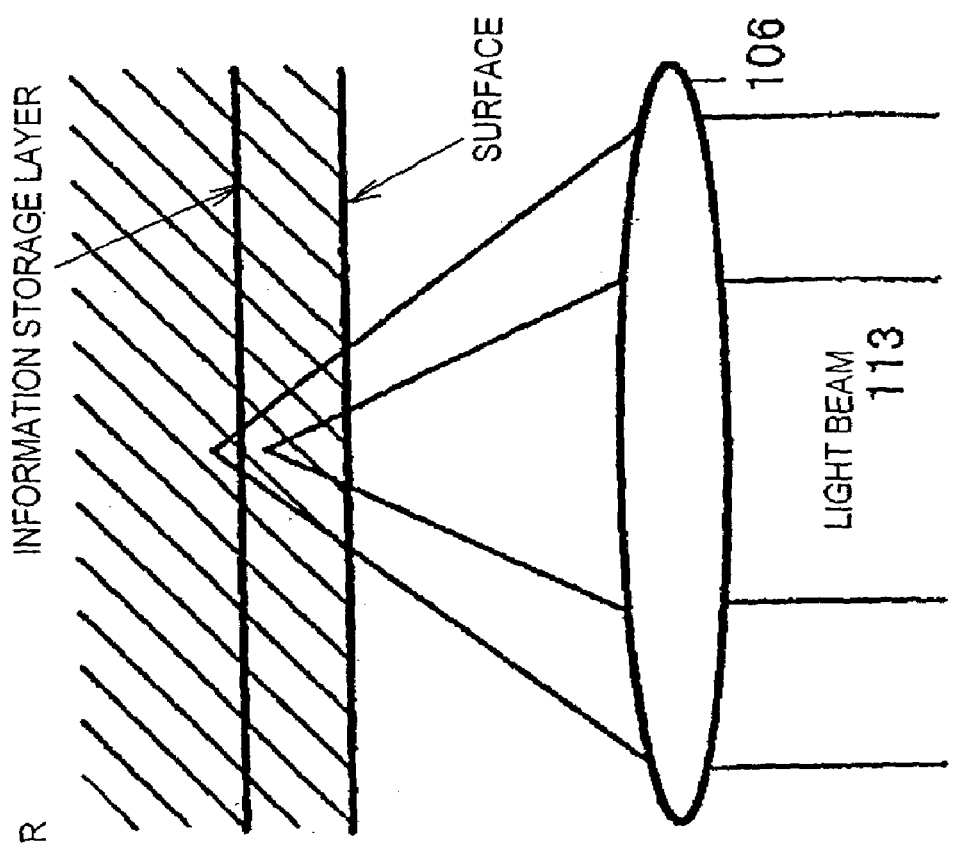
FIG. 5B shows a situation where the spherical aberration is not equal to zero and a light ray passing through an inside portion of an objective lens 106 is out of focus with a light ray passing through an outside portion of the objective lens 106.
Figure 5A:
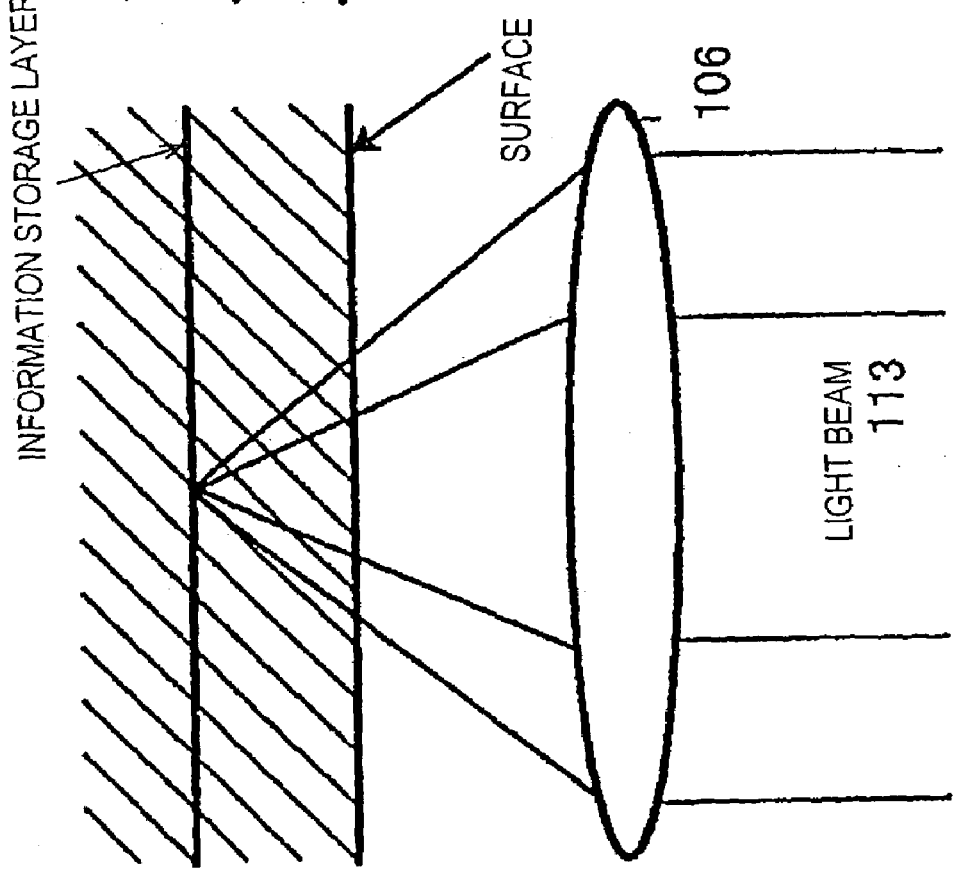
FIG. 5A shows a situation where the spherical aberration is zero and a light ray passing through an inside portion of an objective lens 106 is just in focus with a light ray passing through an outside portion of the objective lens 106.

When the spherical aberration increases at the focal point of the light beam 113, the TE detection sensitivity decreases. As used herein, the "spherical aberration" means the deviation of the focal point of a light ray passing through an inside portion of the objective lens 106 from that of a light ray passing through an outside portion of the objective lens 106. FIG. 5A shows a situation where the spherical aberration is zero, i.e., the light ray passing through an inside portion of the objective lens 106 is just in focus on the information storage layer with the light ray passing through an outside portion of the objective lens 106. On the other hand, FIG. 5B shows a situation where the spherical aberration is not equal to zero. As shown in FIG. 5B, in that case, the light ray passing through the inside portion of the objective lens 106 is out of focus with the light ray passing through the outside portion of the objective lens 106. This is a sample case in which a spherical aberration is created while the light rays are not focused on the same plane.

The spherical aberration is caused by an inevitable difference between the actual thickness of the transparent layer of the optical disc 100 and an ideal thickness W1 of the transparent layer, which is used as a reference thickness during the design process of the optical head 114. The actual transparent layer thickness changes location by location on the optical disc 100. Accordingly, as the optical head 114 moves in the radial direction of the optical disc 100, the spherical aberration may change its magnitude. If the spherical aberration increases, then the size of the beam spot of the light beam 113 on the information storage layer of the optical disc 100 also increases, thus deteriorating the data read and/or write performance of the optical disc drive.

Thus, to correct the spherical aberration, the optical disc drive of this preferred embodiment includes the spherical aberration corrector 105. Referring back to FIG. 3, the spherical aberration corrector 105 changes the spherical aberration of the light beam 113 at the focal point thereof in accordance with a level of a driving signal output from the power amplifier 122 (i.e., the drive value). The spherical aberration corrector 105 is equivalent to a spherical aberration correcting lens 530 to be described later (see FIG. 48). The drive value supplied from the power amplifier 122 is produced in accordance with the instruction of the microcomputer 123. The microcomputer 123, in turn, determines the drive value based on the output of the loop gain calculator 124 (i.e., the gain of the open loop).

Next, the loop gain calculator 124 will be described. The loop gain calculator 124 calculates the gain of the open loop of the focus control system. The focus control system (or focus control section) performs a control operation in such a manner that the focal point of the light beam 113 (or beam spot) is located right on the information storage layer of the optical disc 100 as described above. The focus control section includes the photodetector 112, FE signal generator 115, phase compensator 118, power amplifier 119 and focus actuator 107. The loop gain calculator 124 applies a sine wave as a disturbance to the focus control system by way of the adder 126, thereby calculating the loop gain of the focus control system. More specifically, supposing that the output signal of the adder 126 is an input signal for the focus control system and that the output signal of the FE signal generator 115 is the output signal of the focus control system, the loop gain calculator 124 calculates the ratio in signal level of the output signal to the input signal as the gain of the open loop.

Figure 6A:
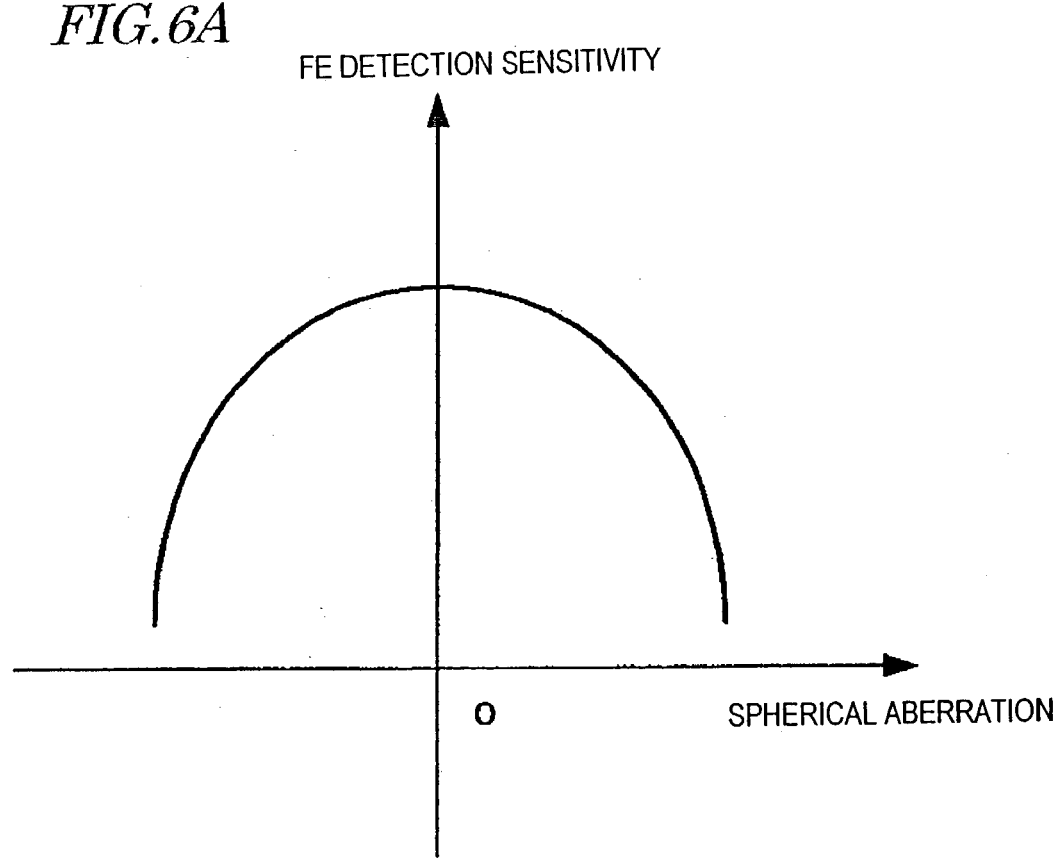
FIG. 6A is a graph showing how the FE detection sensitivity changes with the spherical aberration.

The open loop gain of the focus control system is calculated because an ideal drive value, which allows the spherical aberration corrector 105 to minimize the spherical aberration, can be obtained when the gain is the maximum. Specifically, first, the variation in the level of the FE signal with the deviation of the focal point of the light beam 113 from the information storage layer of the optical disc 100, i.e., the slope of the FE signal curve, is defined as "FE detection sensitivity". FIG. 6A is a graph showing a relationship between the spherical aberration as the abscissa and the FE detection sensitivity as the ordinate. As shown in FIG. 6A, the spherical aberration-FE detection sensitivity curve is an upwardly round quadratic curve. As the spherical aberration of the light beam 113 at the focal point thereof increases, the FE detection sensitivity decreases. This is because when the spherical aberration is created, the spot size of the light beam 113 on the information storage layer increases, thereby making it more difficult to sense the variation in the level of the FE signal. Stated otherwise, the closer to zero the spherical aberration of the light beam 113 at the focal point thereof, the higher the FE detection sensitivity. Thus, when the FE detection sensitivity is the highest, the spherical aberration is the smallest (or zero).

On the other hand, the open loop gain of the focus control system represents a ratio of amplitudes of two signals which are an input signal and an output signal of adder 126 within the focus control system. As noted above, adder 126 adds a sine wave as a disturbance to the input signal to generate the output signal. More specifically, the open loop gain of the focus control system is represented by a ratio of amplitudes of an obtained signal arising from an added sine wave contained in an output signal and an obtained signal arising from an added sine wave contained in an input signal. Thus, the open loop gain corresponds to the FE detection sensitivity. That is to say, when the gain is the maximum, the FE detection sensitivity is the highest. Consequently, when the gain is the maximum, the spherical aberration should be the smallest.

Figure 6B:
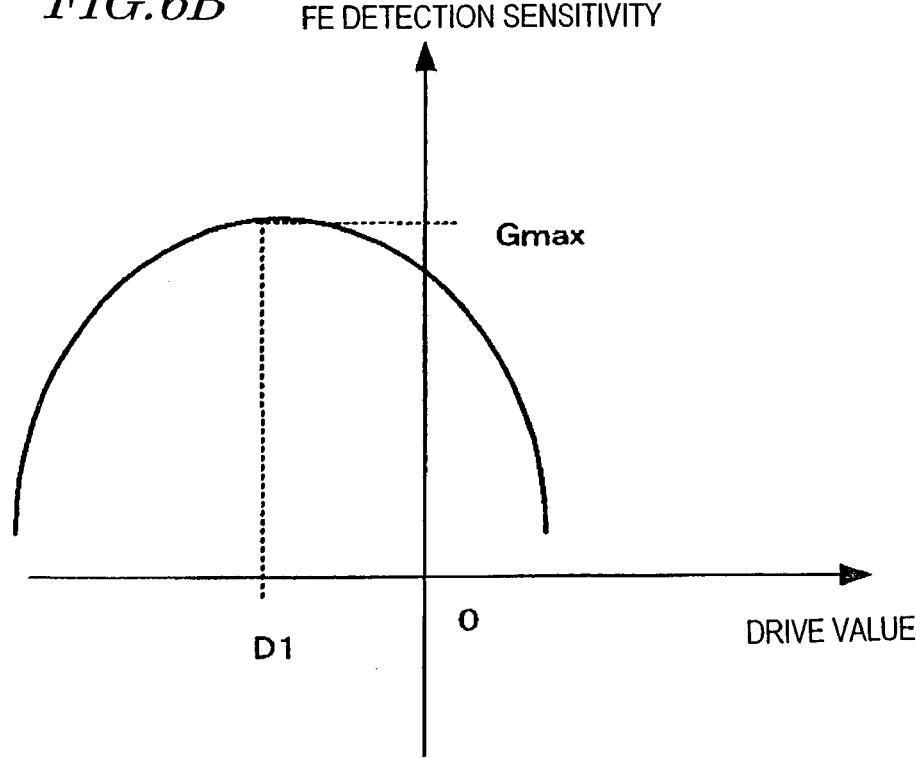
FIG. 6B is a graph showing how the FE detection sensitivity changes with a drive value of the driving signal supplied to the spherical aberration corrector 105 shown in FIG. 3 in a situation where the thickness of the transparent layer of the optical disc is non-uniform.

FIG. 6B is a graph showing how the FE detection sensitivity changes with the drive value supplied to the spherical aberration corrector 105 in a situation where the thickness of the transparent layer of the optical disc is not uniform. In FIG. 6B, the abscissa represents the drive value supplied to the spherical aberration corrector 105 and the ordinate represents the FE detection sensitivity. In the example shown in FIG. 6B, the drive value supplied to the spherical aberration corrector 105 is supposed to be proportional to the spherical aberration created. For that reason, the drive value-FE detection sensitivity curve shown in FIG. 6B and the spherical aberration-FE detection sensitivity curve shown in FIG. 6A have similar shapes.

The spherical aberration corrector 105 is normally designed to totally eliminate the spherical aberration at a drive value of zero in a situation where the thickness of the transparent layer of the optical disc 100 is equal to the reference thickness W1 everywhere. However, in a situation where the thickness of the transparent layer of the optical disc 100 is non-uniform, i.e., equal to the reference thickness W1 in some area but not in another area, the spherical aberration is not minimized (i.e., the FE detection sensitivity is not maximized) even at the drive value of zero. This is because some spherical aberration is created at the focal point of the light beam 113. Accordingly, if the thickness of the transparent layer is non-uniform and if some spherical aberration is created at the drive value of zero, then the drive value of the spherical aberration corrector 105 needs to be defined at such a value as to maximize the open loop gain of the focus control system. This is because the spherical aberration is minimized when the gain of the focus control system is the maximum as described above. By driving the spherical aberration corrector 105 ay the drive value obtained in this manner, the spherical aberration produced at the focal point of the light beam 113 can be minimized. Then, the information stored on the optical disc 100 can be read out accurately enough.

Referring back to FIG. 3, the microcomputer 123 instructs the power amplifier 122 to change the drive value to be supplied to the spherical aberration corrector 105. Also, every time the microcomputer 123 gets the drive value changed by the power amplifier 122, the microcomputer 123 instructs the loop gain calculator 124 to calculate the open loop gain and then receives the open loop gain that has been calculated by the loop gain calculator 124. The microcomputer 123 stores thereon tabulated data representing the correspondence between the drive values to be supplied to the spherical aberration corrector 105 and the open loop gains. Thus, the microcomputer 123 can easily specify a drive value D1 corresponding to the maximum gain $G_{max}$ (see FIG. 6B). Consequently, by driving the spherical aberration corrector 105 at the drive value specified, the spherical aberration, resulting from the variation in the thickness of the transparent layer of the optical disc 100, can be canceled.

Hereinafter, it will be described with reference to FIG. 7 how the optical disc drive 11 operates. FIG. 7 is a flowchart showing how the optical disc drive 11 carries out the spherical aberration correcting process. First, in Step S71, the light source 101 of the optical head 114 in the optical disc drive 11 emits a light beam toward a rotating optical disc 100. Next, in Step S72, the focus control section controls the position of the objective lens 106, thereby converging and focusing the light beam onto a target track on the information storage layer of the optical disc 100 and forming a beam spot thereon. At this point in time, although the light beam is in focus with the information storage layer, a spherical aberration, resulting from the variation in the thickness of the transparent layer, is still present with the lens. Thus, while the objective lens 106 is located at such a position as to form that beam spot, the microcomputer 123 changes the drive value to be supplied to the spherical aberration corrector 105, thereby changing the spherical aberration of the lens in Step S73. Then, in response to the FE signal to be detected by the FE signal generator 115 as a result of the variation in spherical aberration, the loop gain calculator 124 calculates the open loop gain of the focus control system in Step S74. Then, in Step S75, the microcomputer 123 specifies an ideal drive value that will maximize the open loop gain by reference to the table of correspondence between the drive values to be supplied to the spherical aberration corrector 105 and the open loop gains. Finally, in Step S76, the microcomputer 123 drives the spherical aberration corrector 105 with the specified drive value supplied thereto, thereby minimizing the spherical aberration.

In the preferred embodiment of the optical disc drive 11 described above, the spherical aberration corrector 105 is adjusted in such a manner that the open loop gain of the focus control system is maximized. Alternatively, the spherical aberration corrector 105 may also be adjusted such that the open loop gain of the tracking control system is maximized. The reason is that the TE detection sensitivity should be similar to the FE detection sensitivity shown in FIG. 6A or 6B. It should be noted that the tracking control system is a system that is implemented as the tracking control section described above.

Embodiment 2

Hereinafter, a second specific preferred embodiment of the present invention will be described with reference to FIG. 8. FIG. 8 is a block diagram showing a configuration for an optical disc drive 12 according to the second preferred embodiment.

In the first preferred embodiment described above, a particular drive value, which maximizes the open loop gain of the focus control system, is specified for the spherical aberration corrector 105, thereby minimizing the spherical aberration of the light beam 113 on the information storage layer. In this second preferred embodiment, other parameters are additionally used to adjust the spherical aberration corrector 105 even more precisely. By using those additional parameters, even if a drive value that allows the spherical aberration corrector 105 to minimize the spherical aberration has deviated from the drive value that allows the spherical aberration corrector 105 to contribute to maximizing the FE detection sensitivity for some reason (e.g., the precision of an optical member included in the optical head 114), an appropriate drive value can still be specified for the spherical aberration corrector 105.

The optical disc drive 12 of this second preferred embodiment includes not only the tracking, focus and spherical aberration control sections as already described for the first preferred embodiment but also a read signal quality evaluating section for use to evaluate the quality of a read signal representing the data that has been read out from the optical disc 100. As shown in FIG. 8, the read signal quality evaluating section includes the photodetector 112, a totally reflected light quantity calculator 130 and a jitter measurer 131.

The totally reflected light quantity calculator 130 calculates and outputs the quantity of light that has been totally reflected from the optical disc 100. Based on the output of the totally reflected light quantity calculator 130, the jitter measurer 131 obtains the jitter of the read signal representing the information that has been read out from the optical disc 100 and then passes the jitter value to the microcomputer 132. As used herein, the "jitter" refers to a time lag between a point in time at which the light beam 113 passes the edge of a target mark on the optical disc 100 to read information therefrom and a point in time at which a corresponding pulse of its associated digital read signal rises or falls.

The microcomputer 132 gets the spherical aberration corrector 105 driven by the power amplifier 122, thereby minimizing the output of the jitter measurer 131. A drive value, which allows the spherical aberration corrector 105 to contribute to minimizing the output of the jitter measurer 131, will be referred to herein as a "reference drive value D2". The microcomputer 132 changes the drive values to be supplied to the spherical aberration corrector 105 within a certain range including the reference drive value D2 as its center value. Every time the microcomputer 132 changes the drive values, the microcomputer 132 gets the loop gain calculator 124 started to obtain the open loop gain of the focus control system. In this manner, the microcomputer 123 collects data on the drive values supplied to the spherical aberration corrector 105 and the open loop gains of the focus control system, tabulates the data, and stores the table of correspondence in its internal memory.

To read out information from a target track that is positioned at a different radial location on the optical disc 100 from the current location (i.e., in carrying out a seek operation), the microcomputer 132 drives the transport motor 125 to move the optical head 114 toward the target track. Then, every time the microcomputer 132 changes the drive values to be supplied to the spherical aberration corrector 105, the microcomputer 132 also gets the loop gain calculator 124 started to obtain the open loop gain of the focus control system. Thereafter, by reference to the table of correspondence between various drive values for the spherical aberration corrector 105 and the open loop gains and the particular open loop gain value corresponding to the drive value of the spherical aberration corrector 105 as measured on the target track, the microcomputer 132 adjusts the drive value to be supplied to the spherical aberration corrector 105.

Figure 9:
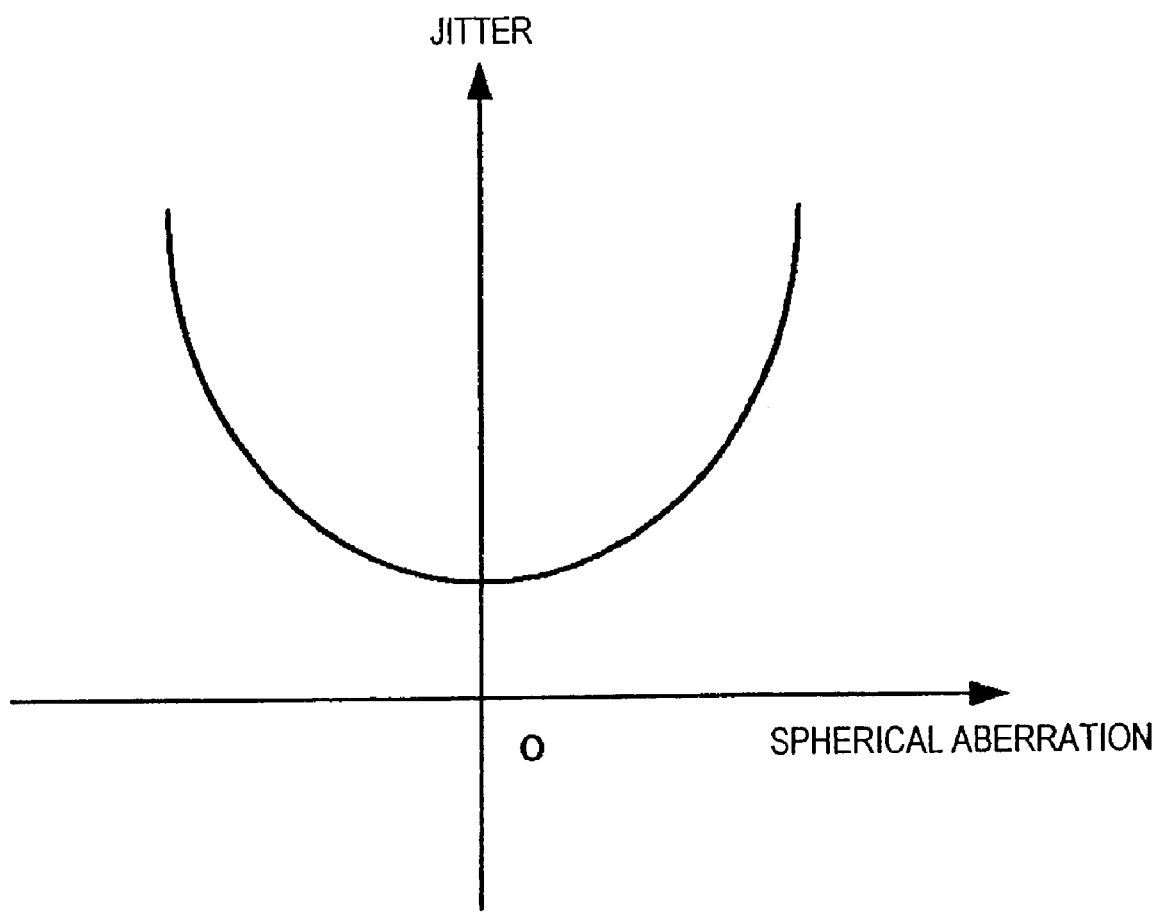
FIG. 9 is a graph showing how the jitter changes with the spherical aberration at the focal point of the light beam 113.

Next, it will be described with reference to FIG. 9 how the jitter changes with the spherical aberration at the focal point of the light beam 113. FIG. 9 is a graph showing a relationship between the spherical aberration and the jitter. In reading out information from a mark on the optical disc 100, the passage of the light beam 113 through the edge of the mark is ideally synchronized with the leading or trailing edge of a pulse of the digital read signal representing that information. However, if the waveform of the read signal is distorted due to a spherical aberration, for example, those timings do not match each other, thus producing a jitter. For that reason, to minimize the jitter, the spherical aberration needs to be eliminated. It should be noted, however, that even when the spherical aberration is zero, a jitter may still be present because a jitter can be caused by any of various other factors.

Figure 10:
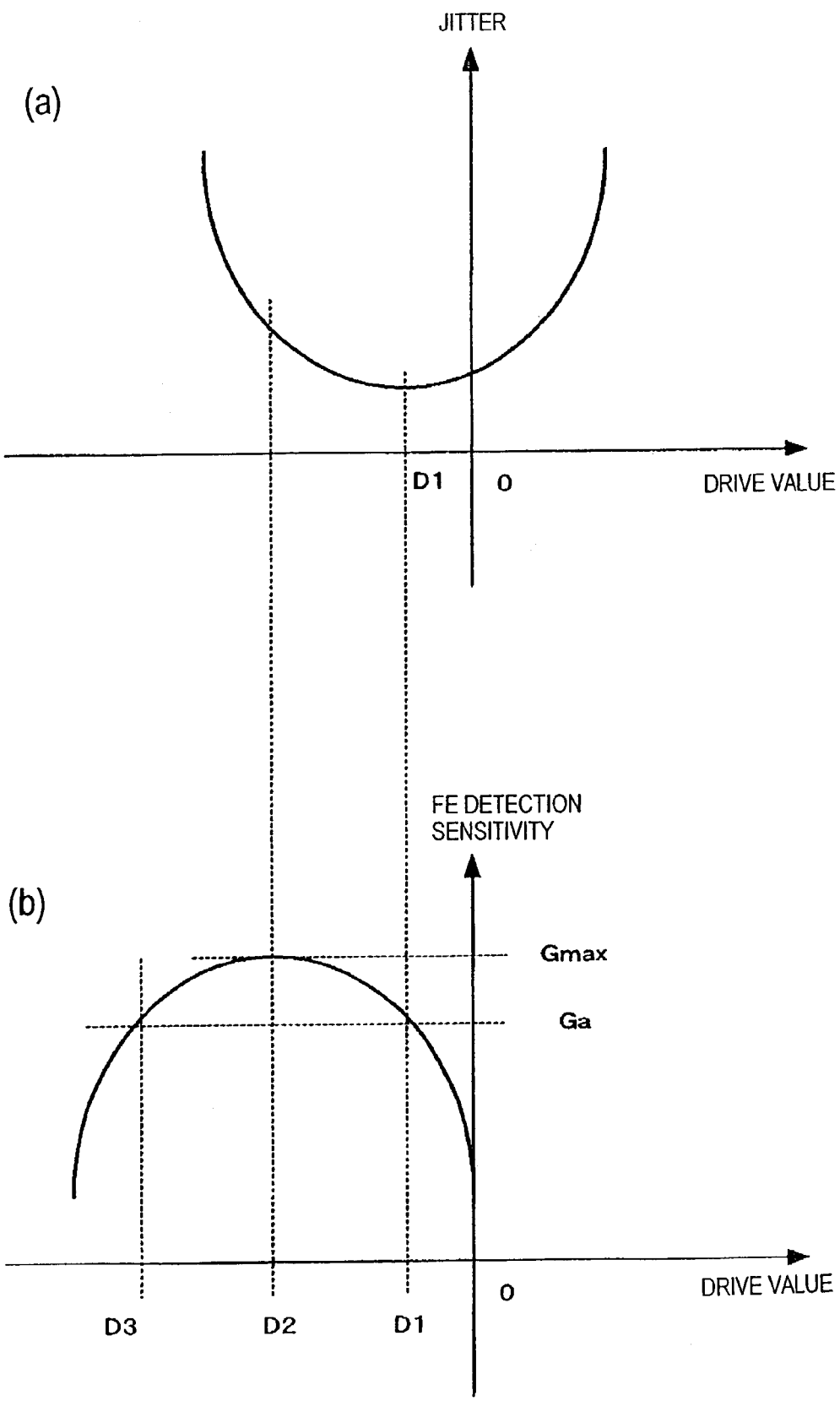
FIG. 10 shows graphs of jitter and FE detection sensitivity for drive values. (a) and (b) are graphs respectively showing how jitter and FE detection sensitivity change with drive values of the driving signal supplied to the corrector 105.

FIG. 10(a) is a graph showing how the jitter changes with the drive value to be supplied to the spherical aberration corrector 105. In this case, the thickness of the transparent layer of the optical disc 100 is non-uniform, i.e., may be equal to the reference thickness W1 in some areas but may not in other areas. Accordingly, even when the drive value supplied to the spherical aberration corrector 105 is zero, some spherical aberration is present at the focal point of the light beam 113. Thus, the jitter is not minimized even at the zero drive value. However, when the drive value is equal to D1, the spherical aberration created by the spherical aberration corrector 105 cancels the spherical aberration resulting from the deviation of the transparent layer thickness of the optical disc 100 from the reference thickness W1, and therefore the jitter is minimized.

FIG. 10(b) is a graph showing how the FE detection sensitivity changes with the drive value to be supplied to the spherical aberration corrector 105. Due to the deviation of the transparent layer thickness of the optical disc 100 from the reference thickness W1 and the precision of an optical member included in the optical head 114, even when the spherical aberration is set equal to zero by driving the spherical aberration corrector 105 at the drive value D1, the FE detection sensitivity may still not be maximized. Thus, whenever the microcomputer 132 changes the drive values to be supplied to the spherical aberration corrector 105 within a certain range including the drive value D1 as its center value, the microcomputer 132 newly calculates the open loop gain of the focus control system to find a drive value D2 corresponding to the maximum open loop gain $G_{max}$. In the example shown in FIG. 10(b), the drive value D2 is different from the drive value D1. As already described for the first preferred embodiment, when the gain is maximized, the FE detection sensitivity is also maximized.

The microcomputer 132 stores the values D1, D2, D3, $G_{max}$ and $G_a$ thereon. The value $G_{max}$ is the open loop gain of the focus control system at the drive value D2 and the value Ga is the open loop gain of the focus control system at the drive values D1 and D3.

To read out data from a target track, which is positioned at a different radial location on the optical disc 100 from the current track, the microcomputer 132 drives the transport motor 125, thereby moving the optical head 114 toward the target track in the radial direction of the optical disc 100. Once the optical head 114 has reached a location right under the target track, the microcomputer 132 changes the drive values to be supplied to the spherical aberration corrector 105 and calculates the open loop gains of the focus control system a number of times.

FIG. 11(a) shows how the jitter changes with the drive value to be supplied to the spherical aberration corrector 105 at the target track. In this case, the thickness of the transparent layer of the optical disc 100 is non-uniform, i.e., may be equal to the reference thickness W1 in some areas but may not in other areas. Accordingly, even when the drive value is zero, the jitter is not minimized. However, when the drive value is equal to D6, the spherical aberration created by the spherical aberration corrector 105 cancels the spherical aberration resulting from the deviation of the transparent layer thickness of the optical disc 100 from the reference thickness W1, and therefore the jitter is minimized.

FIG. 11(b) is a graph showing how the FE detection sensitivity changes with the drive value to be supplied to the spherical aberration corrector 105 at the target track. As described above, when the drive value is equal to D6, the spherical aberration created by the spherical aberration corrector 105 cancels the spherical aberration resulting from the deviation of the transparent layer thickness of the optical disc 100 from the reference thickness W1, and therefore the spherical aberration at the focal point of the light beam 113 becomes equal to zero. However, due to the precision of an optical member included in the optical head 114 and for other reasons, even when the spherical aberration is set equal to zero by driving the spherical aberration corrector 105 at the drive value D6, the FE detection sensitivity may still not be maximized. In the example shown in FIG. 11(b), the FE detection sensitivity is maximized at a drive value D5.

The microcomputer 132 detects the drive value D5, which maximizes the open loop gain of the focus control system (i.e., maximizes the FE detection sensitivity) when supplied to the spherical aberration corrector 105, and drive values D4 and D6 which will result in the FE detection sensitivity $G_a$ when supplied to the spherical aberration corrector 105. In this case, D4<D5<D6 as shown in FIG. 11(b).

The values D1 and D2 stored on the microcomputer 132 satisfy the inequality D1>D2. Thus, the microcomputer 132 sets the drive value, corresponding to the drive value D1 resulting in the FE detection sensitivity Ga, equal to D6. Accordingly, the spherical aberration at the focal point of the light beam 113 becomes equal to zero.

In the preferred embodiment described above, the drive value that allows the spherical aberration corrector 105 to minimize the spherical aberration and the drive value that allows the spherical aberration corrector 105 to contribute to maximizing the FE detection sensitivity are supposed to deviate from each other due to the precision of an optical member included in the optical head 114, for example, and the deviation is supposed to be detected based on the jitter. However, similar effects are also achievable even when such a deviation is detected based on the bit error rate.

Embodiment 3

Figure 12:
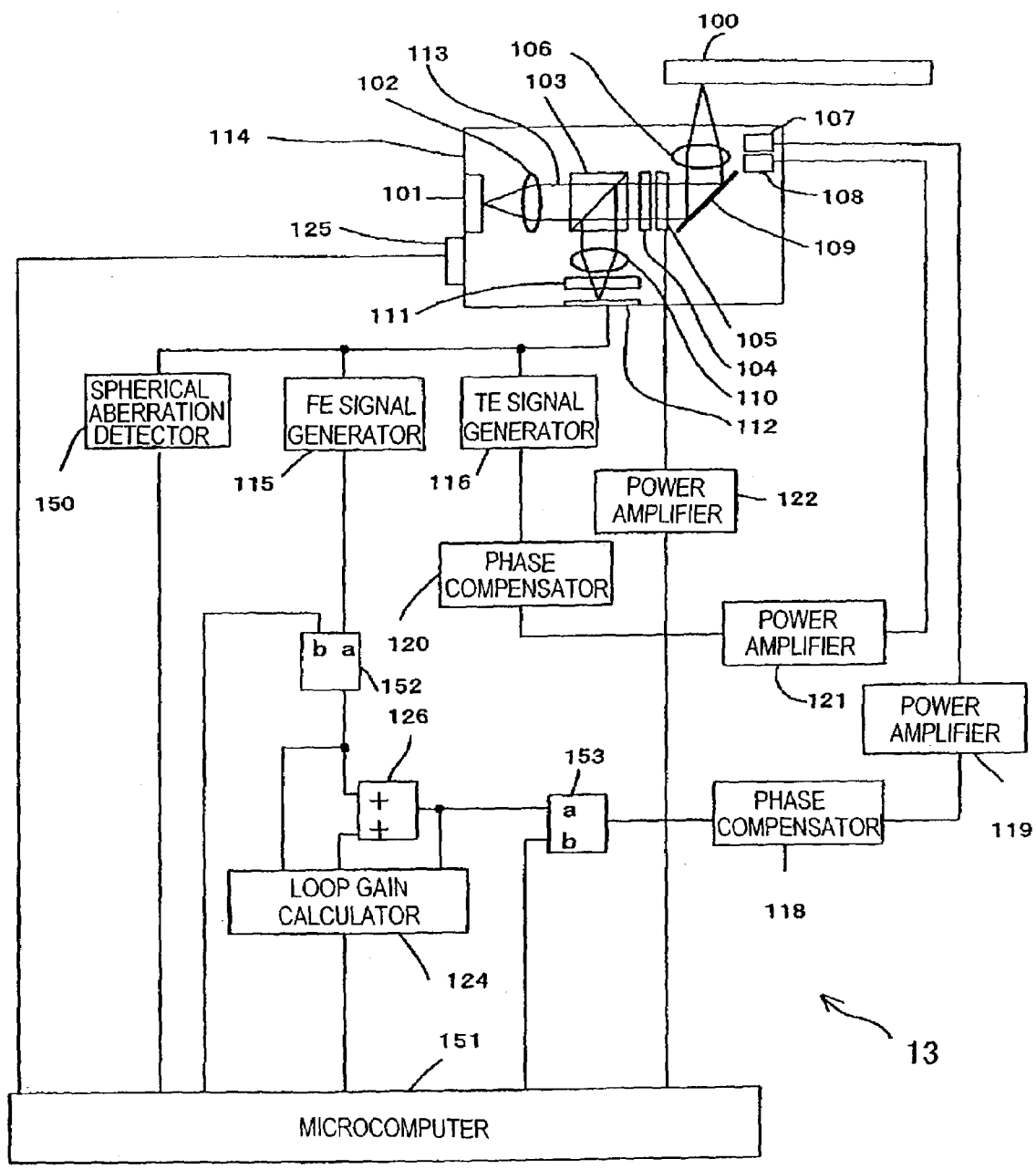
FIG. 12 is a block diagram showing a configuration for an optical disc drive 13 according to a third specific preferred embodiment of the present invention.

Hereinafter, a third specific preferred embodiment of the present invention will be described with reference to FIG. 12. FIG. 12 is a block diagram showing a configuration for an optical disc drive 13 according to the third preferred embodiment.

The optical disc drive 13 of this third preferred embodiment includes not only the tracking, focus and spherical aberration control sections as already described for the first preferred embodiment but also a spherical aberration detecting section and a gain adjusting section. These additional sections are provided to read out information even more accurately by finely adjusting the spherical aberration and the loop gain of the focus control system, respectively. More specifically, the spherical aberration detecting section detects the spherical aberration at the focal point of the light beam 113, and includes the photodetector 112 and a spherical aberration detector 150 as shown in FIG. 12. The gain adjusting section adjusts the loop gain of the focus control system and includes the adder 126, the loop gain calculator 124 and a multiplier 152 as shown in FIG. 12.

The spherical aberration detector 150 detects a spherical aberration to be created at the focal point of the light beam 113. The output signal of the spherical aberration detector 150 will be referred to herein as an "SAE signal". The SAE signal is obtained based on the difference between an FE signal representing the focus error of a light ray passing through an inside portion of the objective lens 106 and an FE signal representing the focus error of a light ray passing through an outside portion of the objective lens 106.

Figure 13:
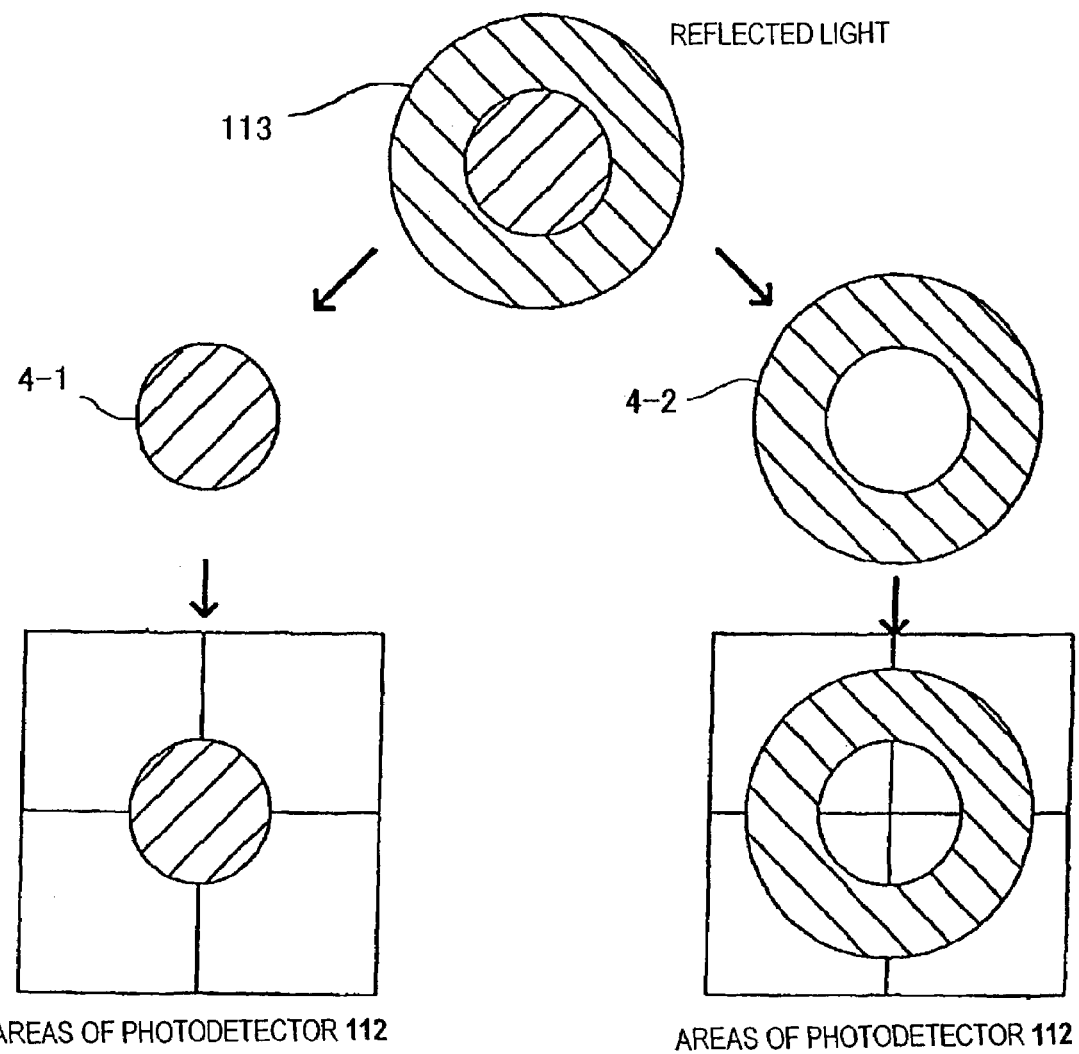
FIG. 13 shows a principle on which a spherical aberration is detected.
Figure 14:
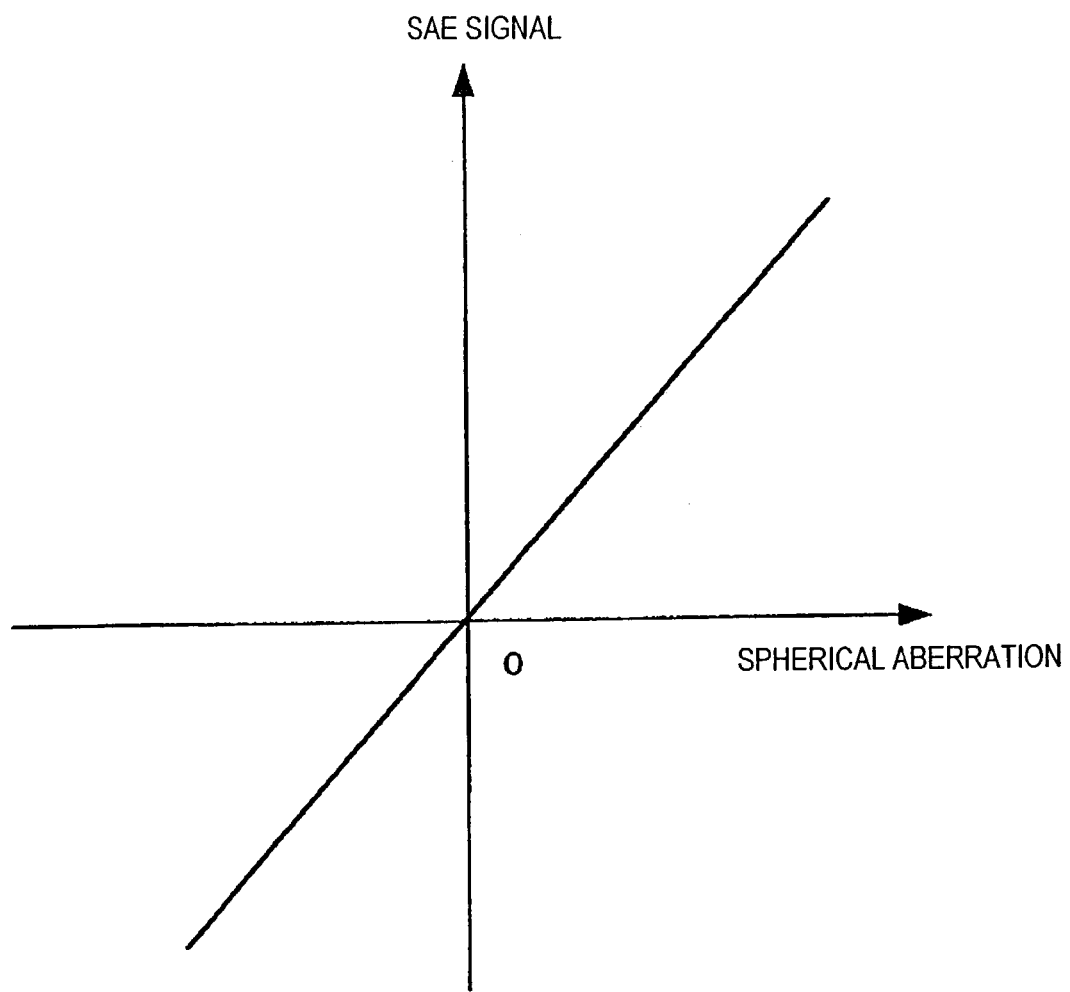
FIG. 14 is a graph showing how the level of the SAE signal changes with the spherical aberration.

Next, it will be described with reference to FIG. 13 according to what principle the spherical aberration can be detected. In FIG. 13, hatched areas represent cross sections of the light beam 113. By using a hologram or any other suitable optical member, the optical head 114 splits the light beam 113 that has been reflected from the optical disc 100 into an inside light ray 4-1 and an outside light ray 4-2. The photodetector 112 receives these light rays 4-1 and 4-2 at mutually different detector areas. Then, the spherical aberration detector 150 generates an inside FE signal from the inside light ray 4-1 and an outside FE signal from the outside light ray 4-2, respectively, by the same method as that used to generate an FE signal (i.e., the astigmatism method). As described above, the spherical aberration means a deviation of the focal point of the light ray passing through an inside portion of the objective lens 106 from that of the light ray passing through an outside portion of the objective lens 106. Thus, the spherical aberration detector 150 calculates the difference between the inside and outside FE signals and outputs the differential signal as the SAE signal. Accordingly, the SAE signal represents the magnitude of the spherical aberration created. FIG. 14 is a graph showing how the level of the SAE signal changes with the spherical aberration. As can be easily seen from FIG. 14, the level of the SAE signal is proportional to the magnitude of the spherical aberration. The SAE signal equals zero when there is no spherical aberration as shown in FIG. 5A. In that situation, the inside light ray 4-1 is just in focus with the outside light ray 4-2.

On the other hand, if there is a spherical aberration due to the deviation of the transparent layer thickness from the reference thickness W1 as shown in FIG. 5B, the output SAE signal has a level representing the magnitude of the spherical aberration. In that case, the light ray 4-1 passing through the inside portion of the objective lens 106 is out of focus with the light ray 4-2 passing through the outside portion of the objective lens 106. According to such a principle, the spherical aberration detector 150 outputs the SAE signal representing the magnitude of the spherical aberration created.

Referring back to FIG. 12, each of the multipliers 152 and 153 multiplies together the signals received at its input terminals a and b and then outputs the product. Specifically, the multiplier 152 multiplies together the FE signal and a value supplied from the microcomputer 151 and outputs the product. On the other hand, the multiplier 153 multiplies together the output of the adder 126 and a value supplied from the microcomputer 151 and outputs the product.

The focal point of the light beam 113 is supposed to be positioned at a predetermined inside radial location Rin. The microcomputer 151 gets the loop gain calculator 124 started to obtain the open loop gain of the focus control system and drives the spherical aberration corrector 105 in such a manner as to maximize the gain. When the microcomputer 151 finds the drive value that maximizes the gain, the microcomputer 151 stores that drive value thereon. In that situation, the spherical aberration at the focal point of the light beam 113 is zero. When the spherical aberration is zero, the FE detection sensitivity at the focal point of the light beam 113 is supposed to be maximized. Also, the drive value to be supplied to the spherical aberration corrector 105 in that situation will be identified herein by D10. Thereafter, the microcomputer 151 drives the loop gain calculator 124 again to obtain the open loop gain of the focus control system and changes the setting of the multiplier 153 into a value corresponding to a predetermined gain. Next, the microcomputer 151 changes the drive values to be supplied to the spherical aberration corrector 105 within a certain range including the drive value D10 as its center value, gets the open loop gain of the focus control system calculated and detects the level of the SAE signal, which is the output signal of the spherical aberration detector 150.

Then, the microcomputer 151 collects data on the levels of the SAE signal and the open loop gains of the focus control system, tabulates the data, and stores the table of correspondence in its internal memory.

Next, it will be described how the microcomputer 151 moves the optical head 114 toward a target track by driving the transport motor 125. In the following example, the target track is supposed to be positioned at a radial location Rout and the transparent layer thickness at the radial location Rout is supposed to be different from that at the radial location Rin. Accordingly, the SAE signal to be detected at the radial location Rout has a level corresponding to the difference in transparent layer thickness between the radial locations Rin and Rout.

By reference to the pre-stored table of correspondence between the levels of the SAE signal and the open loop gains of the focus control system, the microcomputer 151 adjusts the open loop gain of the focus control system and tries to equalize the open loop gain with the gain corresponding to the zero spherical aberration. The open loop gain may be adjusted by changing the setting of the multiplier 152. Accordingly, even if some spherical aberration is present, the focus control system can have a constant open loop gain and can be stabilized.

Figure 15A:
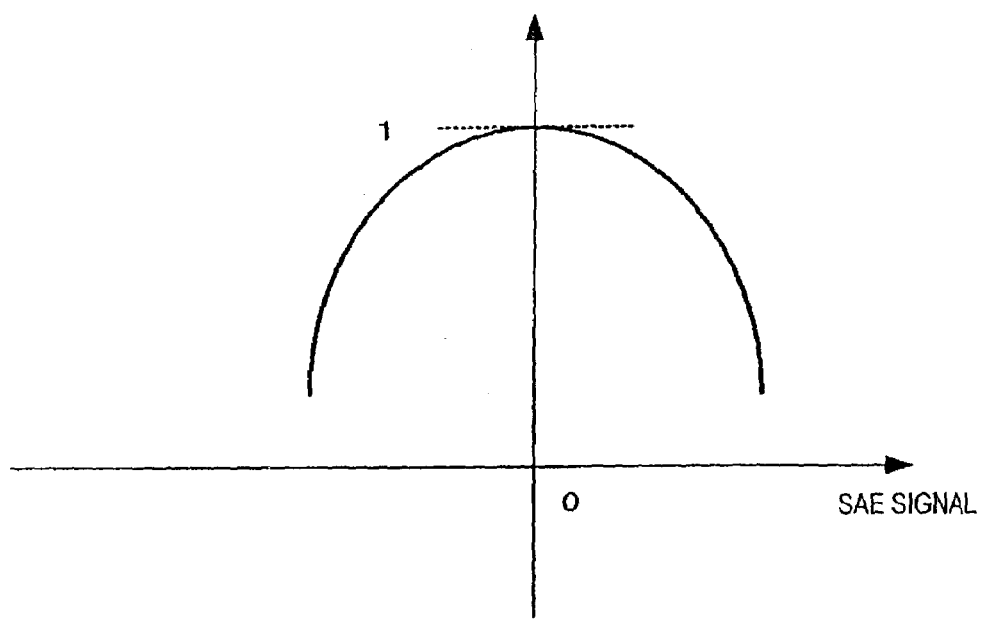
FIG. 15A is a graph showing how the normalized FE detection sensitivity changes with the level of the SAE signal.

In this preferred embodiment, the FE detection sensitivity also changes with the spherical aberration as shown in FIG. 6A. FIG. 15A is a graph showing how the normalized FE detection sensitivity changes with the level of the SAE signal. In FIG. 15A, the ordinate represents FE detection sensitivity that was normalized such that the gain equals one when the SAE signal is zero.

Figure 15B:
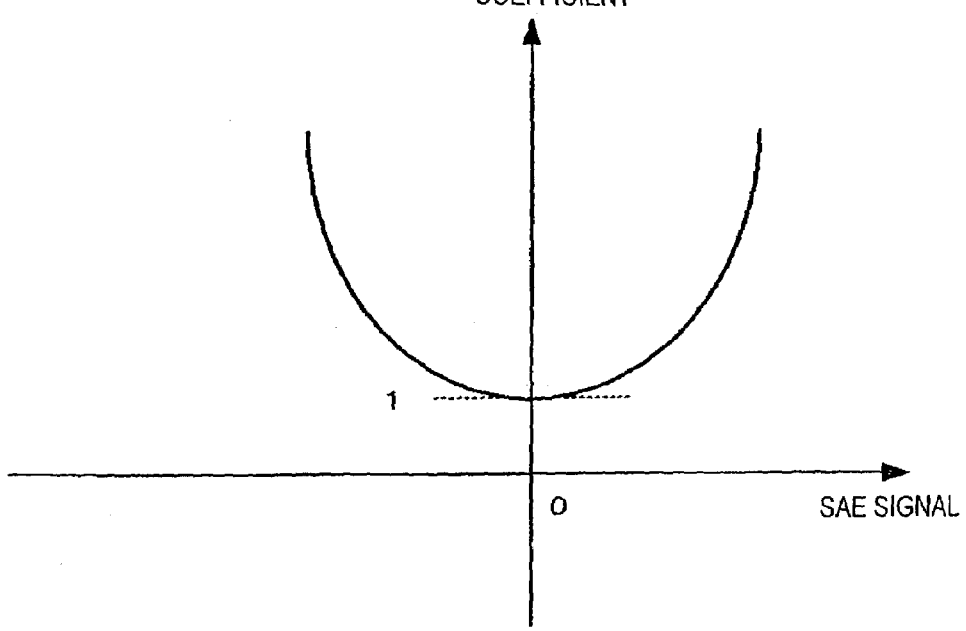
FIG. 15B is a graph showing how the setting of the multiplier 152 changes with the level of the SAE signal.

The microcomputer 151 changes the setting of the multiplier 152 according to the level of the SAE signal. FIG. 15B is a graph showing how the setting of the multiplier 512 is changed with the level of the SAE signal. This graph represents a characteristic that compensates for the decrease in normalized FE detection sensitivity with the level of the SAE signal as shown in FIG. 15A. Accordingly, even if some spherical aberration is present, the focus control system can still exhibit constant open loop characteristic and can be stabilized.

In this preferred embodiment, the spherical aberration corrector 105 is driven at such a drive value as to minimize the spherical aberration and then the gain of the focus control system is adjusted. Thus, an even more appropriate gain can be obtained.

Also, the gain of the focus control system is changed with the spherical aberration. Accordingly, even when there is a spherical aberration, the focus control system can always have a constant gain.

In the preferred embodiment described above, the gain of the focus control system is supposed to be changed. Alternatively, the gain of the tracking control system may be changed instead.

Embodiment 4

Figure 16:
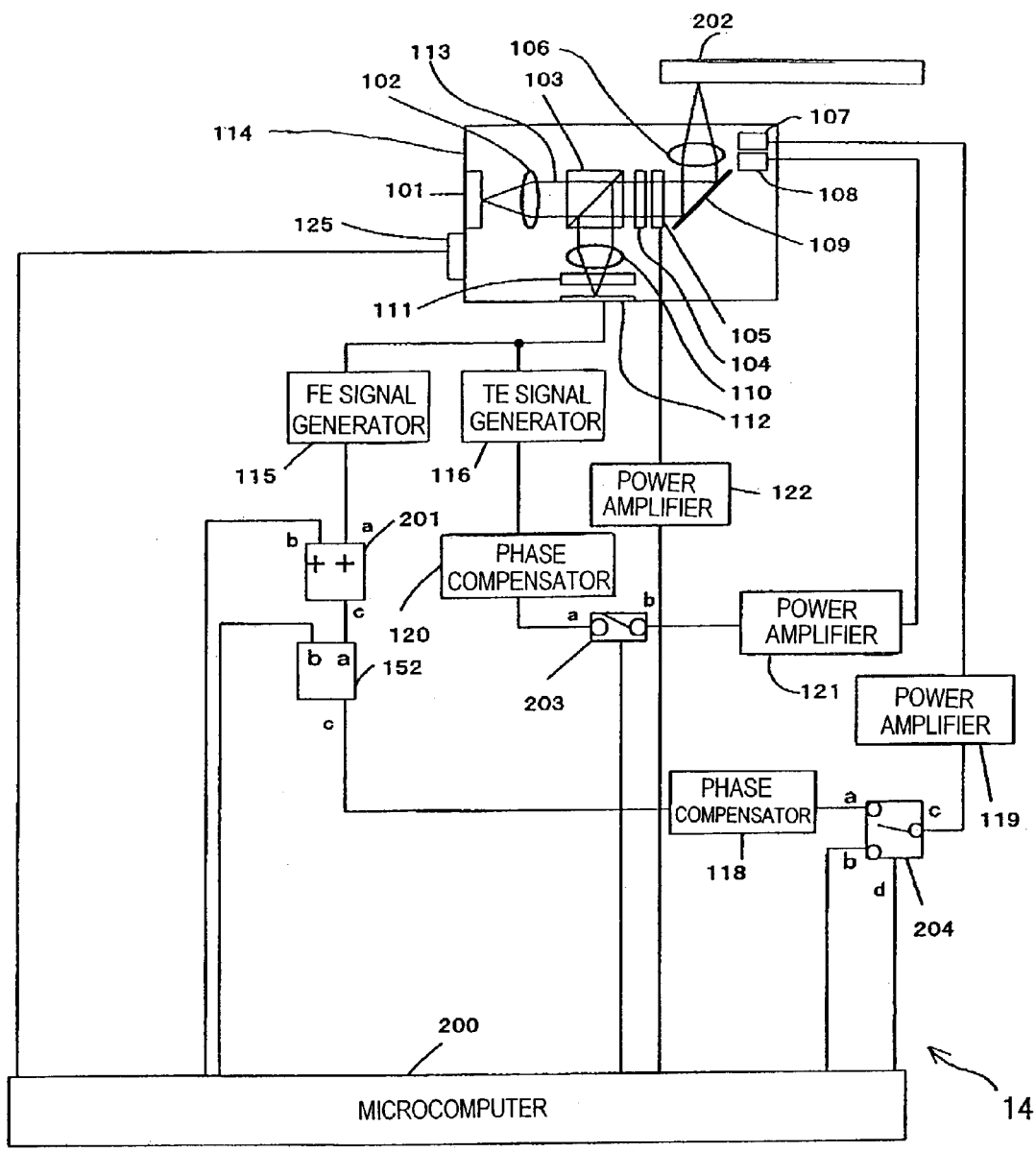
FIG. 16 is a block diagram showing a configuration for an optical disc drive 14 according to a fourth specific preferred embodiment of the present invention.

Hereinafter, a fourth specific preferred embodiment of the present invention will be described with reference to FIG. 16. FIG. 16 is a block diagram showing a configuration for an optical disc drive 14 according to the fourth preferred embodiment.

In this preferred embodiment, the optical disc 202 to be read from or written to by the optical disc drive 14 has multiple information storage layers as shown in FIG. 1C or 1D. In the following example, the optical disc 202 is supposed to be a single-sided disc with two information storage layers L1 and L2 as shown in FIG. 1C. In FIG. 1C, a transparent layer thickness Z1 is defined for the information storage layer L1 as a distance from the surface of the transparent layer 152 to the surface of the information storage layer L1. On the other hand, a transparent layer thickness Z2 is defined for the information storage layer L2 as a distance from the surface of the transparent layer 52 to the surface of the information storage layer L2.

The optical disc drive 14 also includes the tracking control section, focus control section and spherical aberration corrector as in the first preferred embodiment described above. However, the temperature 14 includes no loop gain calculator 124 as the spherical aberration control section.

The light beam 113 is incident onto the surface of the optical disc 202. In reading information from the information storage layer L1, the optical disc drive 14 carries out a focus control such that the focal point of the light beam 113 is located right on the information storage layer L1. Also, the optical disc drive 14 determines the drive value to be supplied to the spherical aberration corrector 105 at such a value as to minimize the spherical aberration on the information storage layer L1. Such a drive value will be identified herein by DL1. On the other hand, in reading information from the information storage layer L2, the optical disc drive 14 carries out a focus control such that the focal point of the light beam 113 is located right on the information storage layer L2. Also, the optical disc drive 14 determines the drive value to be supplied to the spherical aberration corrector 105 at such a value as to minimize the spherical aberration on the information storage layer L2. Such a drive value will be identified herein by DL2.

Figure 17:
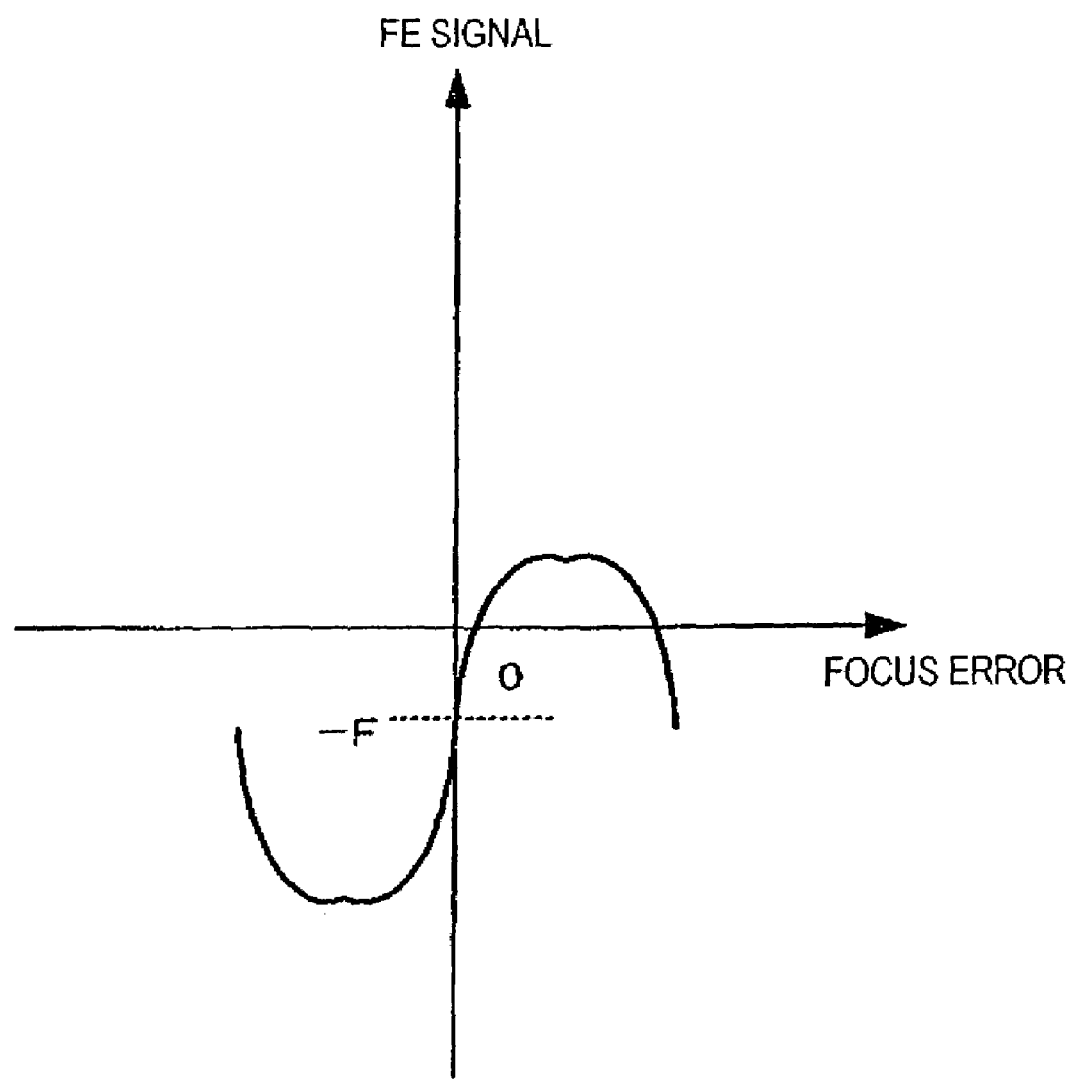
FIG. 17 is a graph showing the waveform of an FE signal with an offset.

When the drive value DL1 is supplied to the spherical aberration corrector 105, the FE signal exhibits the characteristic shown in FIG. 4 with respect to the information storage layer L1. In the same way, when the drive value DL2 is supplied to the spherical aberration corrector 105, the FE signal also exhibits the characteristic shown in FIG. 4 with respect to the information storage layer L2. However, if the characteristic on the information storage layer L1 is analyzed when the drive value DL2 is supplied to the spherical aberration corrector 105, the FE signal, representing the deviation of the focal point from the information storage layer L1, does have an offset. FIG. 17 is a graph showing an FE signal having such an offset. In FIG. 17, the abscissa represents the deviation of the focal point from the information storage layer. Consider the FE detection sensitivity about the information storage layer L1. If the deviation of the focal point from the information storage layer is zero, the FE detection sensitivity is the slope of the curve representing the FE signal at the position. Thus, when the deviation of the focal point from the information storage layer is zero, the slope of the curve representing the FE signal shown in FIG. 4 (i.e., the FE signal for the drive value DL1) will be identified herein by SL1, while the slope of the curve representing the FE signal shown in FIG. 17 (i.e., the FE signal for the drive value DL2) will be identified herein by SL2. Then, SL2<SL1. Also, as can be seen from FIG. 17, even when the deviation of the focal point from the information storage layer is zero, the FE signal is not zero but has a negative offset F.

Hereinafter, it will be described how to jump the focal point from the information storage layer L1 to the information storage layer L2. Suppose the optical disc drive 14 is now performing a focus control such that the focal point is located right on the information storage layer L1 as described above. Initially, the drive value DL1 is supplied to the spherical aberration corrector 105.

First, the microcomputer 200 determines the drive value to be supplied to the spherical aberration corrector 105 at such a value as to minimize the spherical aberration on the information storage layer L2 when the transparent layer thickness thereof is equal to Z2. That is to say, the microcomputer 200 changes the drive value from DL1 into DL2. Even so, the time it takes for the focal point to jump the layers through the displacement of the objective lens 106 is normally shorter than the time it takes to change the states of the spherical aberration corrector 105. Also, the microcomputer 200 changes the settings of the multiplier 152, thereby keeping the open loop gain of the focus control system constant. Furthermore, the microcomputer 200 also changes the settings of the adder 201 to correct the offset of the FE signal.

In such a state, the microcomputer 200 once suspends the focus control and raises the objective lens 106, thereby jumping the focal point to the information storage layer L2. Thereafter, the microcomputer 200 resumes the focus control.

Figure 18:
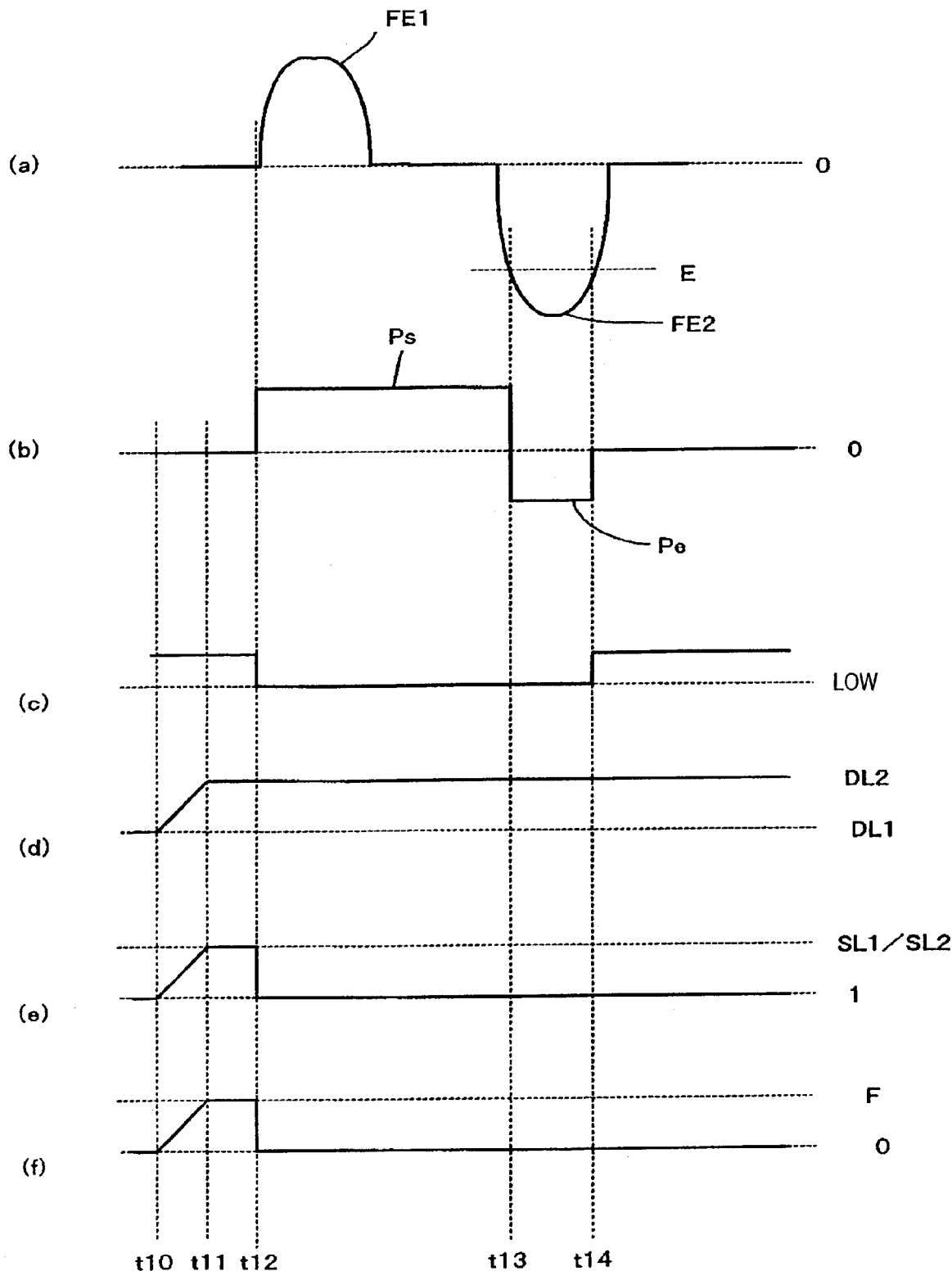
FIG. 18 is a timing diagram showing the waveforms of various signals to be supplied to move the focal point from the information storage layer L1 to the information storage layer L2.

Next, the timings of various signals to be supplied to jump the focal point from the information storage layer L1 to the information storage layer L2 will be described with reference to FIG. 18. FIG. 18 is a timing diagram showing the waveforms of those signals. Specifically, portion (a) of FIG. 18 shows the waveform of the FE signal; portion (b) shows the waveform of a signal that is output from the microcomputer 200 to the terminal b of the switch 204; portion (c) shows the waveform of a signal that is output from the microcomputer 200 to the terminal d of the switch 204; portion (d) shows the drive value to be supplied to the spherical aberration corrector 105; portion (e) shows the waveform of a signal that is output from the microcomputer 200 to the terminal b of the multiplier 152; and portion (f) shows the waveform of a signal that is output from the microcomputer 200 to the terminal b of the adder 201.

When the signal received at the terminal d is logical one (see portion (c) of FIG. 18), the switch 204 connects its terminals a and c together.

At a time t10, the drive value supplied to the spherical aberration corrector 105 is DL1 as shown in portion (d) of FIG. 18, the signal received at the terminal b of the multiplier 152 is one as shown in portion (e) of FIG. 18, and the signal received at the terminal b of the adder 201 is zero as shown in portion (f) of FIG. 18. In such a state, the focus control system has a predetermined open loop gain.

Then, the microcomputer 200 gradually changes the drive value for the spherical aberration corrector 105 from DL1 pinto DL2 in the period between the times t10 and t11 as shown in portion (d) of FIG. 18. In the meantime, the microcomputer 200 also changes the signal value at the terminal b of the multiplier 152 from one into SL1/SL2 as shown in portion (e) of FIG. 18 and further changes gradually the signal value at the terminal b of the adder 201 from zero into F as shown in portion (f) of FIG. 18.

When the drive value for the spherical aberration corrector 105 equals DL2 at the time t11, a spherical aberration is created at the focal point of the light beam 113 on the information storage layer L1, the FE detection sensitivity decreases, and the FE signal comes to have an offset. However, if the microcomputer 200 changes the signal values at the terminals b of the adder 201 and multiplier 152 into F and SL1/SL2, respectively, the multiplier 152 outputs substantially the same FE signal as in the situation where the drive value for the spherical aberration corrector 105 is DL1. Thus, the focus control does not lose its stability. Also, since the drive value for the spherical aberration corrector 105 and the signal values at the terminals b of the multiplier 152 and adder 201 are gradually changed at the same time, the focus control is also stabilized even during the period between the times t10 and t11.

Next, at a time t12, the microcomputer 200 connects together the terminals b and c of the switch 204, thereby stopping the focus control. Also, the microcomputer 200 changes again the signal values at the terminals b of the multiplier 152 and adder 201 into one and zero, respectively. Then, as shown in portion (b) of FIG. 18, the microcomputer 200 outputs an accelerating pulse Ps to the terminal b of the switch 204 to drive the objective lens 106 toward the information storage layer L2. As a result, the objective lens 106 starts to get closer to the information storage layer L2 and the focal point of the light beam 113 also starts to move toward the information storage layer L2. In portion (a) of FIG. 18, FE1 denotes the FE signal obtained from the information storage layer L1.

Thereafter, on sensing that the FE signal has reached an E level at a time t13 as shown in portion (a) of FIG. 18, the microcomputer 200 switches the accelerating pulse Ps into a decelerating pulse Pe and outputs it to the terminal b of the switch 204 as shown in portion (b) of FIG. 18. Subsequently, as soon as the FE signal equals the E level again at a time t14, the microcomputer 200 stops outputting the decelerating pulse Pe. In portion (a) of FIG. 18, FE2 denotes the FE signal obtained from the information storage layer L2.

Then, the microcomputer 200 connects together the terminals c and a of the switch 204 at the time t14, thereby starting a focus control all over again.

Since the drive value for the spherical aberration corrector 105 is set equal to DL2, the spherical aberration on the information storage layer L2 with the transparent layer thickness Z2 is zero. Thus, the FE detection sensitivity never decreases and the FE signal has no offset.

The drive value for the spherical aberration corrector 105 is defined such that the spherical aberration on the information storage layer L2 is minimized. Thus, the FE detection sensitivity equals one and the accelerating and decelerating pulses Ps and Pe can be applied exactly at the intended timings. Also, since the drive value is defined at such a value as to eliminate the spherical aberration from the information storage layer L2 with the transparent layer thickness Z2, the FE detection sensitivity equals SL2 on the information storage layer L1. However, by defining the setting of the multiplier 152 at SL1/SL2, the focus control system can have a predetermined open loop gain. Thus, the focus control system never loses its stability.

In this manner, by synchronously changing the drive value for the spherical aberration corrector 105 and the signal values at the terminals b of the multiplier 152 and adder 201 such that the focus control system can have a constant open loop gain, the spherical aberration corrector 105 can be controlled without allowing the focus control system to lose its stability.

Figure 19A:
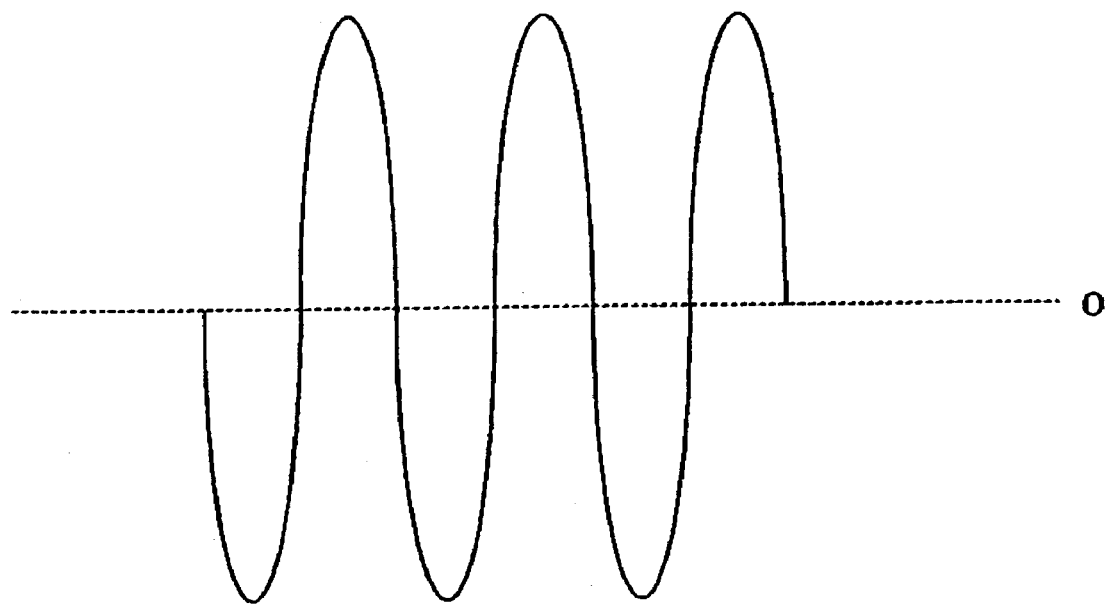
FIG. 19A is a graph showing a TE signal detected from the information storage layer L1 when the drive value of the driving signal supplied to the spherical aberration corrector 105 equals DL2.
Figure 19B:
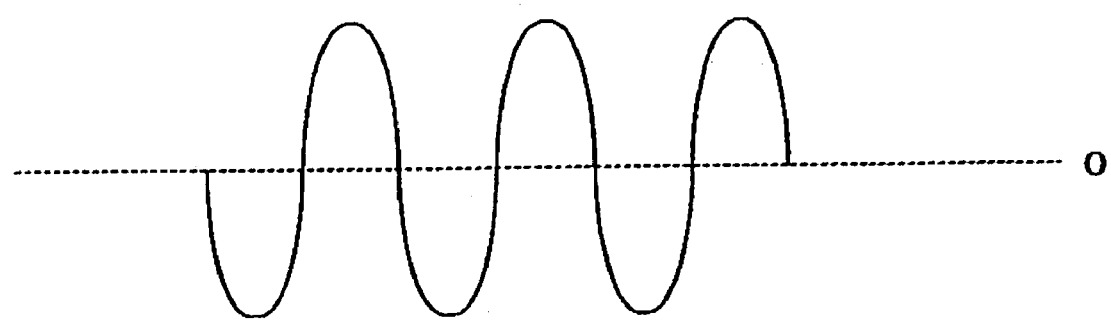
FIG. 19B is a graph showing a TE signal detected from the information storage layer L2 when the drive value of the driving signal supplied to the spherical aberration corrector 105 equals DL2.

Next, it will be described what processing should be carried out if the focal point of the light beam has failed to jump from the information storage layer L1 to the information storage layer L2. FIG. 19A shows the waveform of a TE signal to be detected from the information storage layer L1 while the drive value supplied to the spherical aberration corrector 105 equals DL2. In FIG. 19A, the abscissa represents the time. FIG. 19B shows the waveform of a TE signal to be detected from the information storage layer L2 while the drive value supplied to the spherical aberration corrector 105 equals DL2. Comparing the waveforms shown in FIGS. 19A and 19B, it can be seen that the TE signal shown in FIG. 19B has a smaller amplitude than the TE signal shown in FIG. 19A.

If the focal point has failed to jump the layers, then the tracking control should not work normally because the TE signal to be detected from the information storage layer L2 has relatively small amplitude. In that case, the microcomputer 200 could not read the address on the track accurately, and should have no idea of the failure in focus jumping.

Thus, after performing the focus jumping processing, the microcomputer 200 checks the amplitude of the TE signal detected. If the microcomputer 200 finds the amplitude of the TE signal less than a predetermined value, then the microcomputer 200 judges the focus jumping a failure, expects that the focal point should still be present on the information storage layer L1, and starts the focus jumping processing all over again.

In this example, the microcomputer 200 judges, by the amplitude of the TE signal detected, whether the focus jumping was a success or a failure. Alternatively or additionally, the microcomputer 200 may also make that decision by judging whether the tracking control is working normally or not. Then, the microcomputer 200 can make an even more accurate judgment.

Embodiment 5

Figure 20:
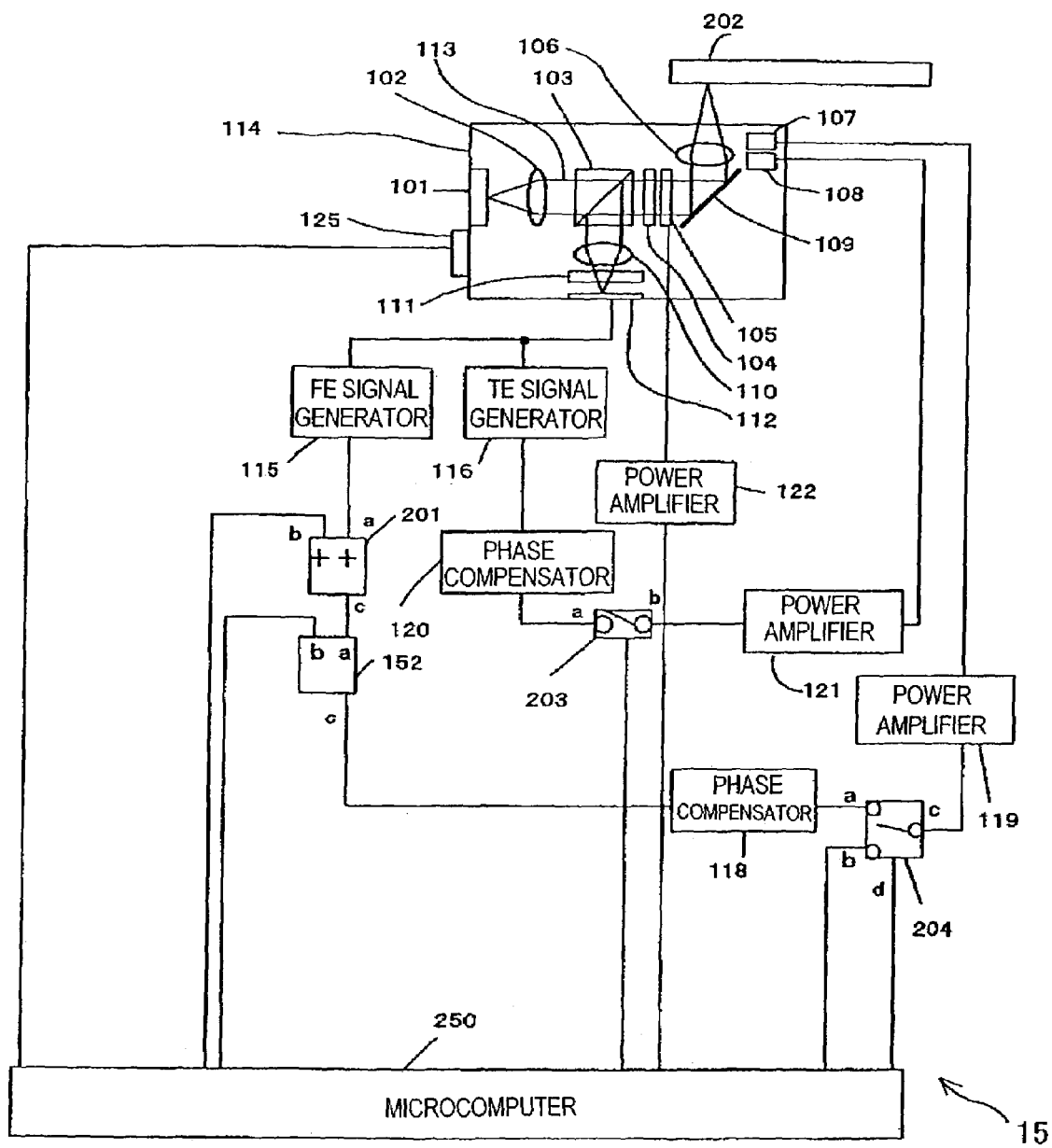
FIG. 20 is a block diagram showing a configuration for an optical disc drive 15 according to a fifth specific preferred embodiment of the present invention.

Hereinafter, a fifth specific preferred embodiment of the present invention will be described with reference to FIG. 20. FIG. 20 is a block diagram showing a configuration for an optical disc drive 15 according to the fifth preferred embodiment. The optical disc drive 15 of the fifth preferred embodiment is different from the optical disc drive 14 of the fourth preferred embodiment in the operation of the microcomputer 250.

As already described for the fourth preferred embodiment, in reading information from the information storage layer L1 of the optical disc 202, the optical disc drive 15 carries out a focus control such that the focal point of the light beam 113 is located right on the information storage layer L1. Also, the microcomputer 250 defines the drive value to be supplied to the spherical aberration corrector 105 at such a value as to minimize the spherical aberration on the information storage layer L1 with a transparent layer thickness Z1. Such a drive value will be identified herein by DL1. On the other hand, in reading information from the information storage layer L2, the optical disc drive 15 carries out a focus control such that the focal point of the light beam 113 is located right on the information storage layer L2. Also, the microcomputer 250 defines the drive value to be supplied to the spherical aberration corrector 105 at such a value as to minimize the spherical aberration on the information storage layer L2 with a transparent layer thickness Z2. Such a drive value will be identified herein by DL2.

Figure 21:
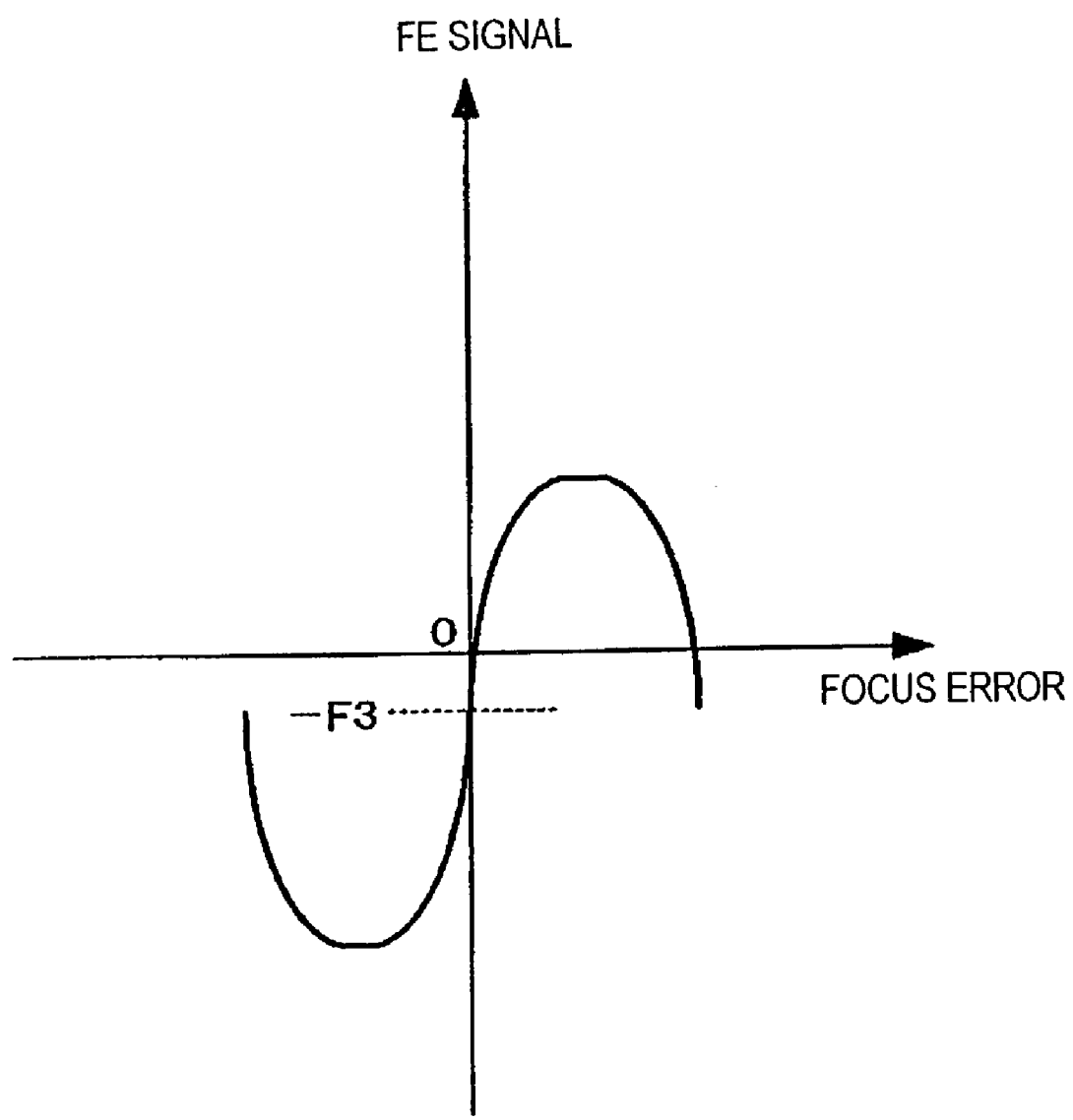
FIG. 21 is a graph showing the waveform of an FE signal with an offset.

When the drive value DL1 is supplied to the spherical aberration corrector 105, the FE signal exhibits the characteristic shown in FIG. 4 with respect to the information storage layer L1. The FE detection sensitivity is the slope of the curve representing the FE signal at a position where the deviation of the focal point from the information storage layer is zero. Such a slope will be identified herein by SL1. On the other hand, FIG. 21 is a graph showing an FE signal with an offset. In FIG. 21, the abscissa represents the deviation of the focal point from the information storage layer. Specifically, the FE signal shown in FIG. 21 is detected from the information storage layer L1 when the drive value supplied to the spherical aberration corrector 105 is (DL1+DL2)/2. As shown in FIG. 21, even when the deviation of the focal point from the information storage layer is zero, the FE signal is not equal to zero but has some offset F3. In the following description, the slope of the curve representing the FE signal (i.e., the FE detection sensitivity) at the position where the deviation of the focal point from the information storage layer is zero will be identified herein by SL3. Then, SL3<SL1.

This FE detection sensitivity SL3 is greater than the FE detection sensitivity SL2 that was described for the fourth preferred embodiment with reference to FIG. 17. The reason is that when the FE detection sensitivity equals SL3, the drive value supplied to the spherical aberration corrector 105 is (DL1+DL2)/2, which is not so much different from the reference drive value DL1 shown in FIG. 6B as the drive value DL2 for the FE detection sensitivity SL2.

Hereinafter, it will be described how to jump the focal point from the information storage layer L1 to the information storage layer L2. Suppose the optical disc drive 15 is now performing a focus control such that the focal point is located right on the information storage layer L1 as described above. Initially, the drive value DL1 is supplied to the spherical aberration corrector 105.

First, the microcomputer 250 defines the drive value to be supplied to the spherical aberration corrector 105 at such a value as to minimize the spherical aberration on the information storage layer L2 when the transparent layer thickness thereof is equal to (Z1+Z2)/2. That is to say, the microcomputer 250 changes the drive value from DL1 into (DL1+DL2)/2. Next, the microcomputer 250 changes the settings of the multiplier 152, thereby keeping the open loop gain of the focus control system constant. Furthermore, the microcomputer 250 also changes the settings of the adder 201 to correct the offset of the FE signal. In such a state, the microcomputer 250 once suspends the focus control and raises the objective lens 106, thereby jumping the focal point to the information storage layer L2. Thereafter, the microcomputer 250 resumes the focus control. Subsequently, the microcomputer 250 defines the drive value to be supplied to the spherical aberration corrector 105 at such a value as to minimize the spherical aberration on the information storage layer L2 when the transparent layer thickness thereof is equal to Z2. That is to say, the microcomputer 250 changes the drive value from (DL1+DL2)/2 into DL2. Next, the microcomputer 250 changes the setting of the multiplier 152 into one, thereby keeping the open loop gain of the focus control system constant. Furthermore, the microcomputer 250 also changes the setting of the adder 201 into zero.

Figure 22:
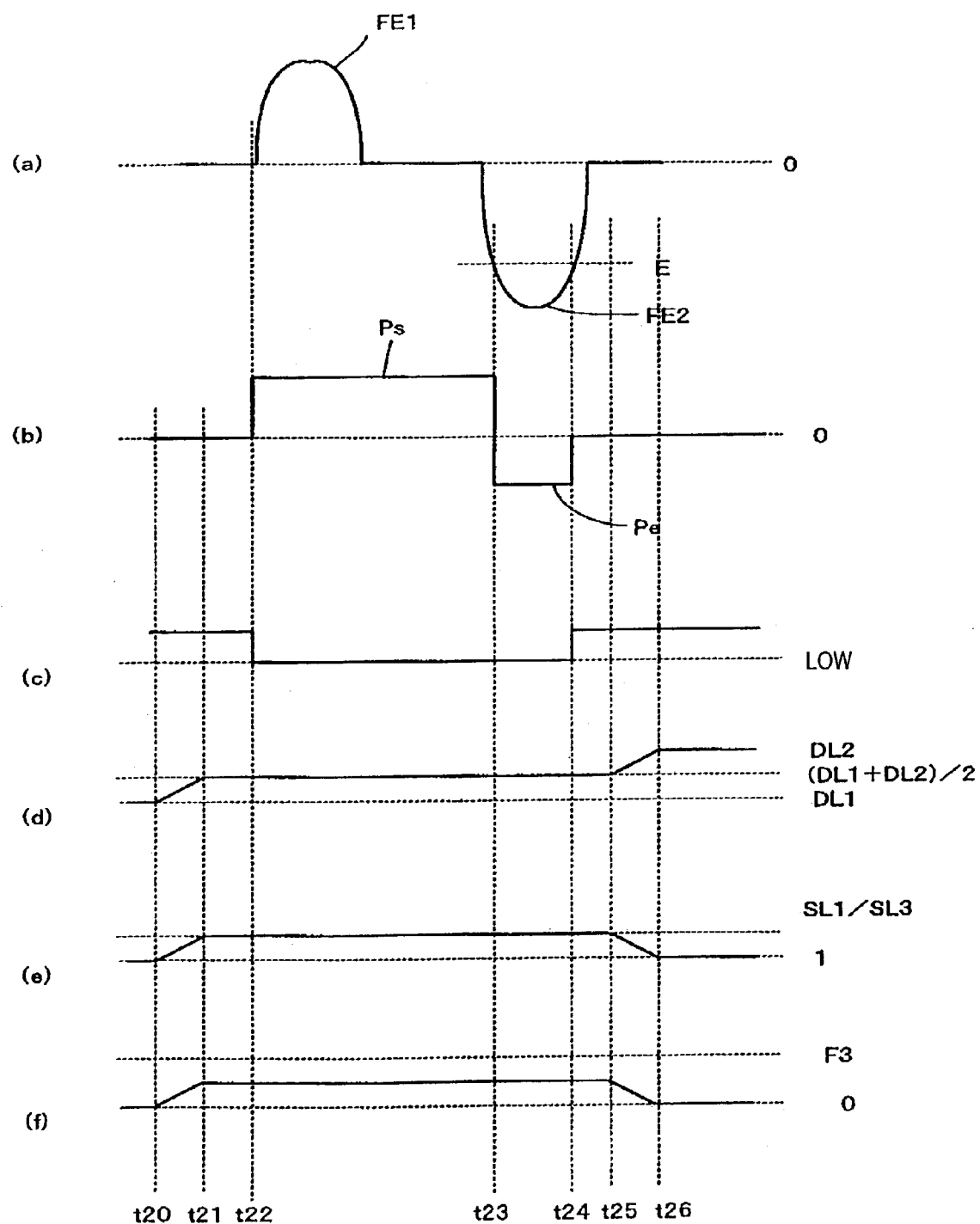
FIG. 22 is a timing diagram showing the waveforms of various signals to be supplied to jump the focal point from the information storage layer L1 to the information storage layer L2.

Next, the timings of various signals to be supplied to jump the focal point from the information storage layer L1 to the information storage layer L2 will be described with reference to FIG. 22. FIG. 22 is a timing diagram showing the waveforms of those signals. Specifically, portion (a) of FIG. 22 shows the waveform of the FE signal; portion (b) shows the waveform of a signal that is output from the microcomputer 250 to the terminal b of the switch 204; portion (c) shows the waveform of a signal that is output from the microcomputer 250 to the terminal d of the switch 204; portion (d) shows the drive value to be supplied to the spherical aberration corrector 105; portion (e) shows the waveform of a signal that is output from the microcomputer 250 to the terminal b of the multiplier 152; and portion (f) shows the waveform of a signal that is output from the microcomputer 250 to the terminal b of the adder 201.

At a time t20, the drive value supplied to the spherical aberration corrector 105 is DL1 as shown in portion (d) of FIG. 22, the signal received at the terminal b of the multiplier 152 is one as shown in portion (e) of FIG. 22, and the signal received at the terminal b of the adder 201 is zero as shown in portion (f) of FIG. 22. In such a state, the focus control system has a predetermined open loop gain.

Then, the microcomputer 250 gradually changes the drive value for the spherical aberration corrector 105 from DL1 into (DL1+DL2)/2 in the period between the times t20 and t21 as shown in portion (d) of FIG. 22. In the meantime, the microcomputer 250 also changes the signal value at the terminal b of the multiplier 152 from one into SL1/SL3 as shown in portion (e) of FIG. 22 and further changes gradually the signal value at the terminal b of the adder 201 from zero into F3 as shown in portion (f) of FIG. 22.

At the time t21, the drive value for the spherical aberration corrector 105 reaches (DL1+DL2)/2, which minimizes the spherical aberration on the information storage layer L2 when the transparent layer thickness thereof is (Z1+Z2)/2. Then, a spherical aberration is created at the focal point of the light beam 113 on the information storage layer L1, the FE detection sensitivity decreases, and the FE signal comes to have an offset. However, if the microcomputer 250 changes the signal values at the terminals b of the adder 201 and multiplier 152 into F3 and SL1/SL3, respectively, the multiplier 152 outputs substantially the same FE signal as in the situation where the drive value for the spherical aberration corrector 105 is DL1. Thus, the focus control does not lose its stability. Also, since the drive value for the spherical aberration corrector 105 and the signal values at the terminals b of the multiplier 152 and adder 201 are gradually changed at the same time, the focus control is also stabilized even during the period between the times t20 and t21.

Next, at a time t22, the microcomputer 250 connects together the terminals b and c of the switch 204, thereby stopping the focus control. Also, as shown in portion (b) of FIG. 22, the microcomputer 250 outputs an accelerating pulse Ps to the terminal b of the switch 204 to drive the objective lens 106 toward the information storage layer L2. As a result, the objective lens 106 starts to move toward the information storage layer L2 and the focal point of the light beam 113 also starts to move toward the information storage layer L2. In portion (a) of FIG. 22, FE1 denotes the FE signal obtained from the information storage layer L1.

Thereafter, on sensing that the FE signal has reached an E level at a time t23 as shown in portion (a) of FIG. 22, the microcomputer 250 switches the accelerating pulse Ps into a decelerating pulse Pe and outputs it to the terminal b of the switch 204 as shown in portion (b) of FIG. 22. Subsequently, as soon as the FE signal equals the E level again at a time t24, the microcomputer 250 stops outputting the decelerating pulse Pe. In portion (a) of FIG. 22, FE2 denotes the FE signal obtained from the information storage layer L2.

Then, the microcomputer 250 connects together the terminals c and a of the switch 204 at the time t24, thereby starting a focus control all over again. The microcomputer 250 gradually changes the drive value for the spherical aberration corrector 105 from (DL1+DL2)/2 into DL2 in the period between the times t25 and t26 as shown in portion (d) of FIG. 22. In the meantime, the microcomputer 250 also changes the signal value at the terminal b of the multiplier 152 from SL1/SL3 into one as shown in portion (e) of FIG. 22 and further changes gradually the signal value at the terminal b of the adder 201 from F3 as into zero shown in portion (f) of FIG. 22.

Since the drive value for the spherical aberration corrector 105 reaches DL2 at the time t26, the spherical aberration on the information storage layer L2 with the transparent layer thickness Z2 is zero. Thus, the FE detection sensitivity never decreases, and the FE signal has no offset.

In this preferred embodiment, while the focal point is still present on the information storage layer L1, the drive value for the spherical aberration corrector 105 is set equal to (DL1+DL2)/2 corresponding to the average between the transparent layer thickness Z1 of the information storage layer L1 and the transparent layer thickness Z2 of the information storage layer L2. Thus, compared to the situation where a drive value corresponding to the transparent layer thickness Z2 of the information storage layer L2 is supplied, the focus control can be further stabilized on the information storage layer L1.

Embodiment 6

Figure 23:
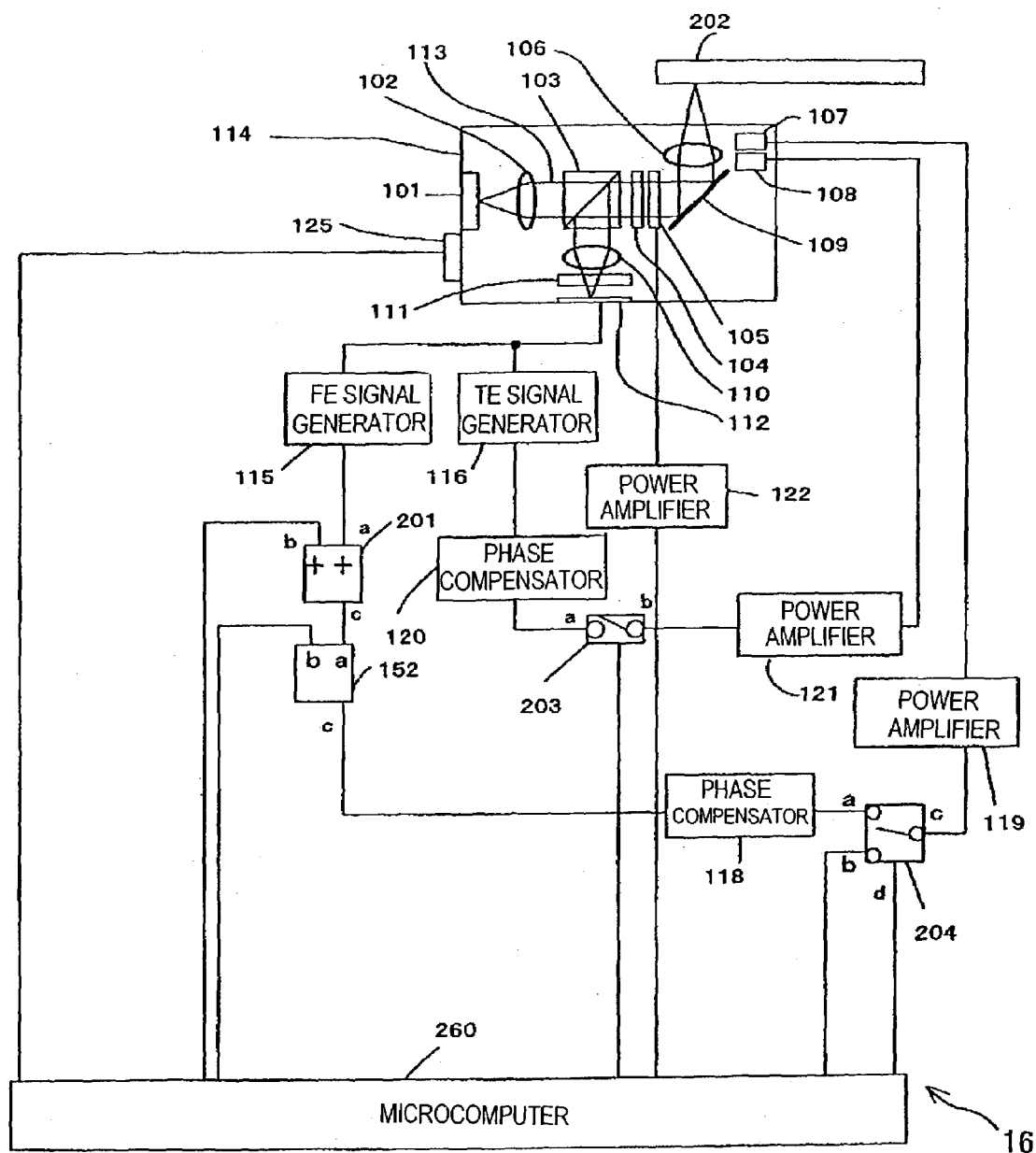
FIG. 23 is a block diagram showing a configuration for an optical disc drive 16 according to a sixth specific preferred embodiment of the present invention.

Hereinafter, a sixth specific preferred embodiment of the present invention will be described with reference to FIG. 23. FIG. 23 is a block diagram showing a configuration for an optical disc drive 16 according to the sixth preferred embodiment. The optical disc drive 16 of the sixth preferred embodiment is different from the optical disc drive 14 or 15 of the fourth or fifth preferred embodiment in the operation of the microcomputer 260.

As already described for the fourth preferred embodiment, in reading information from the information storage layer L1 of the optical disc 202, the optical disc drive 16 carries out a focus control such that the focal point of the light beam 113 is located right on the information storage layer L1. Also, the microcomputer 260 defines the drive value to be supplied to the spherical aberration corrector 105 at such a value as to minimize the spherical aberration on the information storage layer L1 with a transparent layer thickness Z1. Such a drive value will be identified herein by DL1. On the other hand, in reading information from the information storage layer L2, the optical disc drive 16 carries out a focus control such that the focal point of the light beam 113 is located right on the information storage layer L2. Also, the microcomputer 260 defines the drive value to be supplied to the spherical aberration corrector 105 at such a value as to minimize the spherical aberration on the information storage layer L2 with a transparent layer thickness Z2. Such a drive value will be identified herein by DL2.

When the drive value DL2 is supplied to the spherical aberration corrector 105, the FE signal exhibits the characteristic shown in FIG. 4 with respect to the information storage layer L2. The FE detection sensitivity is the slope of the curve representing the FE signal at a position where the deviation of the focal point from the information storage layer is zero. Such a slope will be identified herein by SL1. On the other hand, FIG. 17 is a graph showing the waveform of an FE signal when the drive value supplied to the spherical aberration corrector 105 is DL1. The FE detection sensitivity in this situation will be identified herein by SL2. Then, SL2<SL1. As shown in FIG. 17, even when the deviation of the focal point from the information storage layer is zero, the FE signal is not equal to zero but has some offset F.

Hereinafter, it will be described how to jump the focal point from the information storage layer L1 to the information storage layer L2. Suppose the optical disc drive 16 is now performing a focus control such that the focal point is located right on the information storage layer L1 as described above. Initially, the drive value DL1 is supplied to the spherical aberration corrector 105.

First, the microcomputer 260 once suspends the focus control. Then, in a situation where the drive value DL1 is supplied to the spherical aberration corrector 105 and where the transparent layer thickness equals Z2, the microcomputer 260 changes the settings of the multiplier 152, thereby keeping the open loop gain of the focus control system constant. Furthermore, the microcomputer 260 also changes the settings of the adder 201 to correct the offset of the FE signal.

Then, the microcomputer 260 raises the objective lens 106, thereby jumping the focal point to the information storage layer L2. Thereafter, the microcomputer 260 resumes the focus control. Subsequently, the microcomputer 260 defines the drive value to be supplied to the spherical aberration corrector 105 at such a value as to minimize the spherical aberration on the information storage layer L2 when the transparent layer thickness thereof is equal to Z2. That is to say, the microcomputer 260 changes the drive value from DL1 into DL2. Next, the microcomputer 260 changes the signal value at the terminal b of the multiplier 152 into one, thereby keeping the open loop gain of the focus control system constant. Furthermore, the microcomputer 260 also changes the signal value at the terminal b of the adder 201 into zero.

Figure 24:
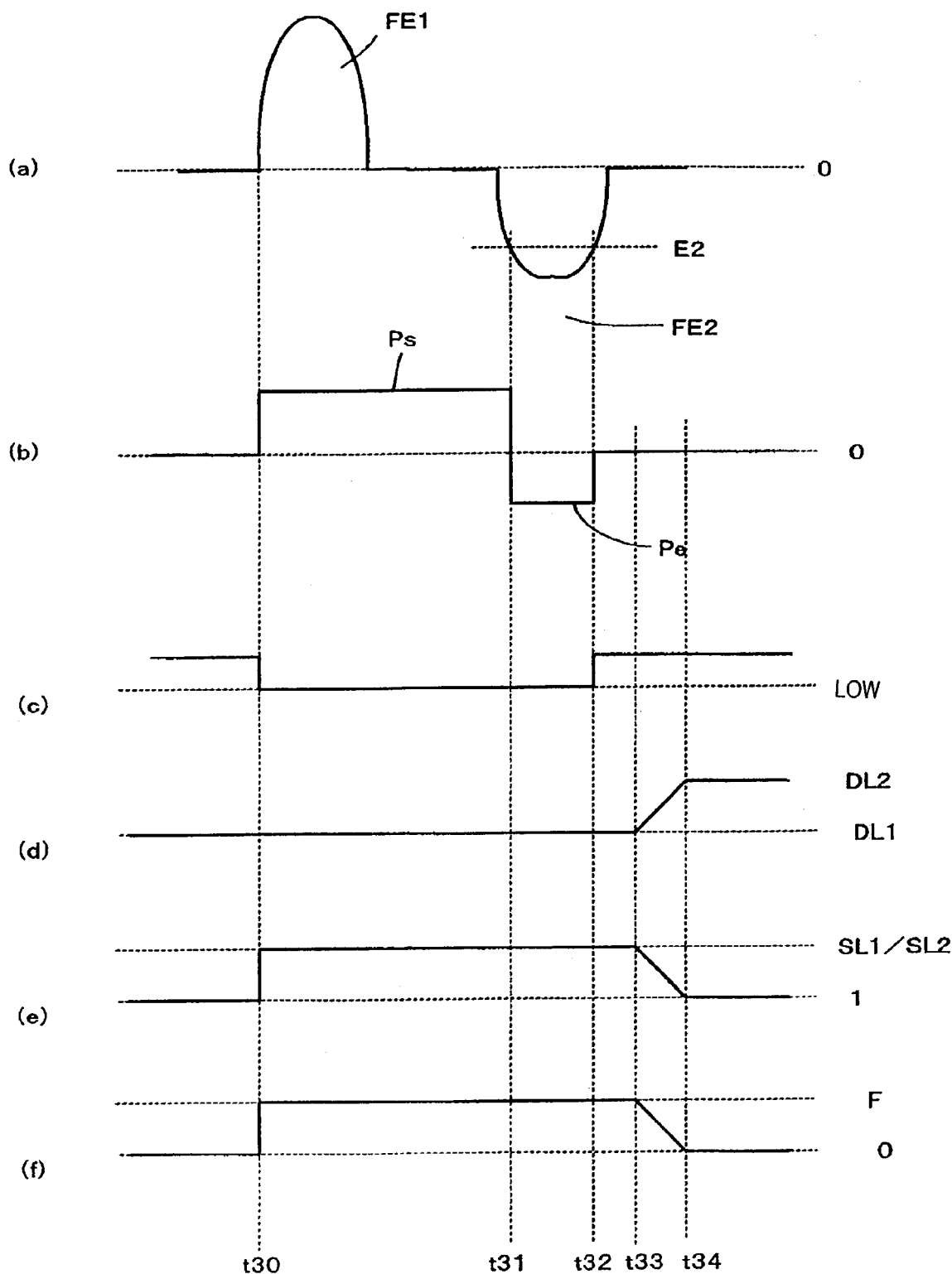
FIG. 24 is a timing diagram showing the waveforms of various signals to be supplied to jump the focal point from the information storage layer L1 to the information storage layer L2.

Next, the timings of various signals to be supplied to jump the focal point from the information storage layer L1 to the information storage layer L2 will be described with reference to FIG. 24. FIG. 24 is a timing diagram showing the waveforms of those signals. Specifically, portion (a) of FIG. 24 shows the waveform of the FE signal; portion (b) shows the waveform of a signal that is output from the microcomputer 260 to the terminal b of the switch 204; portion (c) shows the waveform of a signal that is output from the microcomputer 260 to the terminal d of the switch 204; portion (d) shows the drive value to be supplied to the spherical aberration corrector 105; portion (e) shows the waveform of a signal that is output from the microcomputer 260 to the terminal b of the multiplier 152; and portion (f) shows the waveform of a signal that is output from the microcomputer 260 to the terminal b of the adder 201.

Before a time t30, the drive value supplied to the spherical aberration corrector 105 is DL1 as shown in portion (d) of FIG. 24, the signal received at the terminal b of the multiplier 152 is one as shown in portion (e) of FIG. 24, and the signal received at the terminal b of the adder 201 is zero as shown in portion (f) of FIG. 24. In such a state, the focus control system has a predetermined open loop gain.

At the time t30, the microcomputer 260 connects together the terminals b and C of the switch 204, thereby stopping the focus control. Also, as shown in portion (b) of FIG. 24, the microcomputer 260 outputs an accelerating pulse Ps to the terminal b of the switch 204 to drive the objective lens 106 toward the information storage layer L2. As a result, the objective lens 106 starts to move toward the information storage layer L2 and the focal point of the light beam 113 also starts to move toward the information storage layer L2. In portion (a) of FIG. 24, FE1 denotes the FE signal obtained from the information storage layer L1.

At the same time t30, the microcomputer 260 changes the signal value at the terminal b of the multiplier 152 from one into SL1/SL2 as shown in portion (e) of FIG. 24 and the signal value at the terminal b of the adder 201 from zero into F as shown in portion (f) of FIG. 24, respectively.

Thereafter, on sensing that the FE signal has reached an E2 level at a time t31 as shown in portion (a) of FIG. 24, the microcomputer 260 switches the accelerating pulse Ps into a decelerating pulse Pe and outputs it to the terminal b of the switch 204 as shown in portion (b) of FIG. 24. Subsequently, as soon as the FE signal equals the E2 level again at a time t32, the microcomputer 260 stops outputting the decelerating pulse Pe. In portion (a) of FIG. 24, FE2 denotes the FE signal obtained from the information storage layer L2.

Then, in the period between times t33 and t34, the microcomputer 260 gradually increases the drive value for the spherical aberration corrector 105 from DL1 into DL2 as shown in portion (d) of FIG. 24, decreases the signal value at the terminal b of the multiplier 152 from SL1/SL2 into one as shown in portion (e) of FIG. 24, and decreases the signal value at the terminal b of the adder 201 from F into zero as shown in portion (f) of FIG. 24, respectively.

In the period between the times t31 and t33 in which the focal point is located in the vicinity of the information storage layer L2, the drive value supplied to the spherical aberration corrector 105 is DL1 as shown in portion (d) of FIG. 24. The drive value DL1 is such a value as to minimize the spherical aberration when the transparent layer thickness is Z1. Thus, in such a situation, a spherical aberration is created at the focal point of the light beam 113, the FE detection sensitivity decreases, and the FE signal comes to have an offset. However, if the signal values at the terminals b of the adder 201 and multiplier 152 are kept equal to F and SL1/SL2, respectively, the multiplier 152 outputs substantially the same FE signal as in the situation where the drive value for the spherical aberration corrector 105 is DL2 as shown in portion (a) of FIG. 24. Thus, the timings of the accelerating and decelerating pulses Ps and Pe can be defined accurately enough and the focus control does not lose its stability.

Next, it will be described what processing should be carried out if the focal point of the light beam has failed to jump from the information storage layer L1 to the information storage layer L2. While the drive value DL1 is being supplied to the spherical aberration corrector 105, the TE signal detected from the information storage layer L1 has greater amplitude than the TE signal detected from the information storage layer L2.

In this case, if the focal point has failed to jump from the information storage layer L1 to the information storage layer L2, then the TE signal should have relatively great amplitude in the period between the times t32 and t33. Thus, the microcomputer 260 checks the amplitude of the TE signal detected. If the microcomputer 260 finds the amplitude of the TE signal greater than a predetermined value, then the microcomputer 260 judges the focus jumping a failure, expects that the focal point should still be present on the information storage layer L1, and starts the focus jumping processing all over again. On the other hand, while the drive value DL2 is being supplied to the spherical aberration corrector 105, the TE signal detected from the information storage layer L1 has smaller amplitude than the TE signal detected from the information storage layer L2. In that case, if the focal point has failed to jump from the information storage layer L1 to the information storage layer L2, then the TE signal should have relatively small amplitude from the time t34 on. Thus, the microcomputer 260 checks the amplitude of the TE signal detected. If the microcomputer 260 finds the amplitude of the TE signal smaller than a predetermined value, then the microcomputer 260 judges the focus jumping a failure, expects that the focal point should still be present on the information storage layer L1, and starts the focus jumping processing all over again.

If the microcomputer 260 finds the amplitude of the TE signal relatively small from the time t34 on, the microcomputer 260 may judge the focus jumping a failure as described above. Alternatively, the microcomputer 260 may also sense the failure by seeing if the tracking control is working normally or not.

Embodiment 7

Figure 25:
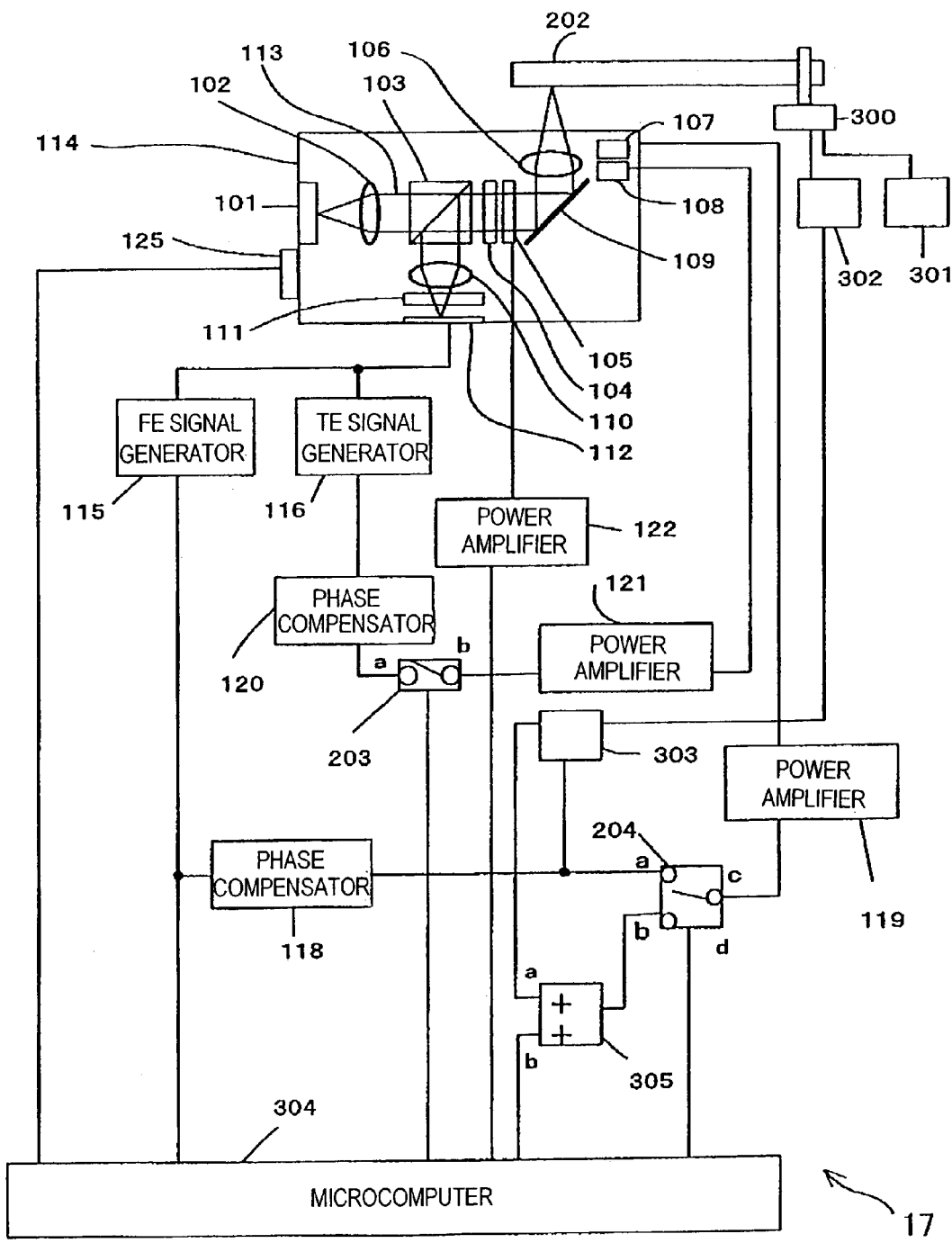
FIG. 25 is a block diagram showing a configuration for an optical disc drive 17 according to a seventh specific preferred embodiment of the present invention.

Hereinafter, a seventh specific preferred embodiment of the present invention will be described with reference to FIG. 25. FIG. 25 is a block diagram showing a configuration for an optical disc drive 17 according to the seventh preferred embodiment.

The optical disc drive 17 of this seventh preferred embodiment includes the tracking control section and the focus control section of the first preferred embodiment described above. Specifically, the focus control section includes: a focus error detecting section consisting of the photodetector 112 and the FE signal generator 115; a focusing direction changing section consisting of the power amplifier 119 and the focus actuator 107; and the phase compensator 118 as a focus controller. The optical disc drive 17 further includes a spherical aberration control section including the power amplifier 122 and the spherical aberration corrector 105.

As shown in FIG. 25, the optical disc drive 17 further includes a motor 300 for rotating the optical disc 202 thereon, a motor controller 301 and a rotational angle detector 302.

The motor controller 301 controls the rotational speed of the motor 300 at a predetermined speed. The rotational angle detector 302 detects and outputs a signal representing the rotational angle of the motor 300 (which will be referred to herein as a "rotational angle signal"). A single-rotation memory 303 stores the output voltage of the phase compensator 118 during one rotation of the optical disc 202 in response to the rotational angle signal. Then, responsive to the rotational angle signal, too, the memory 303 outputs the stored value to the terminal a of an adder 305.

Suppose the focal point of the light beam 113 is now located on the information storage layer L1. In reading information from the information storage layer L1, the microcomputer 304 connects together the terminals a and c of the switch 204, thereby performing a focus control such that the focal point is present on the information storage layer L1. Also, the microcomputer 304 defines the drive value for the spherical aberration corrector 105 at such a value DL1 as to minimize the spherical aberration.

Next, it will be described how the optical disc drive 17 performs the operation of jumping the focal point from the information storage layer L1 to the information storage layer L2. Since the optical disc 202 flutters, the objective lens 106 needs to catch up with the flutter. Thus, the output level of the phase compensator 118 changes proportionally to the magnitude of the flutter.

The microcomputer 304 instructs the single-rotation memory 303 to store the output voltage of the phase compensator 118. In this manner, the output level of the phase compensator 118, which changes proportionally to the magnitude of the flutter of the optical disc 202, is stored on the memory 303.

Then, the microcomputer 304 connects together the terminals b and c of the switch 204, thereby stopping the focus control operation. Subsequently, the microcomputer 304 drives the focus actuator 107 in accordance with the output of the adder 305. The output of the adder 305 is a signal obtained by adding together the value that has been stored in the memory 303 responsive to the rotational angle signal and a ramp that has been supplied from the microcomputer 304 to the terminal b of the adder 305.

In accordance with the output of the adder 305, i.e., the sum of the output of the single-rotation memory 303 and the ramp wave, the objective lens 106 is gradually driven toward the information storage layer L2.

Also, the microcomputer 304 changes the drive value for the spherical aberration corrector 105 from DL1 into DL2. The drive value DL2 is such a value as to minimize the spherical aberration on the information storage layer L2 with the transparent layer thickness L2.

On detecting the first zero-crossing of the FE signal, the microcomputer 304 connects together the terminals a and c of the switch 204, thereby resuming the focus control.

The objective lens 106 gradually approaches the information storage layer L2 in response to the ramp wave. For that reason, when the focal point reaches the vicinity of the information storage layer L2, the spherical aberration corrector 105 has already been settled.

Figure 26:
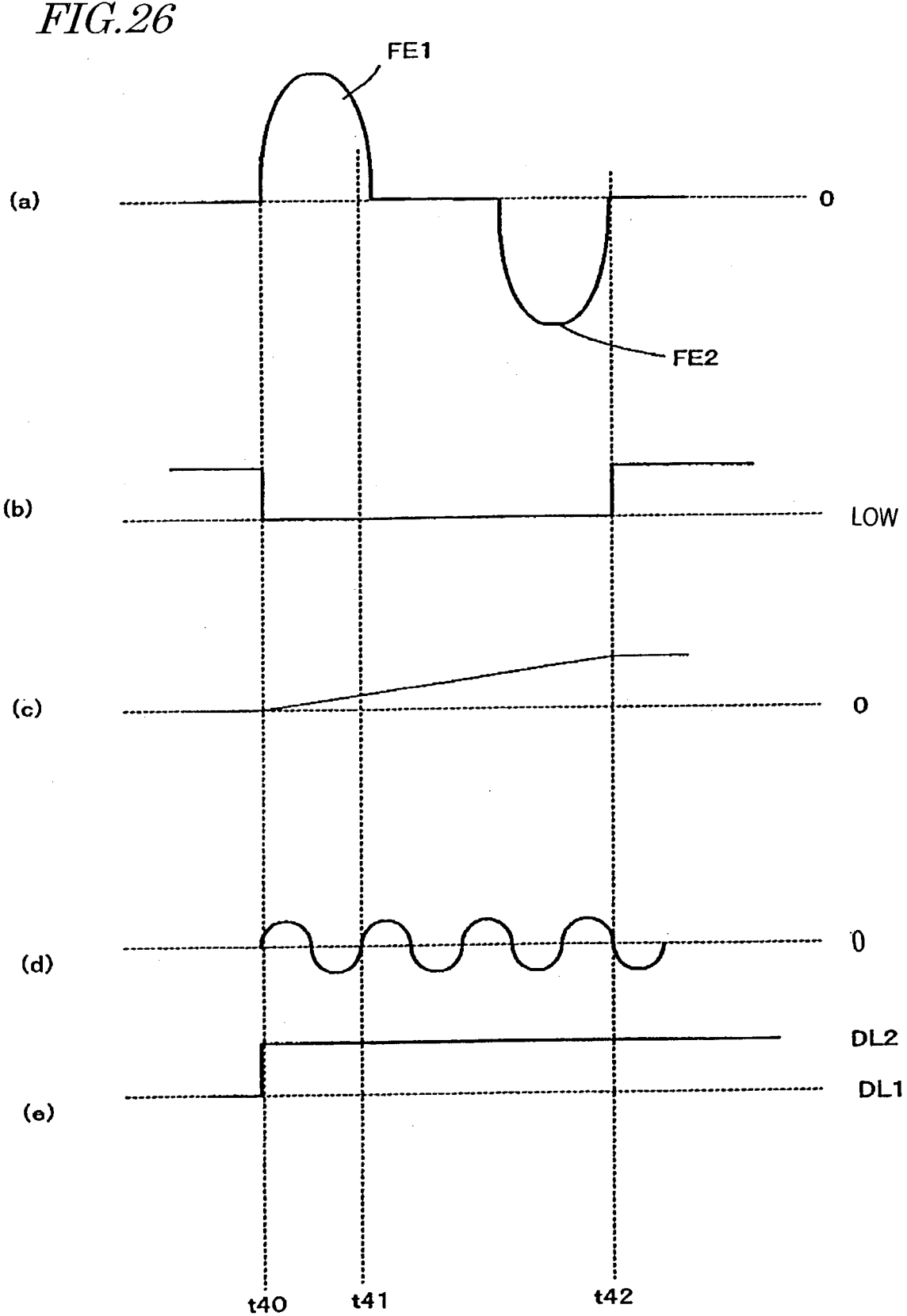
FIG. 26 is a timing diagram showing the waveforms of various signals to be supplied to jump the focal point from the information storage layer L1 to the information storage layer L2.

Next, the timings of various signals to be supplied to jump the focal point from the information storage layer L1 to the information storage layer L2 will be described with reference to FIG. 26. FIG. 26 is a timing diagram showing the waveforms of those signals. Specifically, portion (a) of FIG. 26 shows the waveform of the FE signal; portion (b) shows the waveform of a signal that is output from the microcomputer 304 to the terminal d of the switch 204; portion (c) shows the waveform of a signal that is output from the microcomputer 304 to the terminal b of the adder 305; portion (d) shows the output waveform of the single-rotation memory 303; and portion (e) shows the drive value to be supplied to the spherical aberration corrector 105.

First, at a time t40, the microcomputer 304 connects together the terminals b and c of the switch 204, thereby stopping the focus control operation. Then, the output of the single-rotation memory 303 will become a periodic waveform. In portion (d) of FIG. 26, the period between the times t40 and t41 represents one rotational period of the optical disc 202.

Then, the microcomputer 304 outputs the ramp wave to the terminal b of the adder 305 as shown in portion (c) of FIG. 26. Thus, the objective lens 106 gradually approaches the information storage layer L2 while going up and down as the optical disc 202 flutters. When the focal point reaches the information storage layer L2 at a time t42, the FE signal goes zero as shown in portion (a) of FIG. 26. On detecting this zero crossing, the microcomputer 304 connects together the terminals a and c of the switch 204, thereby resuming the focus control.

In this manner, according to this preferred embodiment, the relative velocity of the objective lens 106 with respect to the information storage layer of the optical disc 202 due to the flutter of the optical disc 202 can be reduced to substantially zero. Thus, the focus control can be stabilized. Also, the drive value for the spherical aberration corrector 105 is defined at such a value as to minimize the spherical aberration at the transparent layer thickness of the destination information storage layer. Accordingly, the FE detection sensitivity never decreases. Furthermore, since the FE signal has no offset, the focus control loop can be closed and the focus error can be controlled constantly based on the FE signal.

Embodiment 8

Figure 27:
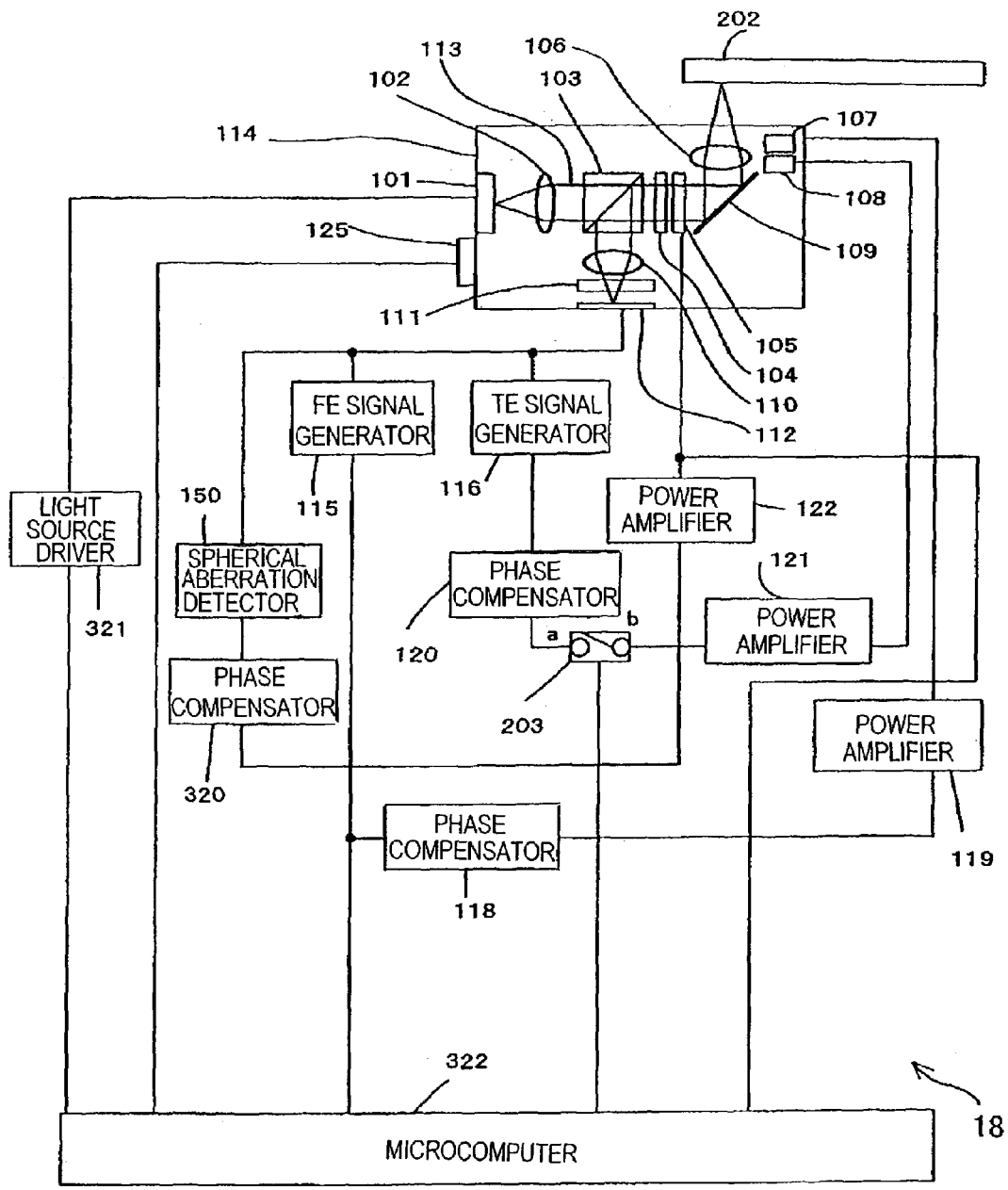
FIG. 27 is a block diagram showing a configuration for an optical disc drive 18 according to an eighth specific preferred embodiment of the present invention.

Hereinafter, an eighth specific preferred embodiment of the present invention will be described with reference to FIG. 27. FIG. 27 is a block diagram showing a configuration for an optical disc drive 18 according to the eighth preferred embodiment.

The optical disc drive 18 of this preferred embodiment includes not only the tracking, focus and spherical aberration control sections as already described for the first preferred embodiment but also an information writing section and a spherical aberration detecting section. The information writing section includes the light source 101 and a light source driver 321. On the other hand, the spherical aberration detecting section includes the spherical aberration detector 150 and a phase compensator 320.

As already described for the third preferred embodiment, the SAE signal is output from the spherical aberration detector 150 to the power amplifier 122 by way of the phase compensator 320. The microcomputer 322 sets the level of the SAE signal equal to zero by driving the spherical aberration corrector 105.

In accordance with the instruction of the microcomputer 322, the light source driver 321 controls the optical output power of the light source 101. The light source driver 321 also changes the optical output power depending on the information to be written on the optical disc 202.

At some point in time, the microcomputer 322 may open a switch 203 to stop the tracking control and start the focus control and spherical aberration control instead. However, the microcomputer 322 is always checking the level of the SAE signal. And on sensing that the level of the SAE signal has reached a predetermined range, the microcomputer 322 closes the switch 203 to start the tracking control. The microcomputer 322 operates in this manner for the following reasons. Specifically, if there is a relatively great spherical aberration, then the TE signal has too small amplitude to allow the beam spot to follow the target track. That is to say, the tracking control does not work in such a situation. Thus, in this preferred embodiment, the microcomputer 322 starts the tracking control on sensing, by the level of the SAE signal, that the spherical aberration has entered a predetermined range.

Also, after having sensed that the level of the SAE signal has entered the predetermined range, the microcomputer 322 starts writing information on the optical disc 202. The reason is as follows. Specifically, if the spherical aberration is relatively great, then the beam spot size is too big to write information on the optical disc 202 just as intended. For example, in such a situation, the information stored on an adjacent track may be erased by mistake. Thus, it is not until the spherical aberration has detected to have amount within the predetermined range based on a level of the SAE signal that the microcomputer 322 starts writing the information.

In this preferred embodiment, the tracking control operation and the operation of writing information on the optical disc 202 are not started until the level of the SAE signal has entered the predetermined range. Alternatively, the microcomputer 322 may also check the drive value to be supplied to the spherical aberration corrector 105 and may start the tracking control operation or the operation of writing information on the optical disc 202 on sensing that the drive value has reached a predetermined range. That is to say, the microcomputer 322 may regard the spherical aberration as falling within an allowable range when the drive value is within the predetermined range. Also, if the level of the SAE signal has exceeded the predetermined range while the information is being written on the optical disc 202, the microcomputer 322 may stop the write operation.

Embodiment 9

In the following ninth through thirteenth preferred embodiments of the present invention, the optical disc 1 to be read from or written to by the optical disc drive is supposed to have multiple information storage layers as shown in FIG. 1C or 1D. On each of those information storage layers, tracks such as those shown in FIG. 2 are arranged spirally.

Figure 28:
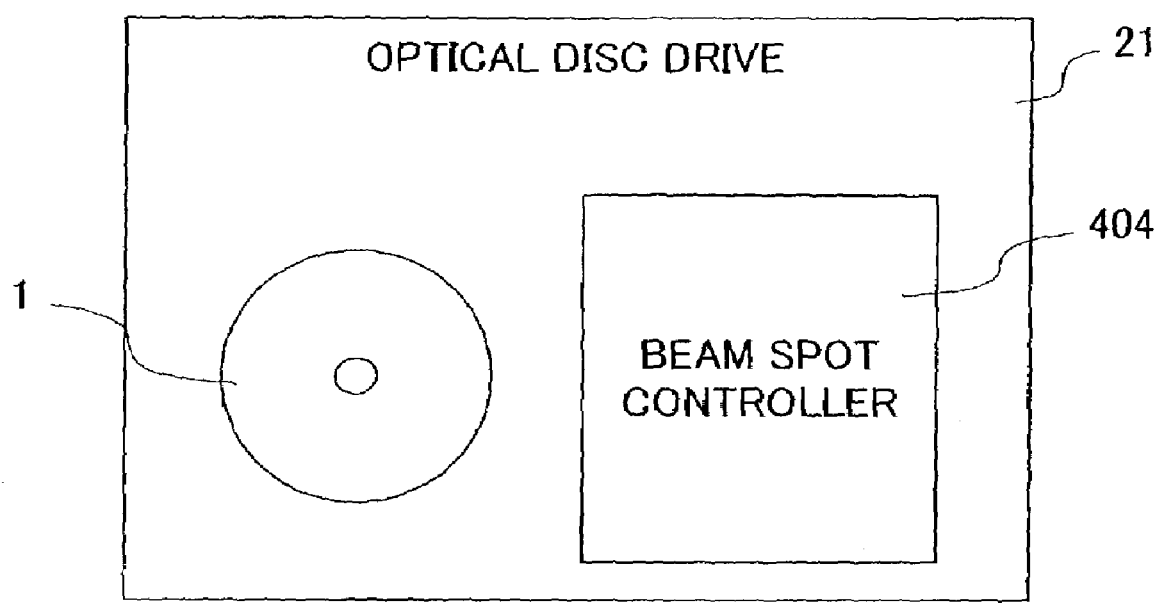
FIG. 28 is a block diagram showing the schematic configuration of an optical disc drive 21 according to a ninth specific preferred embodiment of the present invention.

FIG. 28 is a block diagram schematically showing an arrangement for an optical disc drive 21 according to a ninth specific preferred embodiment of the present invention. The optical disc drive 21 is used to gain access to a target location on the optical disc 1, which has been loaded thereto by the user, by focusing a light beam such as a laser beam, and forming a beam spot of the light beam, on the target location (or track). The optical disc drive 21 gains access to the desired location on a target information storage layer by jumping the beam spot of the light beam from the current information storage layer to the target information storage layer.

As shown in FIG. 28, the optical disc drive 21 includes a beam spot controller 404. In accordance with the instruction of a microcomputer (not shown) provided for the optical disc drive 21, the beam spot controller 404 performs a control operation of jumping the beam spot of a light beam that has been focused on one of at least two information storage layers of the optical disc 1 to another or the other information storage layer thereof. More specifically, the beam spot controller 404 moves the beam spot from the current track on one information storage layer (which track will be referred to herein as a "first track") to the target track on another information storage layer (which track will be referred to herein as a "second track"). In this case, if the second track is located closer to the outer edge of the optical disc 1 than the first track is, then the beam spot controller 404 forms the beam spot on the destination information storage layer and then shifts the beam spot outward on the information storage layer until the beam spot reaches the second track. On the other hand, if the second track is located closer to the inner edge of the optical disc 1 than the first track is, then the beam spot controller 404 shifts the beam spot inward on the current information storage layer and then forms the beam spot on the target track on the destination information storage layer. In this manner, the unwanted effects of flutter can be minimized efficiently. Thus, the focus jump performance can be improved with the failure rate thereof reduced.

As used herein, the "focus jump" means the control operation to be performed by the beam spot controller 404 to jump the beam spot of a focused light beam from one information storage layer to another.

Figure 29:
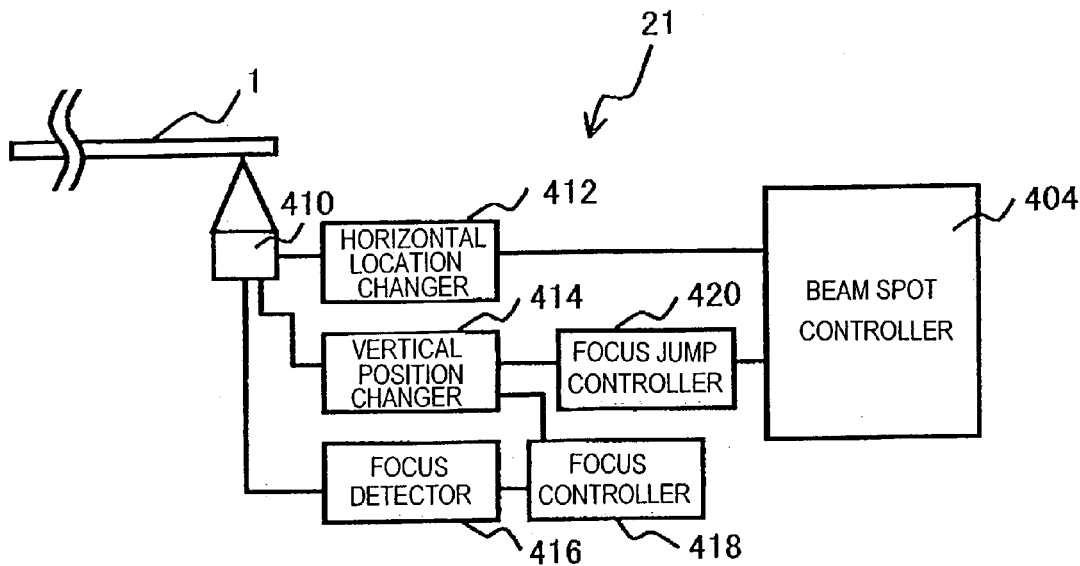
FIG. 29 is a block diagram showing the functional configuration of the optical disc drive 21 of the ninth preferred embodiment.

FIG. 29 is a block diagram showing the functional configuration of the optical disc drive 21 of this ninth preferred embodiment. As shown in FIG. 29, the optical disc drive 21 includes a focusing member 410, a horizontal location changer 412, a vertical position changer 414, a focus detector 416, a focus controller 418, a focus jump controller 420 and the beam spot controller 404. The focusing member 410 is used to focus the light beam on a selected information storage layer of the optical disc 1. The focusing member 410 may be an optical lens (e.g., objective lens), which may have an NA of more than 0.6 (e.g., 0.85). The vertical position changer 414 is used to move the focusing member 410 substantially perpendicularly to the information storage layers. The vertical position changer 414 may be an actuator, for example.

The focus detector 416 generates a signal representing the focusing state of the light beam with respect to the information storage layer. For example, the focus detector 416 may generate an error signal representing the vertical deviation of the beam spot from the target information storage layer of the optical disc 1. In accordance with the output signal of the focus detector 416, the focus controller 418 drives the vertical position changer 414, thereby controlling and keeping the focusing state of the light beam on the information storage layer substantially constant. Also, the focus controller 418 may turn the focus control OFF before the focus jump is carried out and may turn the focus control ON after the focus jump has been carried out. The focus jump controller 420 jumps the beam spot of the light beam, which has been focused on one of the multiple information storage layers, to another information storage layer. The focus jump controller 420 may drive the vertical position changer 414 in such a manner as to control the focus jump operation arbitrarily.

The horizontal location changer 412 horizontally shifts the beam spot either inward or outward on the selected information storage layer of the optical disc 1. For example, the horizontal location changer 412 may shift the beam spot across the tracks on the information storage layer of the optical disc 1. The horizontal location changer 412 may shift the beam spot horizontally by driving the focusing member 410 either inward or outward under the optical disc 1.

Figure 30:
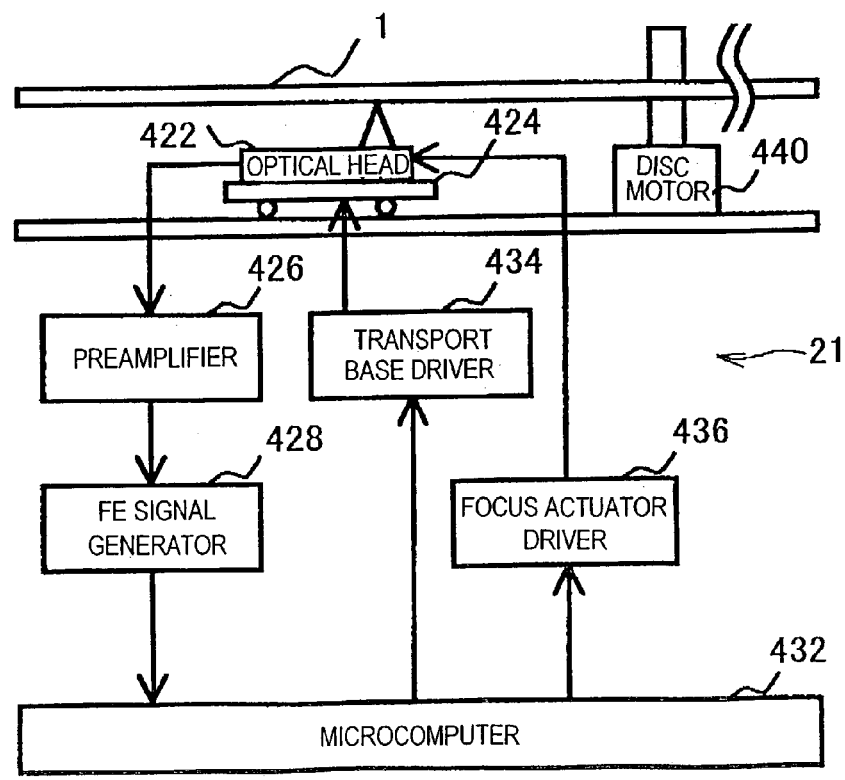
FIG. 30 is a block diagram showing an exemplary hardware arrangement for the optical disc drive 21 shown in FIG. 29.

FIG. 30 shows an exemplary hardware arrangement for the optical disc drive 21 shown in FIG. 29. As shown in FIG. 30, the optical disc drive 21 includes a disc motor 440, an optical head 422, a preamplifier 426, a focus actuator driver 436, a transport base 424, a transport base driver 434, a focus error (FE) signal generator 428 and a microcomputer 432. The disc motor 440 rotates the optical disc 1 at a predetermined rotational speed.

The microcomputer 432 controls the operations of the focus actuator driver 436 and the transport base driver 434. Also, responsive to an FE signal that has been supplied from the focus error signal generator 428, the microcomputer 432 performs a filter operation for the purpose of phase compensation or gain compensation, thereby outputting a control signal. The microcomputer 432 may be replaced with a digital signal processor (DSP). The transport base driver 434 drives the transport base 424 by outputting a drive signal thereto. The transport base 424 is provided to move the optical head 422 in the radial direction of the optical disc 1. The optical head 422 emits a light beam toward the optical disc 1, thereby forming a beam spot on the information storage layer of the optical disc 1. Also, on receiving the light beam that has been reflected from the optical disc 1, the optical head 422 outputs a signal representing the intensity of the light beam received. The preamplifier 426 converts a current signal, which has been supplied from the photodetector 444 (to be described later) of the optical head 422, into a voltage signal.

In response to the output signal of the preamplifier 426, the focus error signal generator 428 outputs a focus error (FE) signal. The FE signal is used in a control operation to define a predetermined focusing state for the light beam on the information storage layer of the optical disc 1. The FE signal may be detected by any detection method: an astigmatism method, a knife edge method or a spot sized detection (SSD) method. The circuit configuration of the FE signal generator 428 may also be changed appropriately with the detection method adopted.

In response to a control signal supplied from the microcomputer 432, the focus actuator driver 436 drives the focus actuator 443 (to be described later) of the optical head 422.

Figure 31:
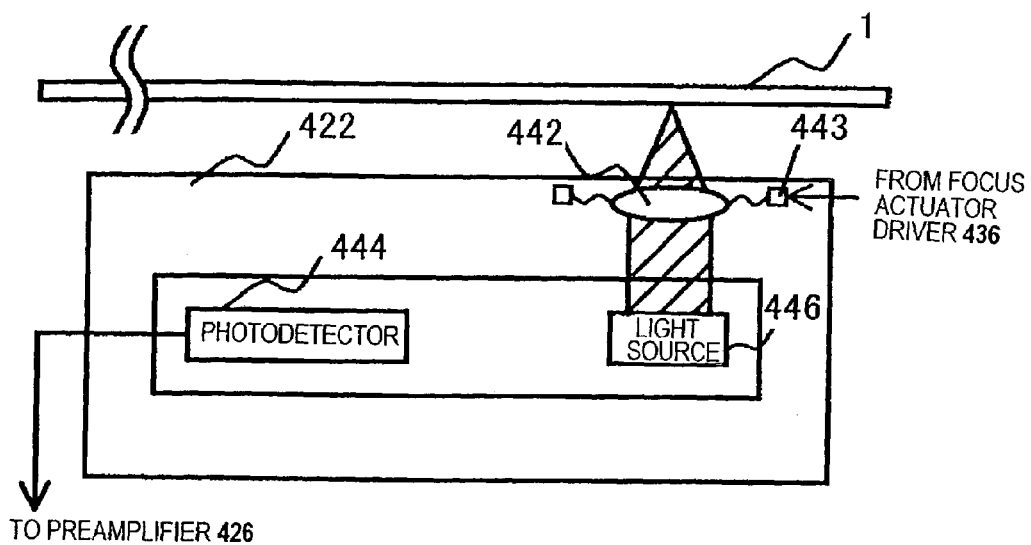
FIG. 31 is a block diagram showing the schematic configuration of the optical head 422 shown in FIG. 30.

FIG. 31 is a block diagram showing a schematic configuration for the optical head 422. As shown in FIG. 31, the optical head 422 includes a light source 446, an optical lens (or objective lens) 442, a photodetector 444, and a focus actuator 443. The light source 446 may be a semiconductor laser diode, for example, which emits a light beam with a predetermined wavelength that may be either about 680 nm or less or about 410 nm or less (e.g., about 405 nm).

The optical lens 442 converges and focuses the light beam that has been emitted from the light source 446, thereby forming a beam spot on the information storage layer of the optical disc 1. Also, the optical lens 442 transmits the light beam that has been reflected from the optical disc 1. On receiving the light beam that has been reflected from the optical disc 1 and then transmitted through the optical lens 442, the photodetector 444 converts the optical signal into an electric signal (i.e., a current signal). The photodetector 444 may have four divided regions, for example. The focus actuator 443 is provided to move the optical lens 442 up and down substantially perpendicularly to the information storage layer of the optical disc 1.

It should be noted that the optical lens 442 is equivalent to the focusing member 410 shown in FIG. 29. The photodetector 444, preamplifier 426 and FE signal generator 428 together make up the focus detector 416 shown in FIG. 29. The focus actuator driver 436 and focus actuator 443 may be used as the vertical position changer 414 shown in FIG. 29. Also, the microcomputer 432 performs the functions of the beam spot controller 404, focus jump controller 420 and focus controller 418 shown in FIG. 29.

Figure 32:
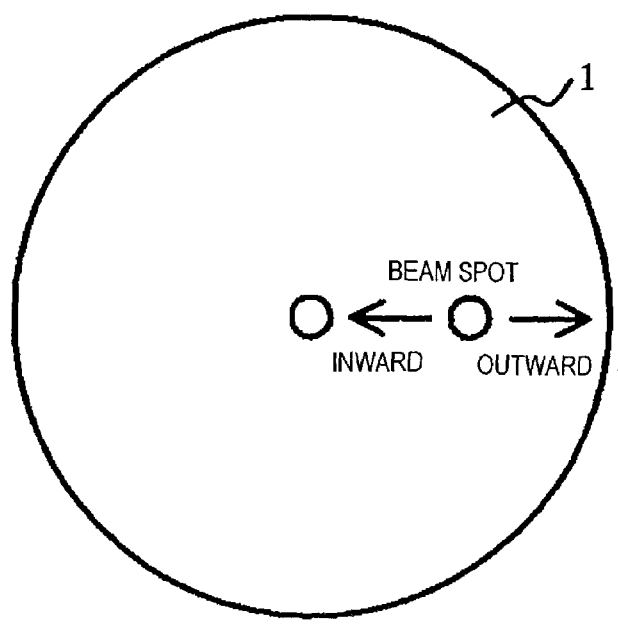
FIG. 32 shows how a beam spot may shift either inward or outward.

Hereinafter, the operation of the optical disc drive 21 will be described with reference to FIGS. 32 through 36. FIG. 32 is a plan view showing how a beam spot may be shifted inward or outward on the optical disc 1. The horizontal location changer 412 shifts the beam spot inward or outward on the optical disc 1. As shown in FIG. 32, if the beam spot is shifted in the radial direction toward the outer edge of the optical disc 1, then the beam spot is shifted "outward". On the other hand, if the beam spot is shifted in the radial direction toward the inner edge of the optical disc 1, then the beam spot is shifted "inward".

Figure 33:
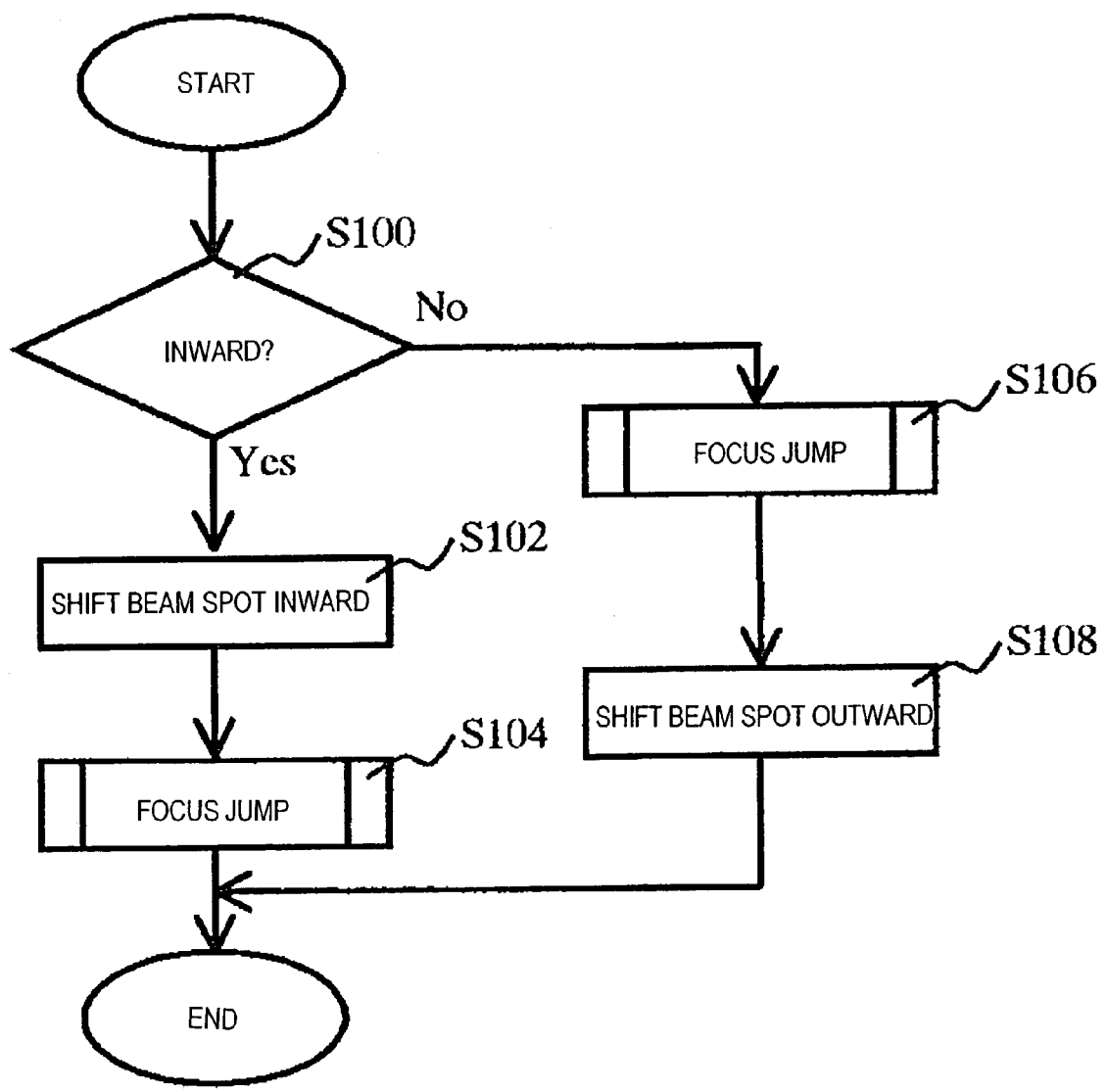
FIG. 33 is a flowchart showing the flow of a beam spot moving process to be performed by the optical disc drive 21 shown in FIG. 29.

FIG. 33 is a flowchart showing the flow of a beam spot moving process to be performed by the optical disc drive 21 shown in FIG. 29. To jump the beam spot from one information storage layer to another, the optical disc drive 21 performs the process shown in FIG. 33.

First, in Step S100, the beam spot controller 404 shown in FIG. 29 starts the beam spot moving process by determining whether the beam spot should be shifted inward or outward. More specifically, the beam spot controller 404 determines whether the desired track on the target information storage layer is located inside or outside of the current track on the present information storage layer. If the desired track is located inside of the current track (i.e., if the answer to the query of Step S100 is YES), then the beam spot controller 404 instructs the horizontal location changer 412 to shift the beam spot inward on the present information storage layer in Step S102. Thereafter, as soon as the beam spot reaches a corresponding track on the present information storage layer (i.e., a track that is located just over or under the desired track on the target information storage layer), the horizontal location changer 412 stops shifting the beam spot. As used herein, a pair of "corresponding" tracks is supposed to overlap with each other substantially completely as viewed perpendicularly to the surface of the optical disc 1.

When the beam spot reaches the corresponding track, the beam spot controller 404 instructs the focus jump controller 420 shown in FIG. 29 to jump the beam spot from the present information storage layer to the target information storage layer in Step S104. As a result, a beam spot is formed on the desired track on the target information storage layer.

On the other hand, if the desired track is located outside of the current track (i.e., if the answer to the query of Step S100 is NO), then the beam spot controller 404 instructs the focus jump controller 420 to jump the beam spot from the present information storage layer to the target information storage layer in Step S106. As a result, the beam spot jumps vertically from the present information storage layer to the target information storage layer. Thereafter, in Step S108, the beam spot controller 404 instructs the horizontal location changer 412 to shift the beam spot outward on the target information storage layer until the beam spot reaches the desired track on the target information storage layer. In this manner, the beam spot is formed on the desired track on the target information storage layer.

Figure 34:
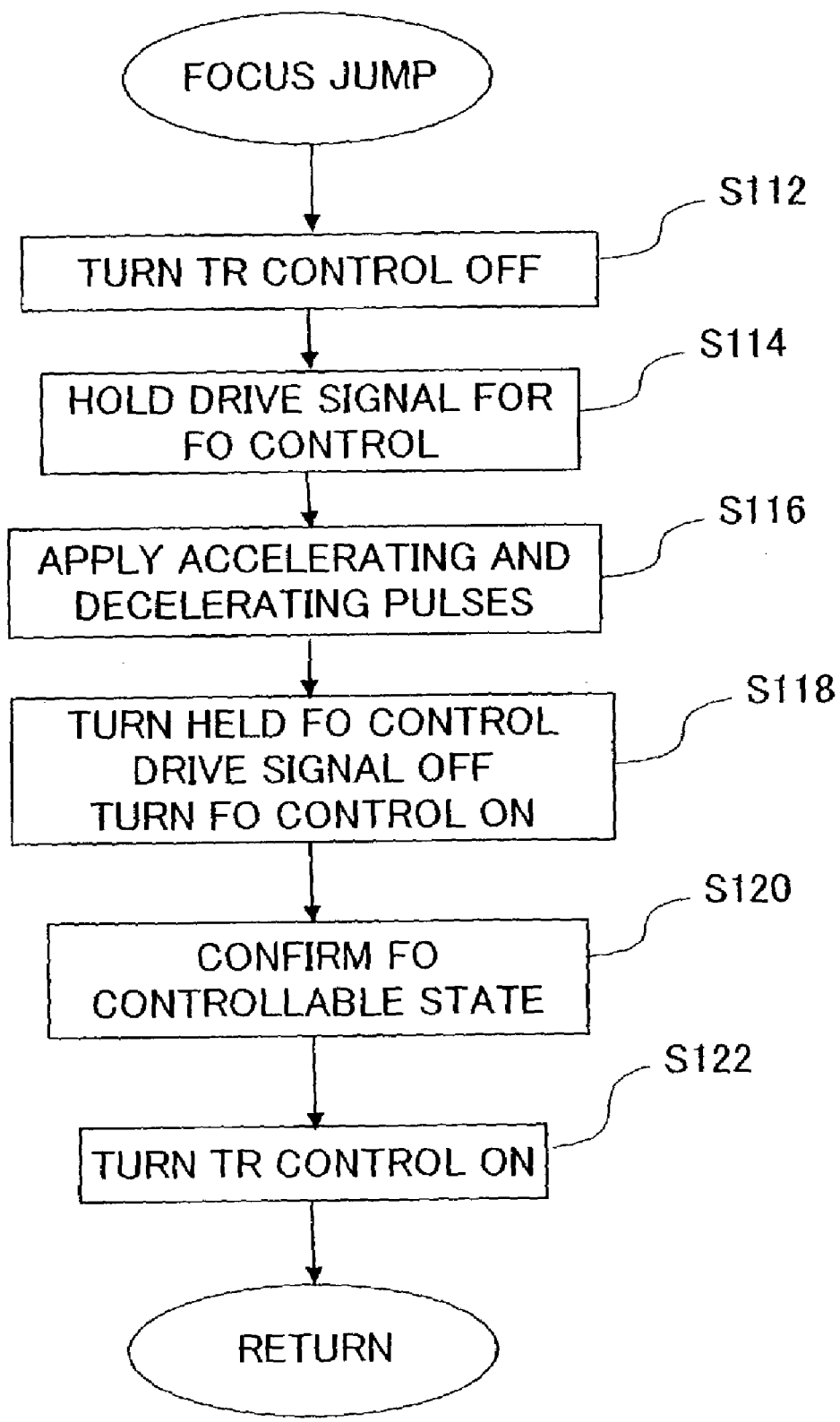
FIG. 34 is a flowchart showing the flow of the focus jumping process to be performed by the optical disc drive 21 shown in FIG. 29.

Next, a detailed flow of the focus jump process steps S104 and S106 shown in FIG. 33 will be described. FIG. 34 is a flowchart showing a flow of the focus jump process step. First, to start the focus jump process step, the microcomputer 432 shown in FIG. 30 turns the tracking (TR) control OFF in Step S112. Next, in Step S114, the microcomputer 432 holds a drive signal for use in a focus control (FO). Subsequently, in Step S116, the microcomputer 432 generates an accelerating pulse signal and a decelerating pulse signal, and gets those signal applied to the focus actuator 443 by way of the focus actuator driver 436. In this manner, the beam spot is moved perpendicularly to the surface of the optical disc 1, thereby realizing the focus jump.

When the level of the FE signal reaches a controllable level with respect to the target information storage layer (i.e., when the level of the FE signal reaches such a level as to close the control loop of the tracking control system), the microcomputer 432 turns the focus control ON in Step S118 by activating the drive signal for the focus control. Next, in Step S120, the microcomputer 432 confirms the focusing controllable state based on various signals including the tracking error (TE) signal and an RF signal. Subsequently, in Step S122, the microcomputer 432 turns the TR control ON, thereby looking for the target track and sector address.

Figure 35:
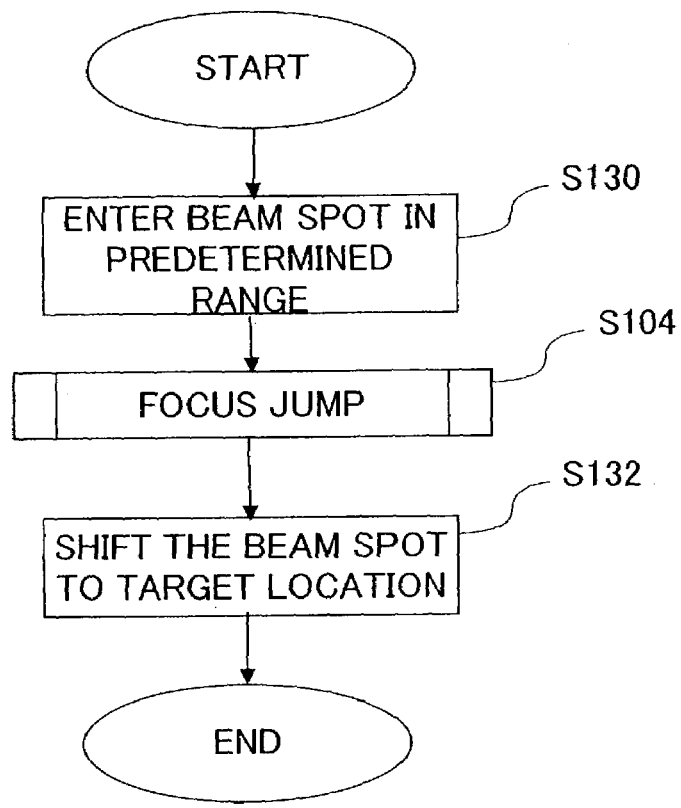
FIG. 35 is a flowchart showing the flow of an alternative beam spot moving process to be performed by the optical disc drive 21 shown in FIG. 29.

Instead of the beam spot moving process shown in FIG. 33, the optical disc drive 21 shown in FIG. 29 may also perform an alternative beam spot moving process in which the focus jump process is carried out only within a predetermined area. FIG. 35 is a flowchart showing the flow of such an alternative beam spot moving process. In FIG. 35, the same process step as that shown in FIG. 33 is identified by the same step number. The following beam spot moving process is also carried out to jump the beam spot from the current information storage layer to the target information storage layer.

Figure 36:
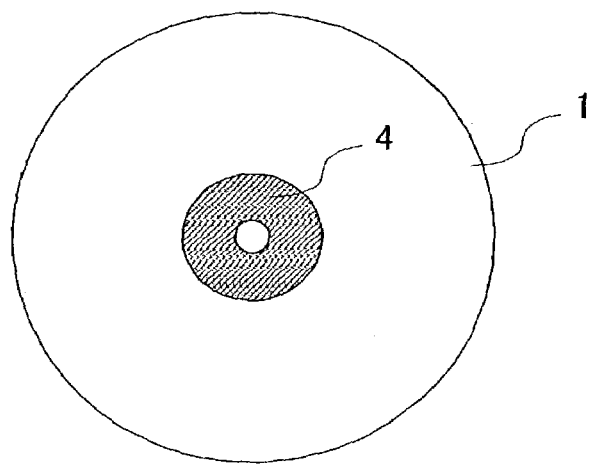
FIG. 36 is a plan view showing an area 4, which is defined by a predetermined distance as measured from the center of an optical disc 1.

First, in Step S130, the beam spot controller 404 shown in FIG. 29 gets the beam spot shifted by the horizontal location changer 412 and enters the beam spot in a certain range 4, which is defined by a predetermined distance as measured from the center of rotation of the optical disc 1 as shown in FIG. 36. As used herein, the "predetermined distance" refers to a range within which the unwanted effects of flutter can be reduced sufficiently. Generally speaking, the closer to the center of rotation of the optical disc 1, the smaller the unwanted effects of flutter. Accordingly, the range 4 may be an innermost track area on the information storage layer of the optical disc 1, for example.

Next, in Step S104, the beam spot controller 404 instructs the focus jump controller 420 shown in FIG. 29 to jump the beam spot over to the target information storage layer. Thereafter, in Step S132, the beam spot controller 404 gets the beam spot shifted to the target location by the horizontal location changer 412. In this manner, the failure rate of focus jumping can be further reduced.

In the ninth preferred embodiment described above, the beam spot controller 404 of the optical disc drive 21 shown in FIG. 29 changes the beam spot movement routes depending on whether the track to be accessed is located inside or outside of the track on which the beam spot is currently located. Specifically, if the track to be accessed is located closer to the outer edge of the optical disc 1 than the current track is, then the beam spot controller 404 jumps the beam spot onto the target information storage layer, including the track to be accessed thereon, and then shifts the beam spot outward on the target information storage layer. On the other hand, if the track to be accessed is located closer to the inner edge of the optical disc 1 than the current track is, then the beam spot controller 404 shifts the beam spot inward on the information storage layer, including the current track thereon, and then jumps the beam spot onto the track to be accessed. In this manner, the unwanted effects of flutter can be minimized, the failure rate of focus jumping can be reduced significantly, and the focus jump performance can be improved.

It should be noted that while the beam spot is being shifted inward on the current information storage layer, the spherical aberration may be corrected simultaneously. In that case, as soon as the beam spot reaches the corresponding track, the focus jump can be started promptly. As a result, the target track can be reached in a shorter time.

Also, if the beam spot should be shifted outward only within the predetermined range in which the flutter is expected to be negligible, the beam spot does not have to be jumped to the target information storage layer first but may be shifted on the same information storage layer initially, and then jumped to the target information storage layer. As used herein, the "predetermined range" may be defined by a half of the outside diameter of the optical disc 1, for example.

Embodiment 10

Figure 37:
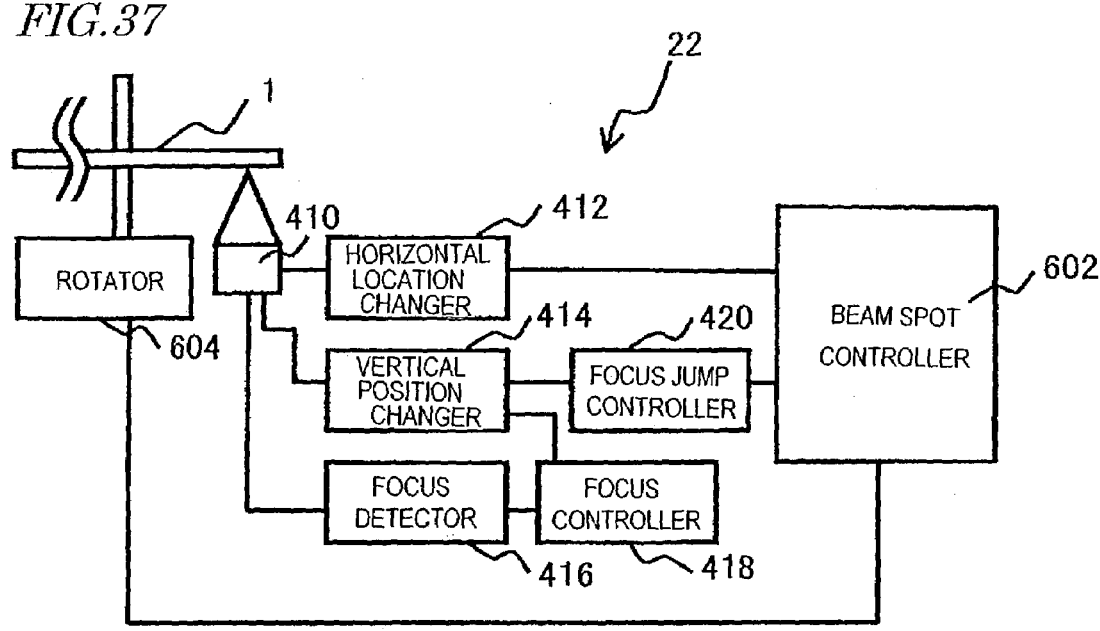
FIG. 37 is a block diagram showing the functional configuration of an optical disc drive 22 according to a tenth specific preferred embodiment of the present invention.

Hereinafter, an optical disc drive 22 according to a tenth specific preferred embodiment of the present invention will be described. FIG. 37 is a block diagram showing the functional configuration of the optical disc drive 22 of the tenth preferred embodiment. In FIG. 37, each component of the optical disc drive 22, which has substantially the same function as the counterpart of the optical disc drive 21 of the ninth preferred embodiment shown in FIG. 29, is identified by the same reference numeral.

As shown in FIG. 37, the optical disc drive 22 of the tenth preferred embodiment includes the focusing member 410, horizontal location changer 412, vertical position changer 414, focus detector 416, focus controller 418, focus jump controller 420, a beam spot controller 602 and a rotator 604. The rotator 604 is provided to rotate the optical disc 1 thereon. Unlike the beam spot controller 404 of the ninth preferred embodiment described above, the beam spot controller 602 has the additional function of controlling the rotational speed at which the optical disc 1 is rotated by the rotator 604.

To move a beam spot outward from a track on an information storage layer to a target track on another information storage layer, the beam spot controller 602 decreases the rotational speed of the rotator 604 first, gets the beam spot jumped to the latter information storage layer by the focus jump controller 420, and then gets the beam spot shifted outward by the horizontal location changer 412. On the other hand, to move a beam spot inward from a track on an information storage layer to a target track on another information storage layer, the beam spot controller 602 gets the beam spot shifted inward by the horizontal location changer 412 first, gets the beam spot jumped to the latter information storage layer by the focus jump controller 420, and then increases the rotational speed of the rotator 604.

In this manner, by controlling the rotational speed of the rotator 604 according to the location of the target track on the optical disc 1, the target location on the optical disc 1 can be accessed efficiently enough. To perform a read or write operation at a constant linear velocity, for example, the beam spot controller 602 switches or controls the rotational speeds. Specifically, the beam spot controller 602 may define a target rotational speed by the distance from the center of rotation of the optical disc 1 to the beam spot. If the beam spot is located in the outside portion of the optical disc 1, the beam spot controller 602 may set the rotational speed relatively low. On the other hand, if the beam spot is located in the inside portion of the optical disc 1, the beam spot controller 602 may set the rotational speed relatively high.

Also, in moving the beam spot outward, the beam spot controller 602 may decrease the rotational speed of the rotator 604 according to the specific location of the target track or stop the rotational control and then decrease the rotational speed. When the rotational control is stopped, the rotator 604 is turned OFF (into an inertial state) and the rotational speed drops. In moving the beam spot inward on the other hand, the beam spot controller 602 may increase the rotational speed of the rotator 604 according to the specific location of the target track. Hereinafter, specific method and apparatus for moving the beam spot by changing the rotational speed will be described.

Figure 38:
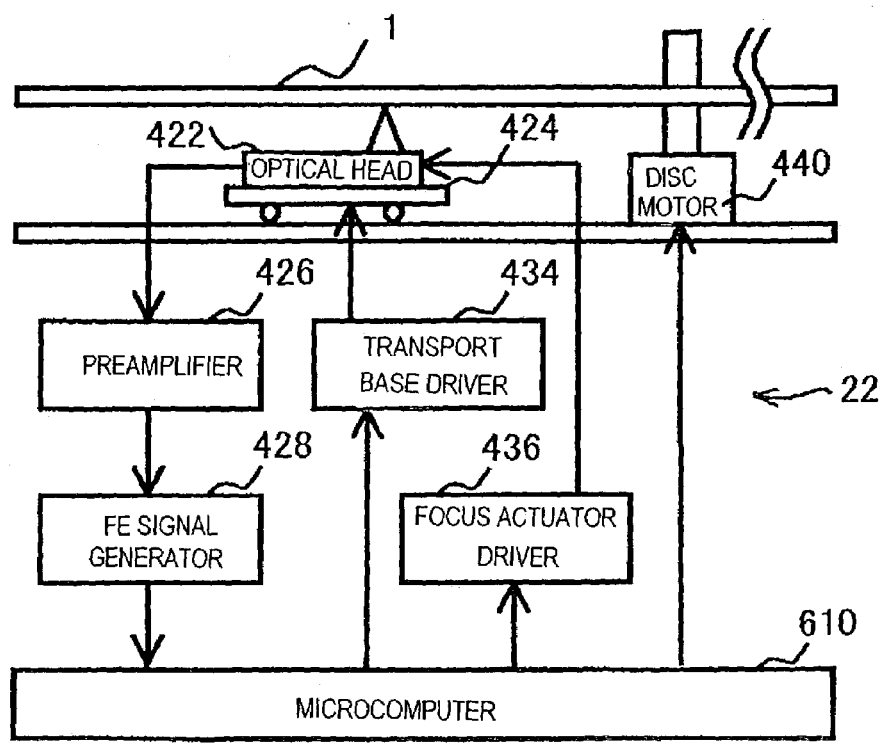
FIG. 38 is a block diagram showing an exemplary hardware arrangement for the optical disc drive 22 shown in FIG. 37.

FIG. 38 shows an exemplary hardware arrangement for the optical disc drive 22 shown in FIG. 37. As shown in FIG. 38, the optical disc drive 22 includes a disc motor 440, an optical head 422, a preamplifier 426, a focus actuator driver 436, a transport base 424, a transport base driver 434, a focus error signal generator 428 and a microcomputer 610. Unlike the microcomputer 132 of the ninth preferred embodiment described above, the microcomputer 610 has the function of controlling the rotational speed of the disc motor 440.

It should be noted that the disc motor 440 is equivalent to the rotator 604 shown in FIG. 37. Also, the microcomputer 610 performs the functions of the beam spot controller 602, focus jump controller 420 and focus controller 418 shown in FIG. 37.

Figure 39:
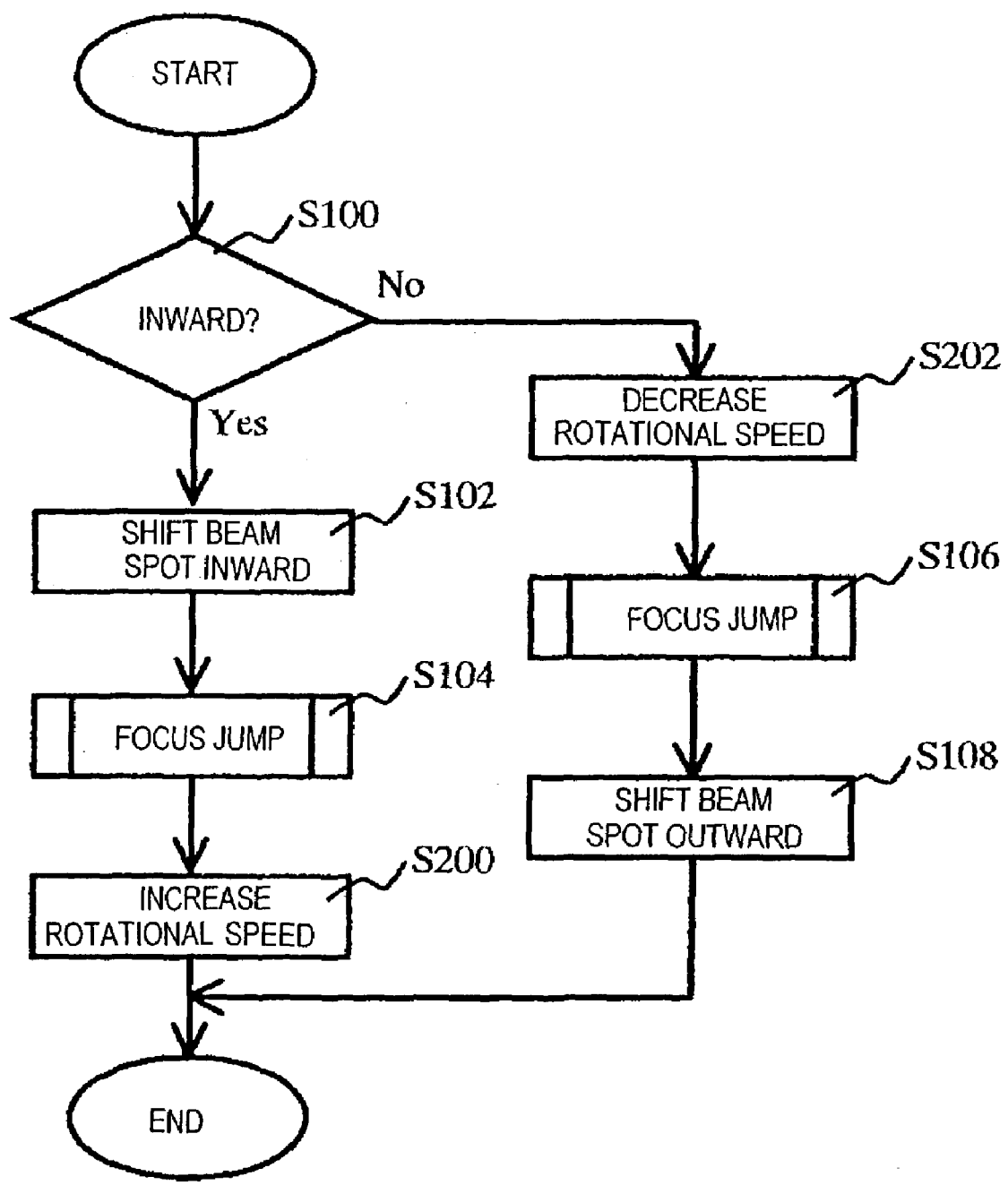
FIG. 39 is a flowchart showing the flow of a beam spot moving process with a rotational speed control to be performed by the optical disc drive 22 shown in FIG. 37.

Hereinafter, the operation of the optical disc drive 22 will be described with reference to FIGS. 39 and 40. FIG. 39 is a flowchart showing the flow of a beam spot moving process with rotational speed control to be performed by the optical disc drive 22 shown in FIG. 37. The beam spot moving process is carried out to move a beam spot either inward or outward from one of multiple information storage layers of the optical disc to another. That is to say, the optical disc drive 22 performs the process steps shown in FIG. 39 to jump the beam spot between two information storage layers. As for the beam spot moving process shown in FIG. 39, the description of the same process steps as those shown in FIG. 30 will be omitted herein but only newly added process steps S200 and S202 will be described.

After performing the step S102 of shifting the beam spot inward and the step S104 of jumping the beam spot to the target information storage layer, the beam spot controller 602 increases the rotational speed of the rotator 604 in Step S200. On the other hand, if the beam spot should be moved outward (i.e., if the answer to the query of step S100 is NO), the beam spot controller 602 performs the step S202 of decreasing the rotational speed of the rotator 604. Thereafter, the process advances to the next step S106. However, if the rotational speed of the rotator 604 has become lower than the rotational speed to be determined by the specific target location, then the beam spot controller 602 may increase the rotational speed of the rotator 604 to the predetermined rotational speed associated with the target track after having performed the step S108 of shifting the beam spot outward.

Even if the beam spot should be moved inward, the focus jump may also be carried out after the rotational speed has been decreased unlike the beam spot moving process shown in FIG. 39. FIG. 40 is a flowchart showing the flow of such an alternative beam spot moving process with rotational speed control to be performed by the optical disc drive 22 shown in FIG. 37. That is to say, the optical disc drive 22 may perform the process steps shown in FIG. 40 to jump the beam spot between information storage layers.

Figure 40:
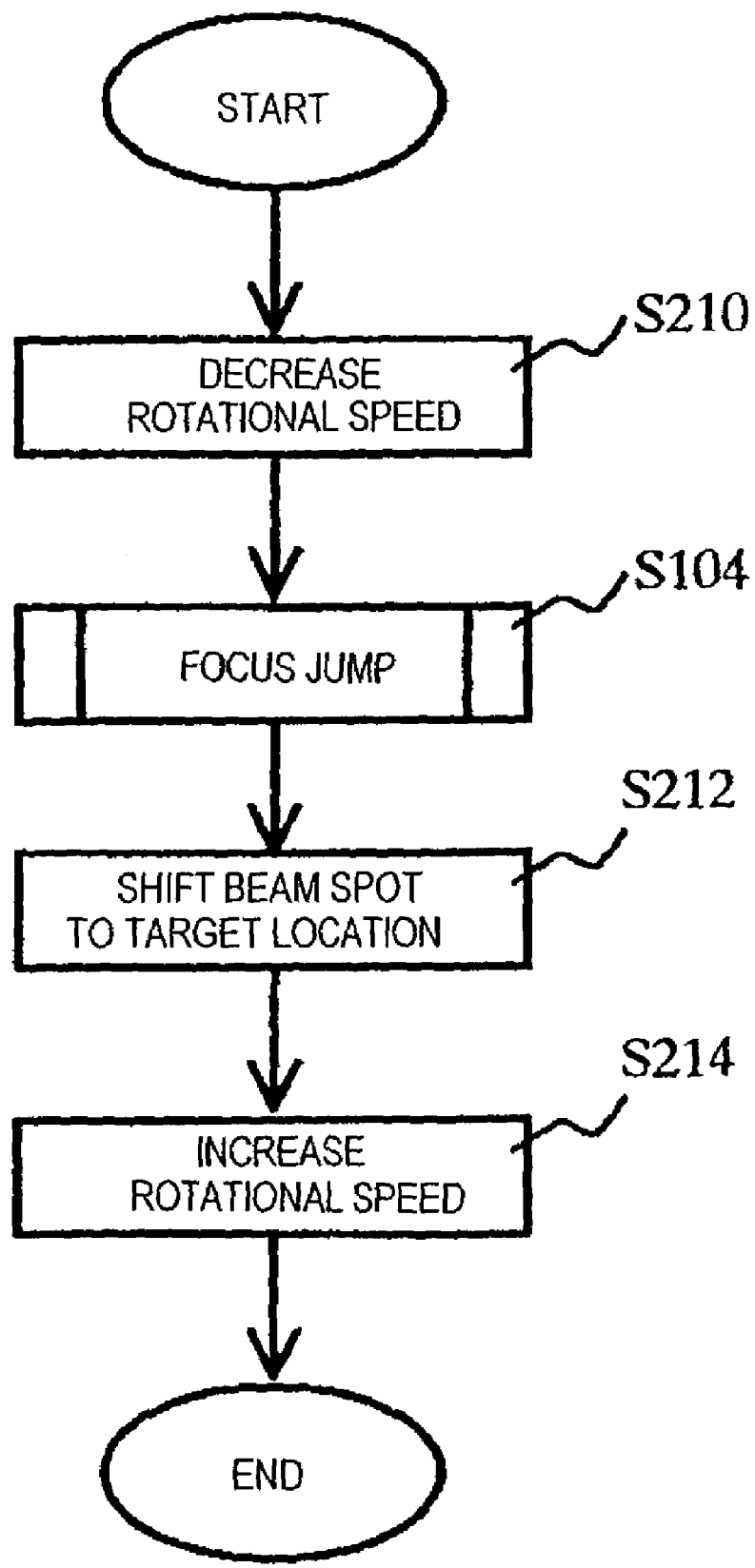
FIG. 40 is a flowchart showing the flow of an alternative beam spot moving process with a rotational speed control to be performed by the optical disc drive 22 shown in FIG. 37.

In the beam spot moving process shown in FIG. 40, the beam spot controller 602 shown in FIG. 37 may perform the step S210 of decreasing the rotational speed of the rotator 604 first. The beam spot controller 602 may decrease the rotational speed of the rotator 604 by turning OFF the rotational control on the rotator 604, for example. Also, the beam spot controller 602 may decrease the rotational speed of the rotator 604 to such a value as to reduce the unwanted effects of flutter sufficiently.

Next, the beam spot controller 602 instructs the focus jump controller 420 to jump the beam spot over to the target information storage layer in Step S104 and also instructs the horizontal location changer 412 to shift the beam spot to the target location in Step S212. Finally, the beam spot controller 602 increases the rotational speed of the rotator 604 in Step S214. However, if the rotational speed of the rotator 604 has already reached the desired value associated with the target location, then the step S214 may be omitted.

The steps S212 and S214 may be performed in the reverse order. Also, the step S212 may be carried out before the step S104 and either before or after the step S210. Optionally, the beam spot moving process shown in FIG. 40 may be combined with the beam spot moving process shown in FIG. 35. That is to say, the step S130 shown in FIG. 35 may be carried out before the step S104 and either before or after the step S210.

In the tenth preferred embodiment described above, the beam spot controller 602 of the optical disc drive 22 shown in FIG. 37 gets the focus jump done after the rotational speed of the rotator 604 has been decreased or before the rotational speed of the rotator 604 is increased. Thus, the unwanted effects of flutter can be minimized, the failure rate of focus jumping can be reduced significantly, and the focus jump performance can be improved.

Embodiment 11

Hereinafter, an eleventh specific preferred embodiment of the present invention will be described. The eleventh preferred embodiment is a modified example of the ninth and tenth preferred embodiments described above. The following statement applies to the processes to be performed by the beam spot controller 404 of the ninth preferred embodiment shown in FIG. 29, the beam spot controller 602 of the tenth preferred embodiment shown in FIG. 37, and the focus jump controller 420 shown in FIGS. 29 and 37.

Figure 41:
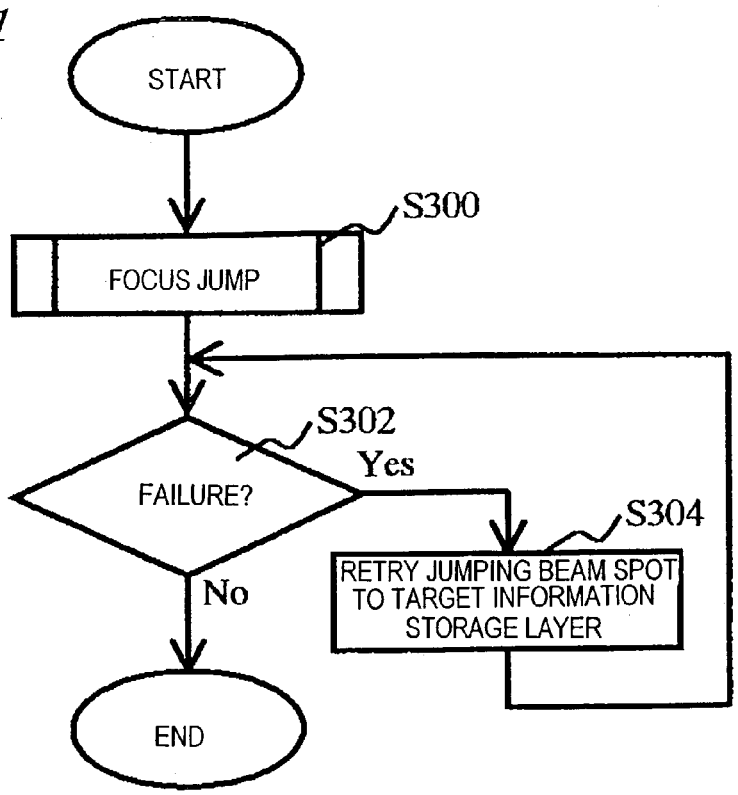
FIG. 41 is a flowchart showing the flow of a process of jumping the beam spot over to a target information storage layer that the beam spot has once failed to reach.

FIG. 41 is a flowchart showing the flow of a process of jumping the beam spot over to a target information storage layer that the beam spot has once failed to reach. The following description will relate to the process to be performed by the beam spot controller 404 shown in FIG. 29. First, the beam spot controller 404 instructs the focus jump controller 420 to jump the beam spot over to the target information storage layer in Step S300 and then determines whether the focus jump was a success or a failure in Step S302. That is to say, the beam spot controller 404 determines whether or not the beam spot has reached the target information storage layer successfully.

The step S300 corresponds to the steps S112, S114, S116 and S118 shown in FIG. 34. The step S302 corresponds to the step S120 shown in FIG. 34, for example. If the beam spot controller 404 or 602 judges the focus jump a success (i.e., if the answer to the query of step S302 is NO), then the beam spot controller 404 or 602 ends the focus jump process and resumes the tracking control thereafter. On the other hand, if the beam spot controller 404 or 602 judges the focus jump a failure (i.e., if the answer to the query of step S302 is YES), then the beam spot controller 404 or 602 retries jumping the beam spot over to the target information storage layer in Step S304. Thereafter, the process returns to the step S302 again to determine whether or not the beam spot is located on the target information storage layer (i.e., whether the focus jump was a success or a failure). In this manner, the focal point can be jumped to the target information storage layer quickly.

Figure 42:
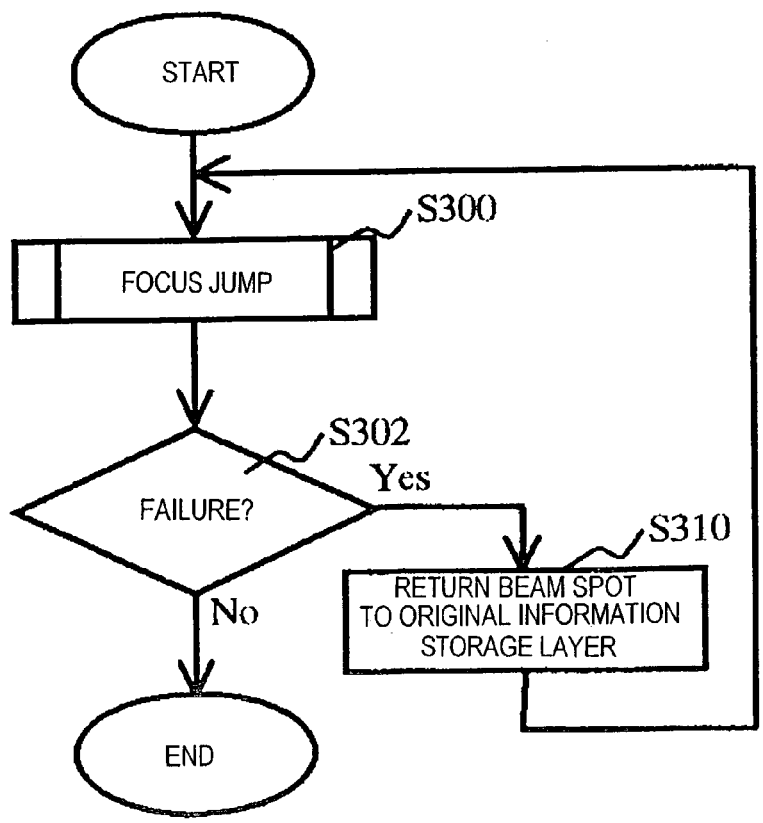
FIG. 42 is a flowchart showing the flow of a process of returning the beam spot to the original information storage layer if the beam spot has failed to reach the target information storage layer.

Alternatively, the beam spot controller 404 or 602 and the focus jump controller 420 may also perform the process steps shown in FIG. 42. FIG. 42 is a flowchart showing the flow of a process of returning the beam spot to the original information storage layer if the beam spot has failed to reach the target information storage layer. As shown in FIG. 42, in Step S310, the beam spot controller 404 shown in FIG. 29 gets the beam spot returned to the original information storage layer if the beam spot has failed to reach the target information storage layer. In FIG. 42, the same process step as that shown in FIG. 41 is identified by the same step number and the description thereof will be omitted herein.

Figure 43:
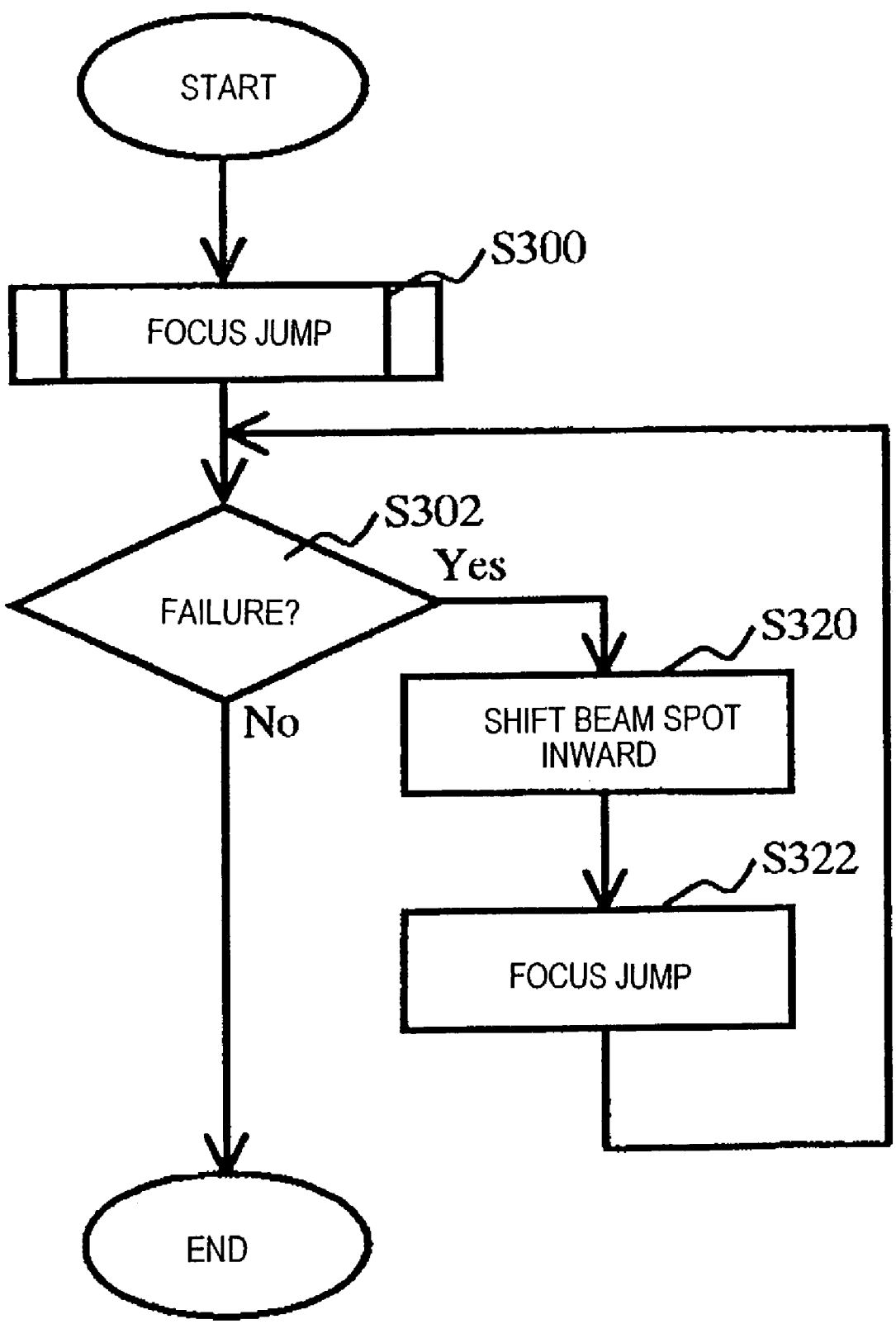
FIG. 43 is a flowchart showing the flow of a process of retrying the focus jumping in an inner area on the optical disc.

As another alternative, the beam spot controller 404 or 602 and the focus jump controller 420 may also perform the process steps shown in FIG. 43. FIG. 43 is a flowchart showing the flow of a process of retrying the focus jumping in an inner area on the optical disc. As shown in FIG. 43, if the beam spot controller 404 shown in FIG. 29 has judged the focus jump a failure in Step S302, then the beam spot controller 404 instructs the horizontal location changer 412 to shift the beam spot inward in Step S320. Thereafter, the beam spot controller 404 gets the focus jump retried in Step S322. In the example shown in FIG. 43, this step S322 is performed to jump the beam spot over to the target information storage layer. Alternatively, the step S322 may be replaced with the step of returning the beam spot to the original information storage layer once and then jumping the beam spot over to the target information storage layer. In FIG. 43, the same process step as that shown in FIG. 41 is identified by the same step number and the description thereof will be omitted herein.

If a focus jump was a failure, the beam spot controller 404 or 602 may control the focus jump controller 420 such that a focus jump is retried at a location that is closer to the inner edge of the optical disc than the previous location by a predetermined distance. Alternatively, in that case, the beam spot controller 404 or 602 may also control the focus jump controller 420 such that a focus jump is retried after the beam spot has been shifted to the range 4 that is defined by a predetermined distance as measured from the center of rotation of the optical disc as shown in FIG. 36. As another alternative, in case of focus jump failure, the beam spot controller 404 or 602 may also control the focus jump controller 420 such that a focus jump is retried in the innermost track area. In any case, if a focus jump was a failure, then the beam spot is shifted inward and then a focus jump is retried, thus avoiding repeated failures of focus jumping.

Figure 44:
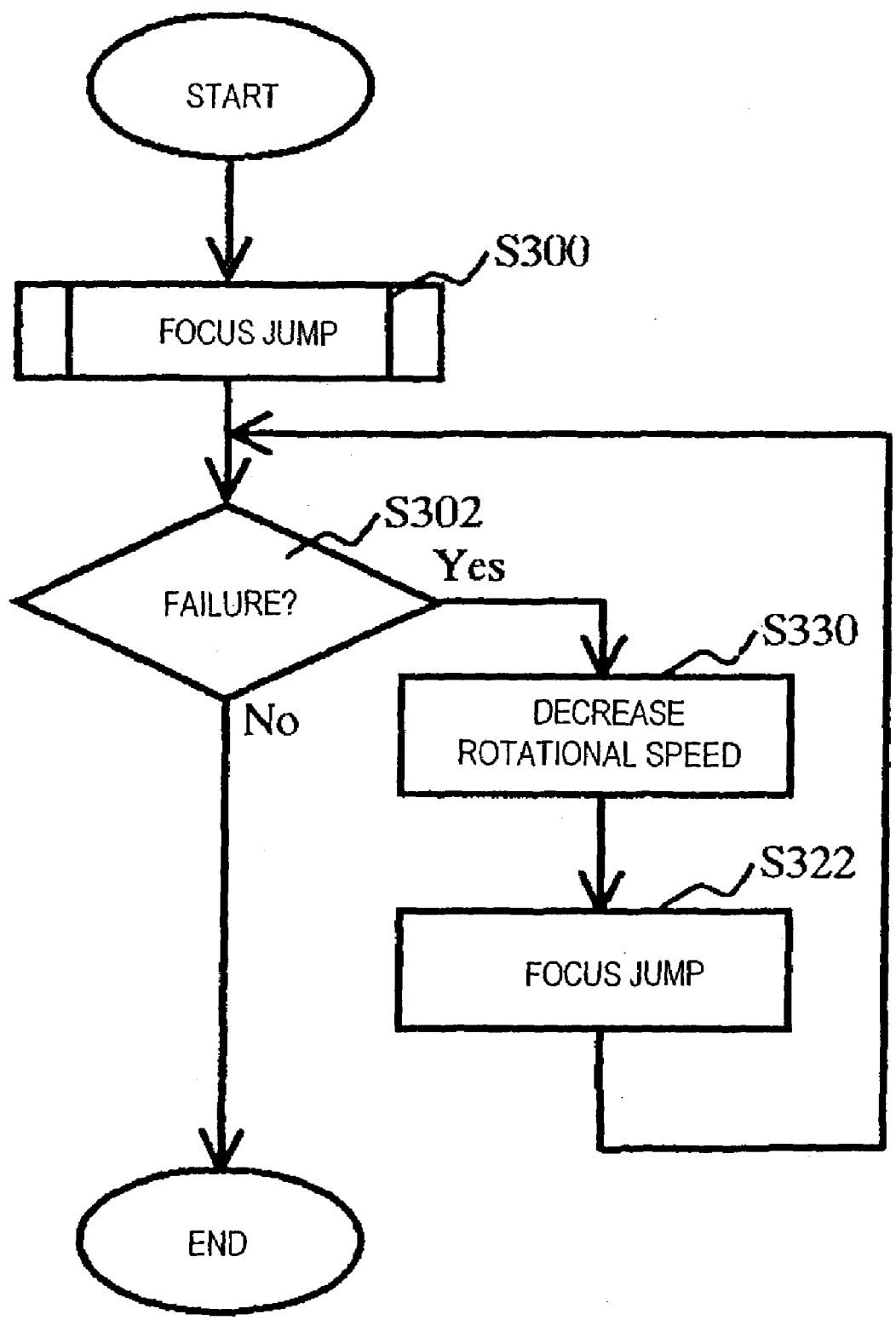
FIG. 44 is a flowchart showing a flow of the process of retrying the focus jumping after the rotational speed of the optical disc 1 has been decreased once the focus jumping failed.

Optionally, if a focus jump was a failure, the beam spot controller 404 or 602 and focus jump controller 420 may decrease the rotational speed of the optical disc 1 (or the rotational speed of the rotator 604) first in Step S330, and then retry a focus jump in Step S322 as shown in FIG. 44. In FIG. 44, the same process step as that shown in FIG. 43 is identified by the same step number and the description thereof will be omitted herein.

Specifically, if a focus jump was a failure, the beam spot controller 404 or 602 may decrease the rotational speed to a predetermined level and then retry a focus jump. Alternatively, in that situation, the beam spot controller 404 or 602 may decrease the rotational speed of the optical disc 1 to such a value as to minimize the failures of focus jumping appropriately and then retry a focus jump. In any case, if a focus jump was a failure, the rotational speed of the optical disc 1 is decreased, thus avoiding the repeated failures of focus jumping.

As another alternative, if a focus jump was a failure, the beam spot controller 404 or 602 and focus jump controller 420 may shift the beam spot inward while decreasing the rotational speed of the optical disc 1 and then retry a focus jump. For example, in the process shown in FIG. 44, the step S320 of shifting the beam spot inward as shown in FIG. 43 may be performed before the step S322 and either before or after the step S330.

It should be noted that the focus jump may be judged a success or a failure by comparing the level of a total reflection signal AS (e.g., full addition of the preamplifier 426), the level of an RF signal, or the level of a tracking error signal to a predetermined value after the focus jump process. However, the present invention is in no way limited to this method of judging the focus jump. Also, this judging method is not the key to the present invention and a detailed description thereof will be omitted herein.

Embodiment 12

Figure 45:
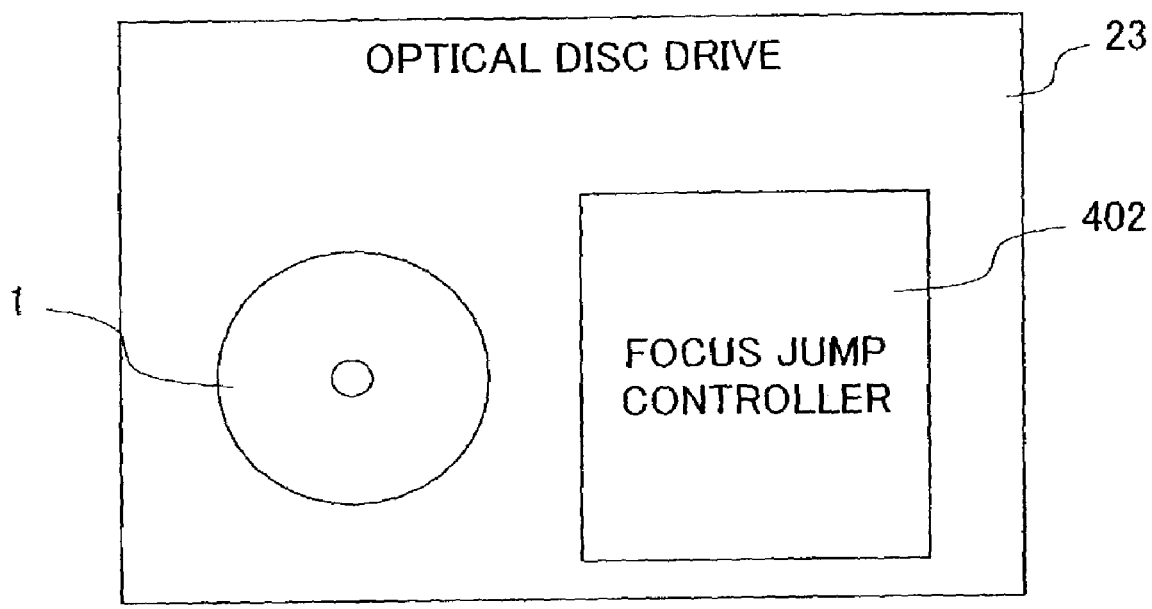
FIG. 45 is a block diagram showing the schematic configuration of an optical disc drive 23 according to a twelfth specific preferred embodiment of the present invention.

Hereinafter, a twelfth specific preferred embodiment of the present invention will be described. FIG. 45 is a block diagram showing a schematic configuration for an optical disc drive 23 according to the twelfth preferred embodiment. As shown in FIG. 45, the optical disc drive 23 includes a focus jump controller 402. The focus jump controller 402 is provided to not only jump a focused beam spot from one of at least two stacked information storage layers of the optical disc 1 to another but also correct the spherical aberration as well. That is to say, the focus jump controller 402 performs a control operation of jumping the beam spot to the target information storage layer with the spherical aberration corrected into a predetermined value.

As used herein, the "predetermined spherical aberration" is a spherical aberration at which a focus control is ensured by obtaining an expected detection signal or the intended amplitude of the detection signal. As a result, the failures of focus jumping can be reduced effectively and the focus jump performance can be improved appropriately. The focus jump controller 402 controls the optical disc drive 23 to gain access to a target location on the optical disc 1. That is to say, the focus jump controller 402 performs the control operation of jumping the beam spot to the target information storage layer with the spherical aberration corrected into the predetermined value, thereby minimizing the unwanted effects of flutter or variation in gap between the information storage layers L1, L2, L3, etc., reducing the failures of focus jumping and improving the focus jump performance significantly.

Figure 46:
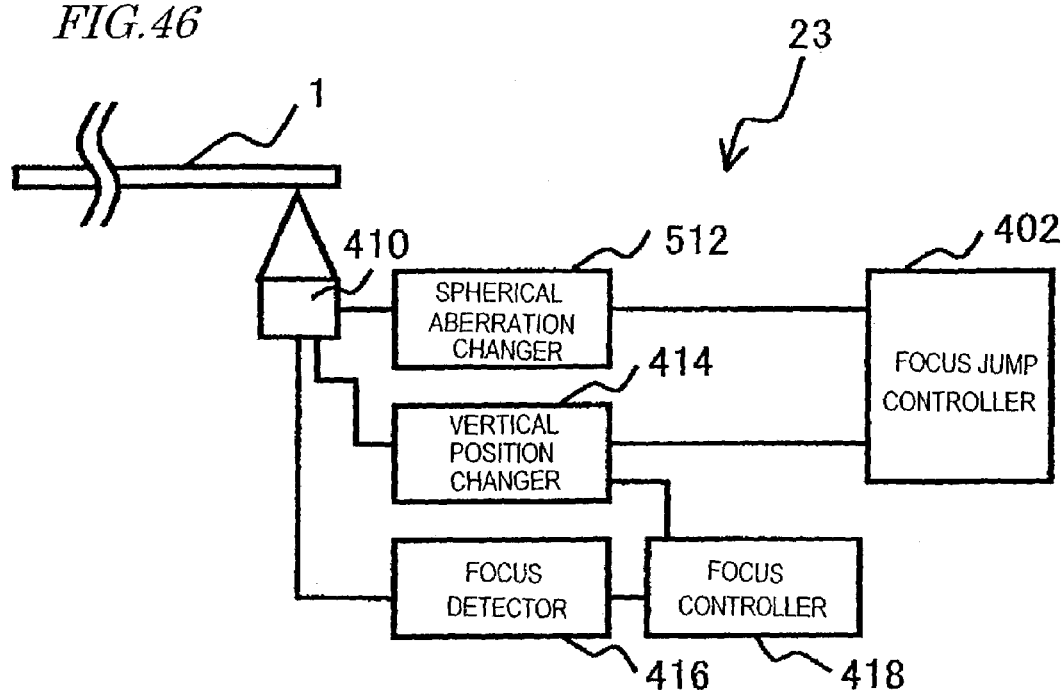
FIG. 46 is a block diagram showing the functional configuration of the optical disc drive 23 of the twelfth preferred embodiment.

FIG. 46 is a block diagram showing the functional configuration of the optical disc drive 23 of the twelfth preferred embodiment. In FIG. 46, each component of the optical disc drive 23, having substantially the same function as the counterpart of the optical disc drive 21 or 22 of the ninth, tenth or eleventh preferred embodiment shown in FIG. 29 or 37, is identified by the same reference numeral. As shown in FIG. 46, the optical disc drive 23 of the twelfth preferred embodiment includes the focusing member 410, a spherical aberration changer 512, the vertical position changer 414, the focus detector 416, the focus controller 418 and the focus jump controller 402.

The spherical aberration changer 512 changes the spherical aberration of the beam spot. For example, the spherical aberration changer 512 intentionally creates a spherical aberration on the focused beam spot. As described above, the focus jump controller 402 controls the focus jump operation with the spherical aberration corrected into a predetermined value. Also, the focus jump controller 402 instructs the spherical aberration changer 512 to correct the spherical aberration and performs the operation of jumping the beam spot over to the target information storage layer with the predetermined spherical aberration. In jumping the beam spot over to the target information storage layer, the focus jump controller 402 makes the spherical aberration changer 512 create a spherical aberration in advance in a direction in which the detection range of the FE signal expands. The other functions of the focus jump controller 402 are the same as those of the focus jump controller 420 shown in FIG. 29 or 37.

Figure 47:
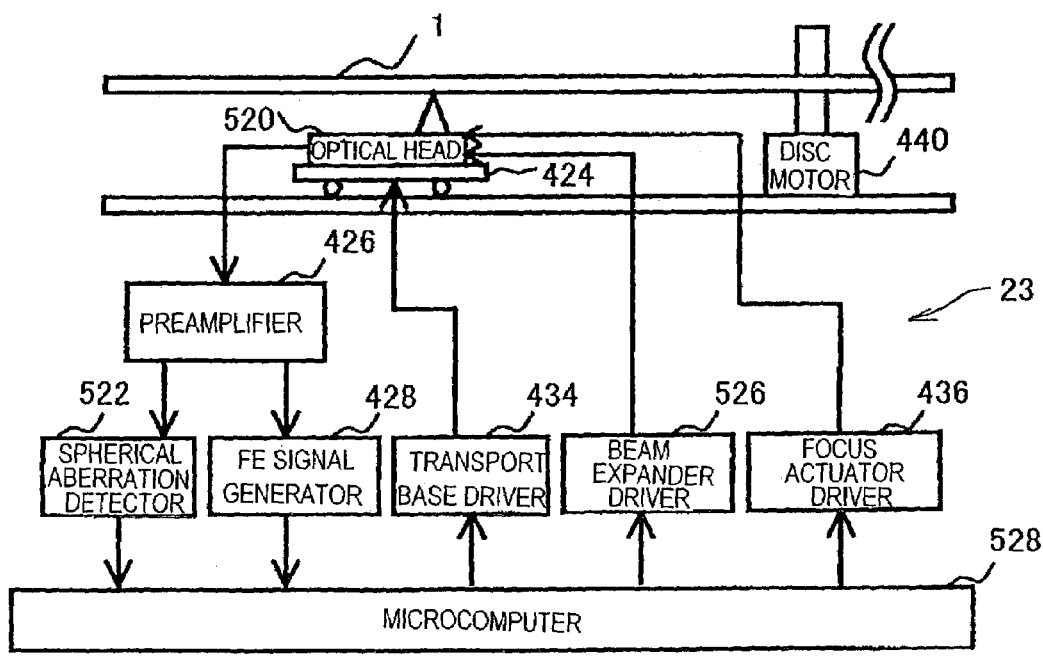
FIG. 47 is a block diagram showing an exemplary hardware arrangement for the optical disc drive 23 shown in FIG. 46.

FIG. 47 shows an exemplary hardware arrangement for the optical disc drive 23 shown in FIG. 46. As shown in FIG. 47, the optical disc drive 23 includes the disc motor 440, an optical head 520, the preamplifier 426, the focus actuator driver 436, the transport base 424, the transport base driver 434, the focus error signal generator 428, a microcomputer 528, a spherical aberration detector 522, and a beam expander driver 526.

The microcomputer 528 controls the beam expander driver 526. The other functions and configurations of the microcomputer 528 are the same as those of the microcomputer according to the ninth, tenth or eleventh preferred embodiment described above. In response to the output signal of the preamplifier 426, the spherical aberration detector 522 detects the spherical aberration of the beam spot. In accordance with the detection signal supplied from the spherical aberration detector 522, the microcomputer 528 outputs a control signal. In response to the control signal supplied from the microcomputer 528, the beam expander driver 526 drives the spherical aberration correcting actuator 532 (to be described later) of the optical head 520. In this preferred embodiment, the spherical aberration detector 522 may share at least some circuits with the focus error signal generator 428.

Figure 48:
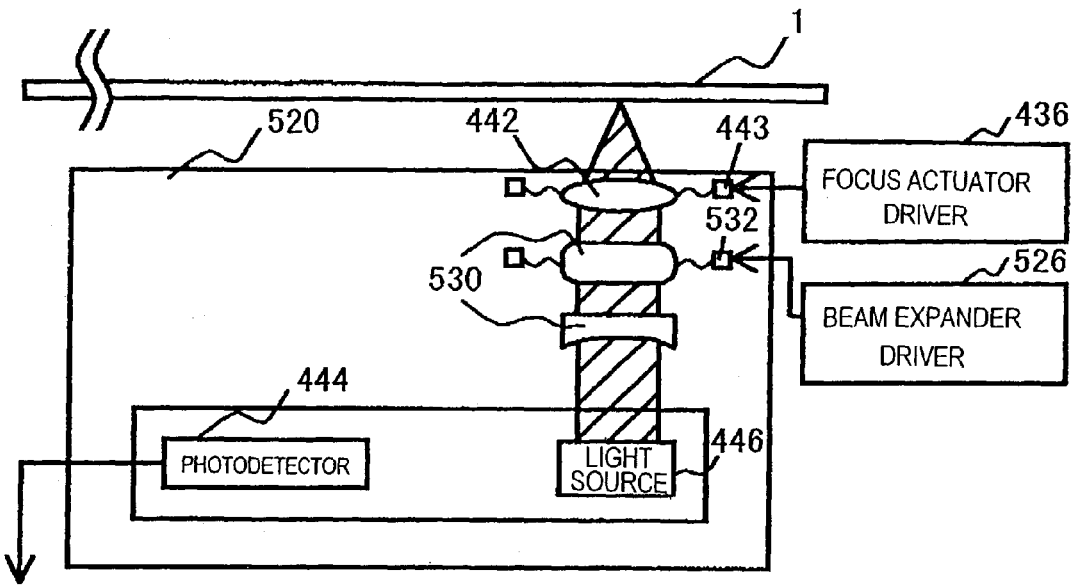
FIG. 48 is a block diagram showing a schematic arrangement for the optical head 520.

FIG. 48 is a block diagram showing a schematic configuration for the optical head 520. In FIG. 48, each member of the optical head 520, having substantially the same function as the counterpart of the optical head 422 of the ninth, tenth or eleventh preferred embodiment shown in FIG. 31, is identified by the same reference numeral. The optical head 520 changes the spherical aberration. As shown in FIG. 48, the optical head 520 includes the light source 446, optical lens 442, photodetector 444, focus actuator 443, spherical aberration correcting lenses 530, and a spherical aberration correcting actuator 532.

The spherical aberration correcting lenses 530 transmit the light and change the spherical aberration of the beam spot. As shown in FIG. 48, the spherical aberration correcting lenses 530 may include a concave lens and a convex lens, for example. Optionally, the spherical aberration correcting lenses 530 may be replaced with a liquid crystal panel that can change the transmittance with the location of the beam spot (i.e., whether the beam spot is located in the inside area of the optical disc or in the outside area thereof). The spherical aberration correcting actuator 532 is provided to change the spherical aberration of the beam spot by moving the spherical aberration correcting lenses 530.

The spherical aberration correcting lenses 530, spherical aberration correcting actuator 532 and beam expander driver 526 together make up the spherical aberration changer 512 shown in FIG. 46. On the other hand, the microcomputer 528 achieves the functions of the focus jump controller 402 and focus controller 418 shown in FIG. 46.

Hereinafter, it will be described with reference to FIGS. 49 through 55 how the optical disc drive 23 of the twelfth preferred embodiment operates.

Figure 49:
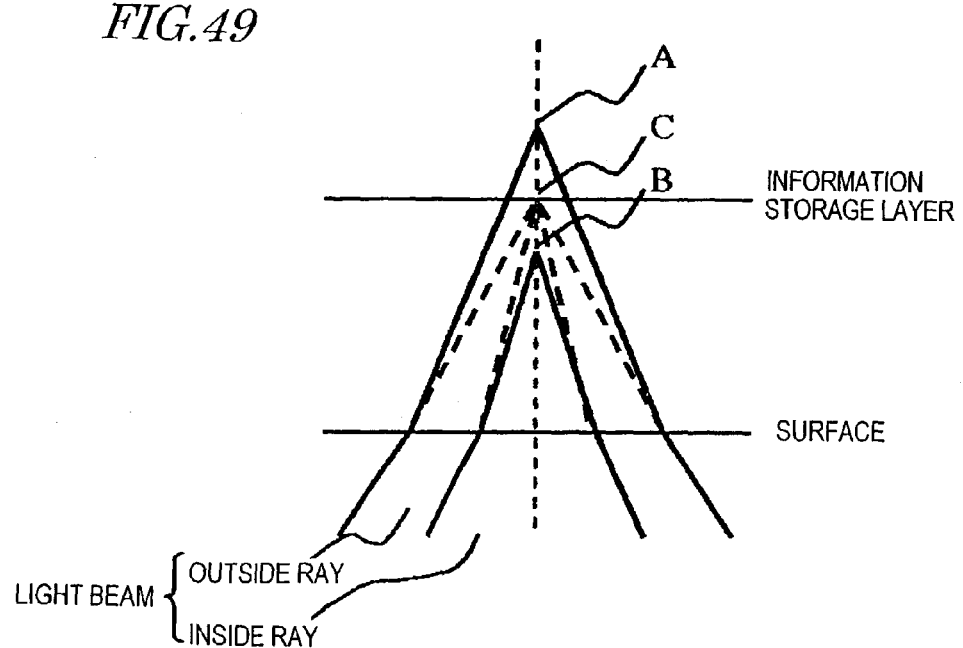
FIG. 49 shows how a spherical aberration is created in the twelfth preferred embodiment.

FIG. 49 shows how a spherical aberration may be created in this twelfth preferred embodiment. While a focus control is being carried out, the light beam that has been emitted from the optical head 520 is refracted by the transparent layer 152 of the optical disc 1. However, if the transparent layer 152 has varying thicknesses, then the light ray that has passed through the outside portion of the lens converges at a focal point A but the light ray that has passed through the inside portion of the lens converges at a focal point B. The deviation between the focal points A and B is the spherical aberration.

If there is no spherical aberration created between the information storage layers L0, L1 and L2, then the light ray that has passed through the outside portion of the lens should be in focus at the point C with the light ray that has passed through the inside portion of the lens. However, as the spherical aberration increases, the deviation between the focal points A and B also increases. As a result, the beam spot is blurred as a whole and defocused on the target information storage layer. For example, when an optical lens with an NA of about 0.80 or more is used, the optical disc drive 23 shown in FIG. 47 corrects the spherical aberration on a layer-by-layer basis for the respective information storage layers L0, L1 and L2. Thus, high-density information can be processed.

FIGS. 50A, 50B and 50C show respective detection signal ranges in which the focusing control of the twelfth preferred embodiment can be carried out. If the spherical aberration has been corrected, then the focus detector 416 obtains the FE signal (as indicated by the solid curve in FIG. 50($b$) and the AS signal (as indicated by the solid curve in FIG. 50($c$). FIG. 50($a$) shows the positional relationships between the beam spot and the information storage layer L0. As the beam spot being converged by the optical lens 442 shown in FIG. 48 is approaching from the transparent layer 152 shown in FIG. 1C toward the information storage layer L0, the quantity of light reflected from the information storage layer L0 increases. Thus, the FE signal increases its amplitude from a substantially zero level in the negative direction. In the meantime, the AS signal also increases its amplitude. The amplitude of the FE signal reaches its peak at a point A1 and decreases thereafter. When the beam spot reaches the information storage layer L0, the amplitude of the FE signal equals zero and the amplitude of the AS signal reaches its peak.

Thereafter, as the beam spot is approaching from the information storage layer L0 toward the substrate, the FE signal increases its amplitude in the positive direction. Meanwhile, the AS signal decreases its amplitude. The amplitude of the FE signal reaches its peak at a point B1 and decreases thereafter. In this manner, the FE signal exhibits an S-curve through the respective information storage layers L0, L1 and L2. Thus, the FE signal will also be referred to herein as an "S signal". As for this S signal, the range in which the focusing control can be carried out on the target information storage layer is defined between the negative and positive peaks of the S signal (i.e., between the points A1 and B1), or the linear portion of the S-curve.

On the other hand, if the focus jump process is carried out with the predetermined spherical aberration allowed, then the focus detector 416 obtains the FE signal and AS signal as indicated by the dashed curves in FIGS. 50B and 50C, respectively. That is to say, the S-curve of the FE signal and the curve of the AS signal both become gentler, the range between the negative and positive peaks of the S signal (i.e., the range between the points A2 and B2) broadens, and therefore, the range in which the focusing control can be carried out on the target information storage layer also expands. Thus, the failures of focus jumping can be reduced and the focus jump performance can be improved significantly. It should be noted that when some spherical aberration is allowed, the peak of the AS signal may sometimes deviate.

In this case, if the spherical aberration is increased with respect to the target information storage layer, the range in which the focusing control can be carried out expands. However, the absolute value of the peak of the FE signal decreases from L1 to L2 as shown in FIG. 50($b$). The focus jump controller 402 shown in FIG. 46 defines the spherical aberration at the time of focus jumping such that the focusing control can be carried out. For example, the focus jump controller 402 controls the focus jump process such that the absolute value of the peak L2 of the FE signal is greater than that of the level L3 at which the focus control is turned ON.

Figure 51:
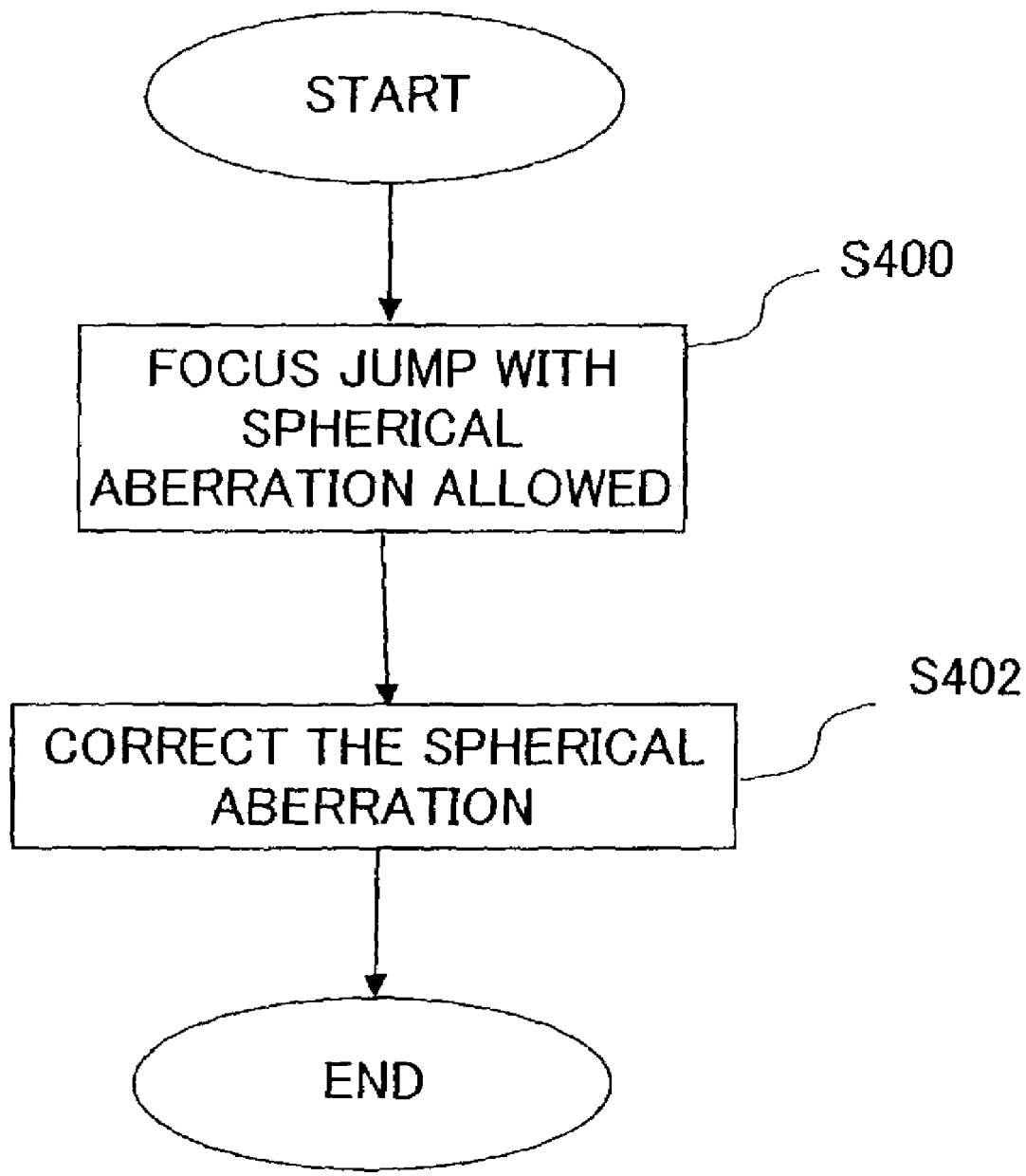
FIG. 51 is a flowchart showing the flow of a focus jump process according to the twelfth preferred embodiment.

FIG. 51 is a flowchart showing the flow of a focus jump process according to the twelfth preferred embodiment. As shown in FIG. 51, the focus jump controller 402 performs a focus jump process with a predetermined spherical aberration allowed in Step S400. Next, after the beam spot has been jumped over to the target information storage layer, the focus jump controller 402 corrects the spherical aberration with respect to the target information storage layer in Step S402. That is to say, at this point in time, the focus jump controller 402 switches the spherical aberrations with respect to the target information storage layer.

When or after the beam spot reaches the target information storage layer, the focus jump controller 402 may start switching the spherical aberrations. Alternatively, even before the beam spot reaches the target information storage layer, the focus jump controller 402 may also start switching the spherical aberrations. As another alternative, the focus jump controller 402 may also start switching the spherical aberrations even after having started the focus jump process. Furthermore, the focus jump controller 402 may start switching the spherical aberrations on or before starting the focus jump process.

Figure 52:
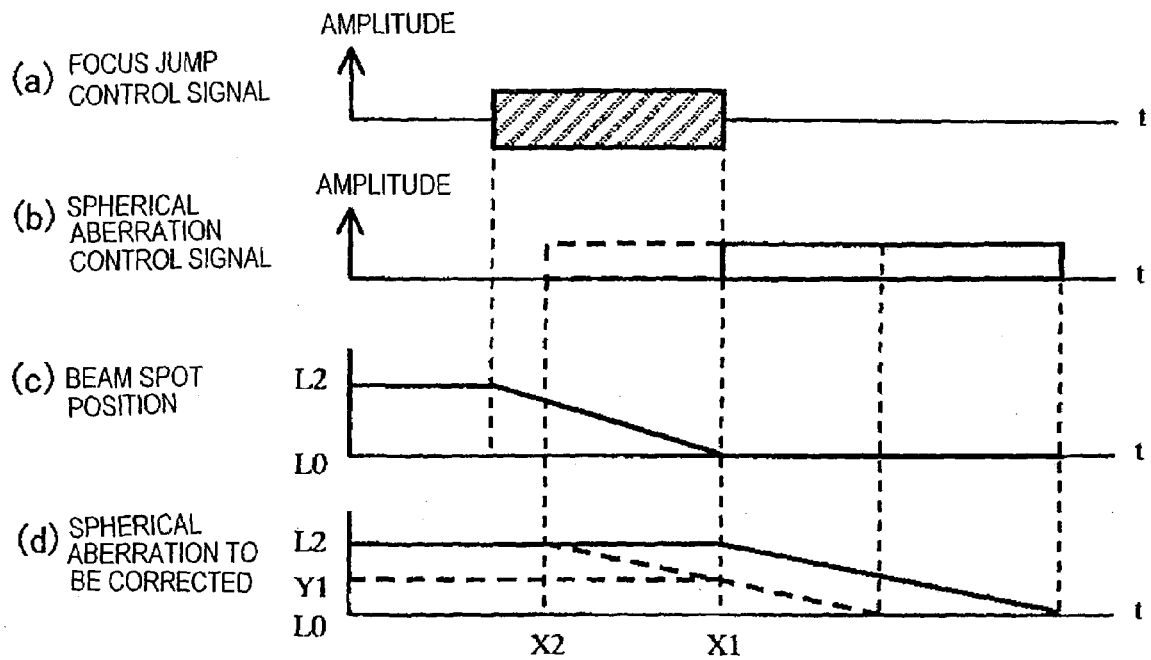
FIG. 52 is a timing diagram showing how the focus jump process shown in FIG. 51 may be carried out in the twelfth preferred embodiment.

FIG. 52 is a timing diagram showing how the focus jump operation may be carried out in this twelfth preferred embodiment. In the following example, the focus jump operation is supposed to be carried out to jump the beam spot from the information storage layer L2 to the information storage layer L0. However, the focus jump operation may be carried out in the same way even when the beam spot needs to be jumped from the information storage layer L1 to the information storage layer L0, for example. The focus jump controller 402 outputs a focus jump control signal, which is used to control the focus jump operation, to the vertical position changer 414. In response to the focus jump control signal, the vertical position changer 414 jumps the beam spot from the information storage layer L2 to the information storage layer L0, for example. The focus jump control signal may be positive and negative pulse signals for accelerating and decelerating purposes. At or after a point in time X1 when the focus jump is complete, the focus jump controller 402 outputs a spherical aberration control signal, which is used to control the spherical aberration, to the spherical aberration changer 512. In response to the spherical aberration control signal, the spherical aberration changer 512 corrects the spherical aberration with respect to the information storage layer L0.

While performing the focus jump operation, the focus jump controller 402 secures the predetermined spherical aberration Y1 at least. As indicated by the dashed line in FIG. 52, as long as the predetermined spherical aberration Y1 is secured, the focus jump controller 402 may start switching the spherical aberrations at a point in time X2, which is before the focus jump operation is complete. That is to say, at the time X2 before the focus jump operation is complete, the focus jump controller 402 may change the spherical aberration in such a manner as to narrow the range in which the focusing control can be carried out.

The predetermined spherical aberration Y1 may be associated with a position that is about 25 µm away from the target information storage layer. In other words, the predetermined spherical aberration Y1 is supposed to be created with respect to the target information storage layer when the spherical aberration is corrected at the position that is about 25 µm away from the target information storage layer. The focus jump controller 402 controls the focus jump operation with at least the spherical aberration Y1 allowed.

Figure 53:
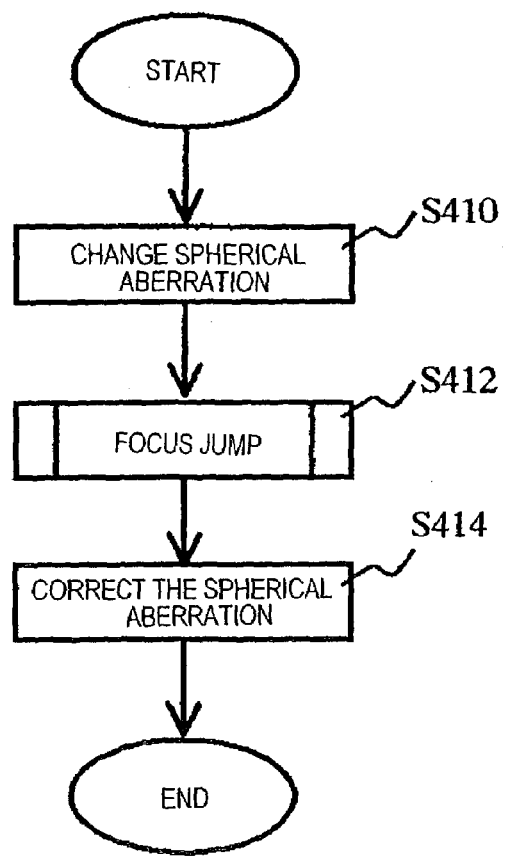
FIG. 53 is a flowchart showing the flow of an alternative focus jump process according to the twelfth preferred embodiment.

FIG. 53 is a flowchart showing the flow of an alternative focus jump process according to the twelfth preferred embodiment. In this case, first, the focus jump controller 402 instructs the spherical aberration changer 512 to change the spherical aberration in Step S410. Next, in Step S412, the focus jump controller 402 controls the focus jump operation. Subsequently, after the beam spot has been jumped to the target information storage layer, the focus jump controller 402 gets the spherical aberration corrected with respect to the target information storage layer in Step S414.

When or after the beam spot reaches the target information storage layer, the focus jump controller 402 may start changing the spherical aberration. Alternatively, even before the beam spot reaches the target information storage layer, the focus jump controller 402 may also start changing the spherical aberration. As another alternative, the focus jump controller 402 may also start changing the spherical aberration before starting the focus jump process. Furthermore, the focus jump controller 402 may start changing the spherical aberration on or after starting the focus jump process.

Figure 54:
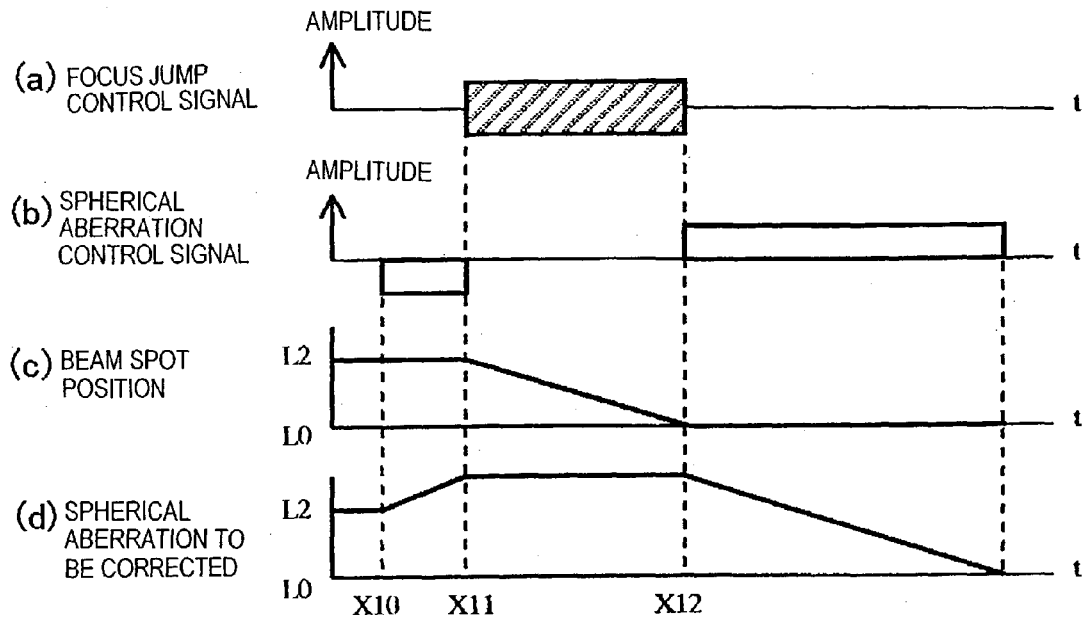
FIG. 54 is a timing diagram showing how the focus jump process shown in FIG. 53 may be carried out in the twelfth preferred embodiment.

FIG. 54 is a timing diagram showing how an alternative focus jump operation may be carried out in this twelfth preferred embodiment. In the following example, the focus jump operation is supposed to be carried out to jump the beam spot from the information storage layer L2 to the information storage layer L0. However, the focus jump operation may be carried out in the same way even when the beam spot needs to be jumped from the information storage layer L1 to the information storage layer L0, for example. First, the focus jump controller 402 outputs a spherical aberration control signal to the spherical aberration changer 512. In this case, the focus jump controller 402 instructs the spherical aberration changer 512 to change the spherical aberration in such a direction as to expand the range in which the focusing control can be carried out. For example, the focus jump controller 402 may control the spherical aberration changer 512 such that the spherical aberration will be associated with a position that is located in the direction opposite to the direction of movement. In other words, the focus jump controller 402 may control the spherical aberration changer 512 such that the spherical aberration is corrected at a position that is opposed to the target information storage layer with respect to the original information storage layer. That is to say, as in the range between points in time X10 and X11 shown in FIG. 54, the magnitude of the correction to be performed eventually on the information storage layer L0 is smaller than that of the correction to be performed eventually on the information storage layer L2. During the correction process, however, the spherical aberration needs to be corrected to a greater degree on the information storage layer L0 than on the information storage layer L2.

Thereafter, the focus jump controller 402 outputs a focus jump control signal to the vertical position changer 414. In response to the focus jump control signal, the vertical position changer 414 jumps the beam spot from the information storage layer L2 to the information storage layer L0, for example. At or after a point in time X12 when the focus jump is complete, the focus jump controller 402 gets the spherical aberration corrected into a value associated with the target information storage layer. In this manner, by performing the focus jump operation while controlling the spherical aberration changer 512 such that the spherical aberration will be associated with the position that is located in the direction opposite to the direction of movement, the failures of focus jumping can be further reduced and the focus jump performance can be further improved.

After having started the focus jump control, the focus jump controller 402 may finish the control operation of changing the spherical aberration in such a direction as to expand the range in which the focusing control can be carried out. Alternatively, after having started the focus jump control, the focus jump controller 402 may start the control operation of changing the spherical aberration in such a direction as to expand the range in which the focusing control can be carried out. As another alternative, before completing the focus jump control, the focus jump controller 402 may start the control operation of correcting the spherical aberration into a value associated with the target information storage layer.

Figure 55:
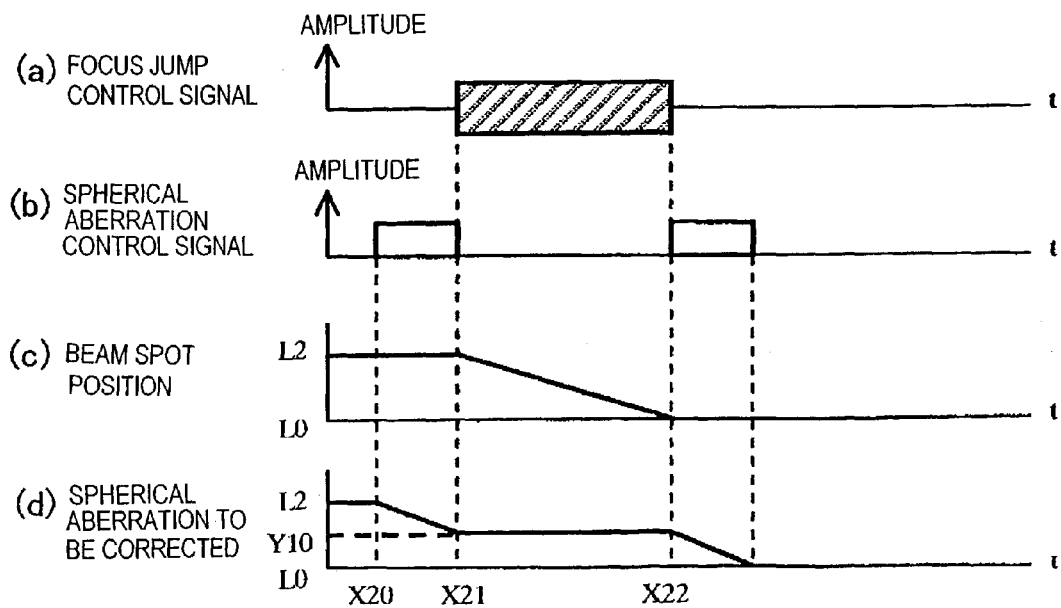
FIG. 55 is a timing diagram showing how another alternative focus jump process may be carried out in the twelfth preferred embodiment.

FIG. 55 is a timing diagram showing how another alternative focus jump operation may be carried out in this twelfth preferred embodiment. In the following example, the focus jump operation is supposed to be carried out to jump the beam spot from the information storage layer L2 to the information storage layer L0. However, the focus jump operation may be carried out in the same way even when the beam spot needs to be jumped from the information storage layer L1 to the information storage layer L0, for example. First, the focus jump controller 402 outputs a spherical aberration control signal to the spherical aberration changer 512. In this case, the focus jump controller 402 controls the spherical aberration changer 512 such that the spherical aberration will be associated with a position between the original and target information storage layers and then controls the operation of jumping the beam spot over to the target information storage layer with that spherical aberration allowed (as in the range between points in time X20 and X21 shown in FIG. 55). For example, the focus jump controller 402 may control the spherical aberration changer 512 such that the spherical aberration is associated with a substantially intermediate position between the original and target information storage layers. Specifically, the focus jump controller 402 may perform the focus jump operation with a spherical aberration Y10 associated with a position that is about 25 µm before the target information storage layer.

Thereafter, the focus jump controller 402 outputs a focus jump control signal to the vertical position changer 414. In response to the focus jump control signal, the vertical position changer 414 jumps the beam spot from the information storage layer L2 to the information storage layer L0, for example. At or after a point in time X22 when the focus jump is complete, the focus jump controller 402 gets the spherical aberration corrected into a value associated with the target information storage layer. In this manner, by performing the focus jump operation while controlling the spherical aberration changer 512 such that the spherical aberration will be associated with a position between the original and target information storage layers, the focus jump performance can be improved effectively.

After having started the focus jump control, the focus jump controller 402 may finish the control operation of associating the spherical aberration with a position between the original and target information storage layers. Alternatively, after having started the focus jump control, the focus jump controller 402 may start the control operation of associating the spherical aberration with a position between the original and target information storage layers. As another alternative, before completing the focus jump control, the focus jump controller 402 may start the control operation of switching the focal points.

In the twelfth preferred embodiment described above, the focus jump operation is carried out with the spherical aberration changed in such a direction as to expand the range in which the focusing control can be carried out. Thus, the failures of focus jumping can be reduced and the focus jump performance can be improved.

Embodiment 13

Hereinafter, a thirteenth specific preferred embodiment of the present invention will be described. FIG. 56 is a block diagram showing the functional configuration of an optical disc drive 24 according to the thirteenth preferred embodiment. In FIG. 56, each component of the optical disc drive 24, having substantially the same function as the counterpart of the optical disc drive 23 of the twelfth preferred embodiment described above, is identified by the same reference numeral as that used in FIG. 46. As shown in FIG. 56, the optical disc drive 24 of the thirteenth preferred embodiment includes the focusing member 410, the spherical aberration changer 512, the vertical position changer 414, the focus detector 416, the focus controller 418 and a focus jump controller 502.

Unlike the focus jump controller 402 of the twelfth preferred embodiment shown in FIG. 46, the focus jump controller 502 can control the operation of jumping the beam spot over to the target information storage layer by changing the gains of the output signal of the focus detector 416.

The focus jump controller 502 may change the gains either by controlling a gain changer (not shown) or by calculating the output signal values of the focus detector 416. Alternatively, the focus jump controller 502 may also control the operation of jumping the beam spot over to the target information storage layer by increasing the gain.

FIGS. 57A and 57B show how the gain of the FE signal changes in this thirteenth preferred embodiment. Specifically, FIG. 57A shows the positional relationships between the beam spot and the information storage layer L0. By allowing some spherical aberration, the range in which the focusing control can be carried out expands and the absolute value of the peak L11 of the S-curve decreases as indicated by the solid curve in FIG. 57B. Even if the absolute value of the peak value L11 is smaller than that of the level L13, a peak value L12 having an absolute value greater than that of the level L13 can also be obtained as indicated by the dashed curve in FIG. 57B by changing the gains. In other words, the focus jump controller 502 increases the gain of the output signal of the focus detector 416 so as to obtain such a peak value L12 as having an absolute value that is greater than that of the level L13. Thus, the range in which the focusing control can be carried out expands, and at the same time, the linear portion of the S-curve can have a steeper slope, thereby increasing the gain of the signal that allows the focusing control. As a result, the focusing control can be carried out in such a manner as to get the beam spot in focus with the target information storage layer with more certainty.

Figure 58:
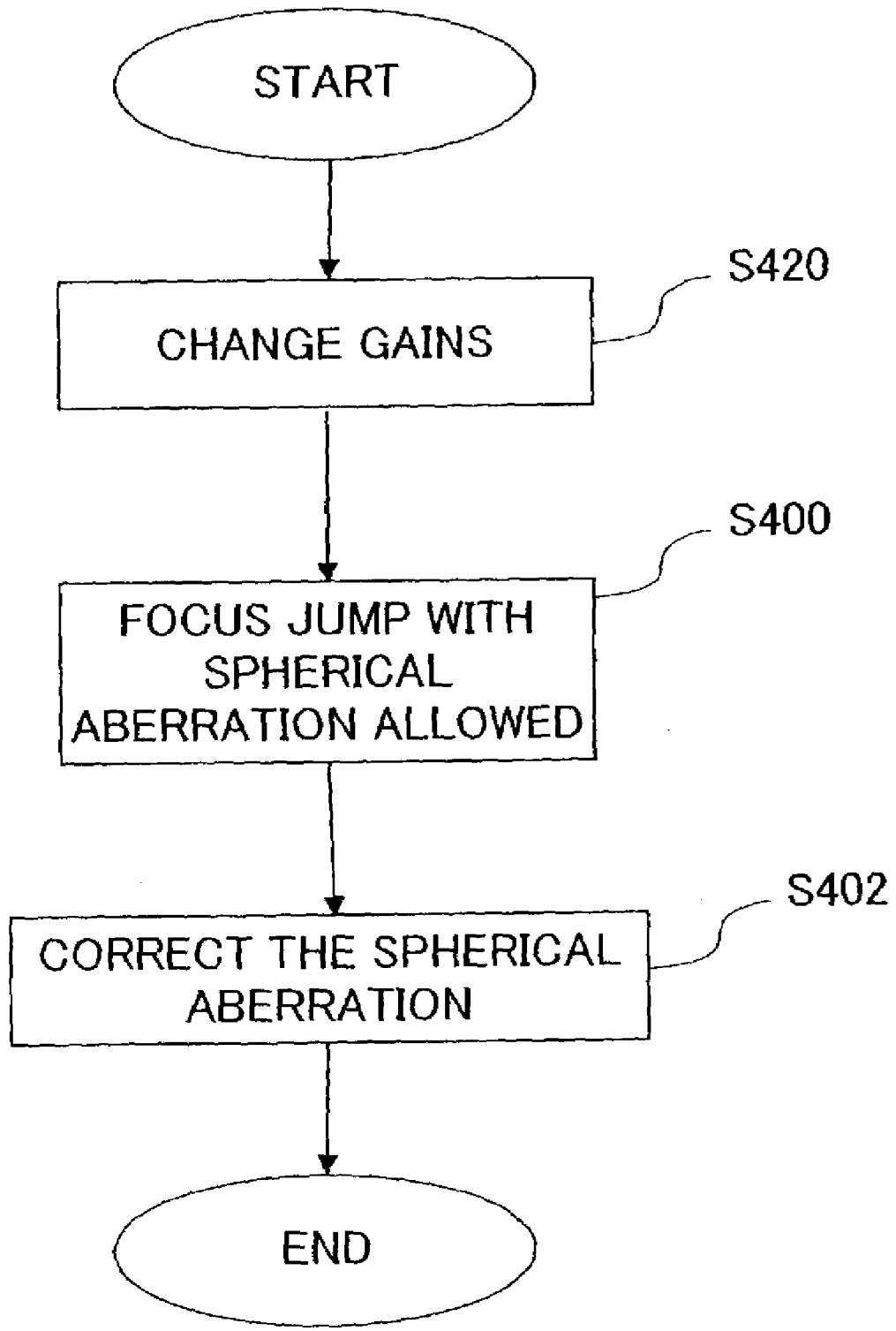
FIG. 58 is a flowchart showing the flow of a focus jump process according to the thirteenth preferred embodiment.

FIG. 58 is a flowchart showing the flow of a focus jump control according to the thirteenth preferred embodiment. In FIG. 58, the same process step as that of the twelfth preferred embodiment described above is identified by the same step number as that shown in FIG. 51. As shown in FIG. 58, the focus jump controller 502 changes the gains of the output signal of the focus detector 416 in Step S420 first, and then performs the steps S400 and S402.

Alternatively, the focus jump controller 502 may also control the operation of jumping the beam spot over to the target information storage layer while adjusting the gain of the output signal of the focus detector 416. In that case, the focus jump controller 502 may control the focus jump operation while changing the gains of the FE signal with the quantity of light reflected. Optionally, the focus jump controller 502 may subject the FE signal to an automatic gain control (AGC) during the focus jump operation. For example, the focus jump controller 502 may perform the AGC operation by normalizing the FE signal with the AS signal. Then, even if the focus jump operation is carried out with some spherical aberration allowed, an appropriate detection signal level can still be obtained.

In the thirteenth preferred embodiment described above, the focus jump operation is carried out with the gains changed. Accordingly, even if the range in which the focusing control can be carried out is expanded, the S-curve can always have an appropriate peak value. Thus, the focus jump performance improves.

Figure 59:
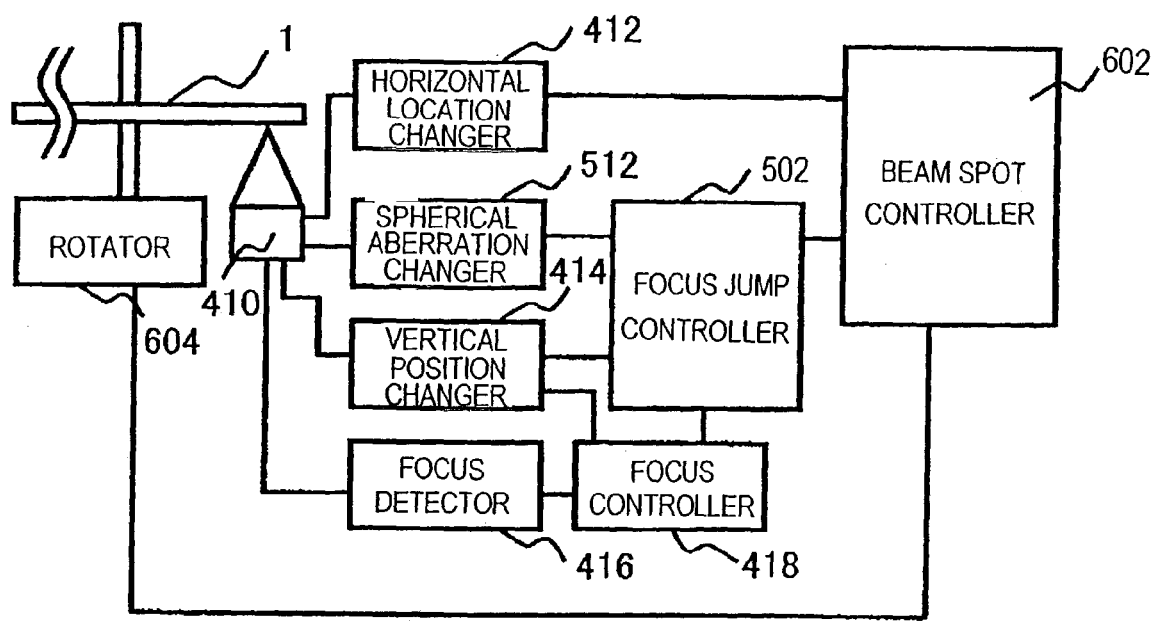
FIG. 59 is a block diagram schematically showing the functional configuration of an optical disc drive according to an alternative preferred embodiment of the present invention.

The ninth through thirteenth preferred embodiments of the present invention described above may be appropriately combined with each other. FIG. 59 is a block diagram schematically showing the functional configuration of an optical disc drive according to an alternative preferred embodiment of the present invention. As shown in FIG. 59, the optical disc drive includes the focusing member 410, horizontal location changer 412, vertical position changer 414, focus detector 416, focus controller 418, focus jump controller 502, beam spot controller 602, rotator 604 and spherical aberration changer 512. Each of these members may operate as described for any of the ninth through thirteenth preferred embodiments. Thus, the failures of focus jumping can be further reduced and the focus jump performance can be further improved.

Optionally, the functions of the beam spot controller 404 or 602, focus jump controller 420, 402 or 502 and focus controller 418 as described for the ninth through thirteenth preferred embodiments may be implemented by getting a program, which is stored on a computer-readable storage medium such as a ROM or a RAM, read and executed by a processor (not shown). Also, the beam spot controller 404 or 602, focus jump controller 420, 402 or 502 and focus controller 418 may be implemented by hardware components either partially or entirely.

As described above, the ninth through thirteenth preferred embodiments of the present invention improve the focus jump performance by utilizing the phenomenon that the flutter decreases in the inside portion compared to the outside portion, the flutter can be reduced by decreasing the rotational speed, and/or the range in which the focusing control can be carried out can be expanded by allowing some spherical aberration.

The optical disc drive of any of the first through thirteenth preferred embodiments of the present invention described above operates basically under the control of the microcomputer. The microcomputer performs a predetermined control process by executing a computer program, which defines the process as described with reference to any of the flowcharts mentioned above. Such a computer program may be stored on any of various types of storage media including a magnetic storage medium such as a flexible disk, a semiconductor memory such as a flash memory, and an optical storage medium such as an optical disc. The computer program may also be transmitted through a telecommunications line including a network. Furthermore, one or more semiconductor memories having stored such a computer program thereon may be sold or provided as a chip set.

According to various preferred embodiments of the present invention described above, a beam spot can be formed on the target information storage layer just as intended by correcting the spherical aberration, and a target location can be reached constantly with the effects of flutter taken into account. Thus, it is possible to gain access to any desired location on a high-density and high-capacity optical disc constantly.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A method of moving a beam spot from a first one of multiple information storage layers of an optical disc to a second one thereof by using an optical disc drive, wherein the multiple information storage layers of the optical disc, including the first and second information storage layers, are stacked one upon the other and each include a track thereon, and wherein the optical disc drive includes:

a light source for emitting a light beam toward the optical disc;

a lens for converging the light beam that has been emitted from the light source and forming a beam spot of the light beam on a selected one of the multiple information storage layers;

a lens position changer for adjusting the position of the lens perpendicularly to the information storage layers;

a focusing section for forming a focused beam spot on the selected information storage layer;

a focus error detector that detects a positional deviation of the beam spot from the selected information storage layer as measured perpendicularly to the information storage layers and outputs a focus error signal representing the deviation;

a spherical aberration corrector for changing a spherical aberration of the beam spot according to a drive value of a driving signal supplied to the spherical aberration corrector; and a spherical aberration detector for detecting the spherical aberration and outputting a signal representing the magnitude of the spherical aberration, and wherein the method comprises the steps of:

finding an ideal drive value of the driving signal that will minimize the spherical aberration at a focal point on the second information storage layer;

changing the spherical aberration on the first information storage layer by driving the spherical aberration corrector with the ideal drive value of the driving signal supplied thereto and synchronously changing at least one of a gain and an offset of the focus error signal generated by the focus error detector such that a focus control system has a constant open loop gain;

jumping the beam spot from the first information storage layer to the second information storage layer by driving the lens position changer; and forming a focused beam spot on the second information storage layer by driving the focusing section.

2. The method of claim 1, further comprising the step of changing settings of the focus control system, which is defined by the lens, the focusing section, a focus error detector and the spherical aberration corrector, and a correction value of the spherical aberration corrector synchronously with each other.

3. The method of claim 1, wherein the optical disc drive further includes a tracking error detector for detecting a positional deviation of the beam spot of the light beam, which has been emitted toward the optical disc, from the track and outputting a tracking error signal representing the deviation, and wherein if the tracking error signal has amplitude that is equal to or smaller than a predetermined value, the method further includes the step of jumping the beam spot again.

4. The method of claim 1, wherein the optical disc drive further includes a tracking section for controlling a positional relationship between the beam spot and the track on the selected information storage layer, and wherein if the tracking section is performing an abnormal control operation, the method further includes the step of jumping the beam spot again.

5. An apparatus of moving a beam spot from a first one of multiple information storage layers of an optical disc to a second one thereof wherein the multiple information storage layers of the optical disc, including the first and second information storage layers, are stacked one upon the other and each include a track thereon, and wherein the apparatus comprises:

a light source for emitting a light beam toward the optical disc;

a lens for converging the light beam that has been emitted from the light source and forming a beam spot of the light beam on a selected one of the multiple information storage layers;

a lens position changer for adjusting the position of the lens perpendicularly to the information storage layers;

a focusing section for forming a focused beam spot on the selected information storage layer;

a focus error detector that detects a positional deviation of the beam spot from the selected information storage layer as measured perpendicularly to the information storage layers and outputs a focus error signal representing the deviation;

a spherical aberration corrector for changing a spherical aberration of the beam spot according to a drive value of a driving signal supplied to the spherical aberration corrector;

a spherical aberration detector for detecting the spherical aberration and outputting a signal representing the magnitude of the spherical aberration; and a microcomputer, wherein the microcomputer executes the steps of:

finding an ideal drive value of the driving signal that will minimize the spherical aberration at a focal point on the second information storage layer;

changing the spherical aberration on the first information storage layer by driving the spherical aberration corrector with the ideal drive value of the driving signal supplied thereto and synchronously changing at least one of a gain and an offset of the focus error signal generated by the focus error detector such that a focus control system has a constant open loop gain;

jumping the beam spot from the first information storage layer to the second information storage layer by driving the lens position changer; and forming a focused beam spot on the second information storage layer by driving the focusing section.

* * * * *